(12) United States Patent
Yuasa et al.

(10) Patent No.: US 12,137,625 B2
(45) Date of Patent: Nov. 12, 2024

(54) WORK VEHICLE AND CONTROL SYSTEM FOR WORK VEHICLE

(71) Applicant: KUBOTA CORPORATION, Osaka (JP)

(72) Inventors: Junichi Yuasa, Sakai (JP); Ryo Kurata, Sakai (JP); Hiroaki Sasaki, Sakai (JP); Yuji Okuyama, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 394 days.

(21) Appl. No.: 17/693,715

(22) Filed: Mar. 14, 2022

(65) Prior Publication Data

US 2022/0287218 A1    Sep. 15, 2022

(30) Foreign Application Priority Data

Mar. 15, 2021 (JP) .................. 2021-041478
Mar. 15, 2021 (JP) .................. 2021-041479
(Continued)

(51) Int. Cl.
*A01B 69/04*   (2006.01)
*B60K 31/00*   (2006.01)
*G07C 5/06*    (2006.01)

(52) U.S. Cl.
CPC ............ *A01B 69/008* (2013.01); *B60K 31/00* (2013.01); *G07C 5/06* (2013.01)

(58) Field of Classification Search
CPC .... A01B 69/008; A01B 69/007; B60K 31/00; G07C 5/06; G07C 1/0217; G07C 1/0088;
(Continued)

(56) References Cited

U.S. PATENT DOCUMENTS 6,282,478 B1 *  8/2001  Akita .................... B60K 31/00
                                                       303/167
6,324,463 B1 * 11/2001  Patel .................... B60K 31/185
                                                       362/489
(Continued)

FOREIGN PATENT DOCUMENTS

JP      2019-054746 A     4/2019
JP      2019-187358 A    10/2019
(Continued)

*Primary Examiner* — Ian Jen
*Assistant Examiner* — Hossam M Abd El Latif
(74) *Attorney, Agent, or Firm* — Keating & Bennett, LLP

(57) ABSTRACT

A control system for a work vehicle that performs auto-steer driving includes a storage to store a target path for the work vehicle, and a controller configured or programmed to control steering of the work vehicle so that the work vehicle travels along the target path based on a position of the work vehicle identified by a position identifier and the target path stored in the storage. The target path includes parallel main paths and one or more turning paths interconnecting the plurality of main paths. When the work vehicle is turning along one of the turning paths via automatic steering, if the position of the work vehicle becomes deviated from the turning path by more than a reference distance, the controller is configured or programmed to cause an alarm generator to output an alarm.

16 Claims, 35 Drawing Sheets

(30) Foreign Application Priority Data

Mar. 15, 2021 (JP) .................................. 2021-041480
Mar. 15, 2021 (JP) .................................. 2021-041481

(58) Field of Classification Search
CPC ....... G07C 1/0219; G07C 1/0278; E02F 9/20; E02F 9/2087; E02F 9/205
USPC .......................................................... 701/25
See application file for complete search history.

(56) References Cited

U.S. PATENT DOCUMENTS

| | | |
|---|---|---|
| 9,433,140 B2 | 9/2016 | Helligen et al. |
| 2018/0054954 A1 | 3/2018 | De Nale et al. |
| 2018/0181143 A1 | 6/2018 | Hiramatsu |
| 2018/0299889 A1* | 10/2018 | Yokota .................. B60W 40/09 |
| 2019/0072972 A1* | 3/2019 | Shinkai ................ G05D 1/0217 |
| 2020/0166350 A1* | 5/2020 | Gitz ...................... G01C 21/367 |
| 2020/0296878 A1 | 9/2020 | Dix |
| 2020/0410406 A1* | 12/2020 | Leary ..................... G05D 1/249 |
| 2021/0310213 A1* | 10/2021 | Aizawa ................. E02F 9/2029 |
| 2023/0081284 A1* | 3/2023 | Nishii .................. A01B 69/008 701/25 |

FOREIGN PATENT DOCUMENTS

| | | |
|---|---|---|
| JP | 2020-028243 A | 2/2020 |
| JP | 2020-058384 A | 4/2020 |
| JP | 2020-168002 A | 10/2020 |
| WO | 2015/147108 A1 | 10/2015 |
| WO | 2016/131684 A1 | 8/2016 |

* cited by examiner

WORK VEHICLE AND CONTROL SYSTEM FOR WORK VEHICLE

CROSS-REFERENCE TO RELATED APPLICATION

This application claims priority to Japanese Patent Applications No. 2021-041478, No. 2021-041479, No. 2021-041480, and No. 2021-041481, all of which were filed on Mar. 15, 2021, the entire contents of which are hereby incorporated by reference.

BACKGROUND OF THE INVENTION

1. Field of the Invention

The present disclosure relates to a work vehicle and a control system for the work vehicle.

2. Description of the Related Art

Research and development has been directed to the automation of tractors or other work vehicles to be used in agricultural fields. For example, work vehicles which travel via automatic steering by utilizing a positioning system that is capable of precise positioning, e.g., a GNSS (Global Navigation Satellite System), are coming into practical use. Work vehicles which automatically perform speed control in addition to automatic steering have also come into practical use. For instance, Japanese Laid-Open Patent Publication No. 2019-187358, Japanese Laid-Open Patent Publication No. 2020-028243, Japanese Laid-Open Patent Publication No. 2020-058384, Japanese Laid-Open Patent Publication No. 2020-168002, International Publication No. 2016/131684 and United States Patent Publication No. 2020/0296878 disclose examples of work vehicles which automatically travel within a field.

Japanese Laid-Open Patent Publication No. 2019-187358 discloses an example of a work vehicle which can smoothly turn during self-driving. The work vehicle disclosed in Japanese Laid-Open Patent Publication No. 2019-187358 sets a point of deceleration before the beginning point of a turn, and if the gear shift is on the higher side of a predetermined gear shift, it switches to that predetermined gear shift in order to decelerate at the point of deceleration. This is supposed to enable smooth and safe turning.

Japanese Laid-Open Patent Publication No. 2020-028243 discloses a self-driving system for work vehicles. In the self-driving system of Japanese Laid-Open Patent Publication No. 2020-028243, while a work vehicle is self-driving along one of a plurality of parallel paths, the speed of the work vehicle is restricted in accordance with the distance from the work vehicle to the outer peripheral edge of the work area along the traveling direction of the work vehicle. Specifically, the work vehicle decelerates as it approaches the outer peripheral edge of the work area. When causing the work vehicle to halt near the outer peripheral edge of the field or turn along a turning path, this is supposed to restrain the work vehicle from straying out of the field and coming into contact with other objects, e.g., a ridge between fields.

Japanese Laid-Open Patent Publication No. 2020-058384 discloses a work vehicle which properly recognizes that the work vehicle has arrived at a ridge region (or headland), and turns around as appropriate. During travel, on the basis of its own position or the position of an implement as measured by a positioning unit, the work vehicle disclosed in Japanese Laid-Open Patent Publication No. 2020-058384 detects that the work vehicle has approached or arrived at a ridge region. This is supposed to allow an automatic turnaround at the ridge region, or provide an alert to the driver that the driver has approached a ridge region.

Japanese Laid-Open Patent Publication No. 2020-168002 discloses a driving assistance system which has a user-friendly way of managing respective work travel sequences to be performed in a transition region from a straight travel to a headland turn, and a transition region from the headland turn to a next straight travel. On a display, this driving assistance system displays buttons for selecting a work travel sequence and icons indicating the contents of the selected work travel sequence.

International Publication No. 2016/131684 discloses an example of a work vehicle which includes a headland management system (HMS) that executes a headland turn sequence (HTS) at predetermined positions within a field. On a display, the HMS displays a real-time map that contains the position of the vehicle and at least some of the events of an HTS to be executed later. The operator is able to modify at least one event of the HTS being displayed on the real-time map. For example, the operator can add and delete HTS events, or change the position at which an HTS event is executed.

United States Patent Publication No. 2020/0296878 discloses a guidance system for a work vehicle. The guidance system includes a control system. Based on the relative position of the work vehicle with respect to a work area and on the minimum turning radius of the work vehicle, the control system determines a turning path at the end of a row (end-of-row) that is being traveled by the work vehicle, and causes the work vehicle to make a turn.

SUMMARY OF THE INVENTION

Preferred embodiments of the present invention provide work vehicles that are each able to turn with an increased smoothness via automatic steering, and control systems therefor.

A control system according to an illustrative preferred embodiment of the present disclosure is a control system for a work vehicle that performs auto-steer driving. The control system includes a storage to store a target path for the work vehicle, and a controller configured or programmed to control steering of the work vehicle so that the work vehicle travels along the target path based on a position of the work vehicle identified by a positioning device and the target path stored in the storage. The target path includes a plurality of parallel main paths and one or more turning paths interconnecting the plurality of main paths. When the work vehicle is turning along one of the turning paths via automatic steering, if the position of the work vehicle becomes deviated from the turning path by more than a reference distance, the controller is configured or programmed to cause an alarm generator to output an alarm.

General or specific aspects of various example preferred embodiments of the present disclosure may be implemented using a device, a system, a method, an integrated circuit, a computer program, a non-transitory computer-readable storage medium, or any combination thereof. The computer-readable storage medium may be inclusive of a volatile storage medium, or a non-volatile storage medium. The device may include a plurality of devices. In the case where the device includes two or more devices, the two or more devices may be disposed within a single apparatus, or divided over two or more separate apparatuses.

Preferred embodiments of the present disclosure make it possible for work vehicles to turn with an increased smoothness via automatic steering.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
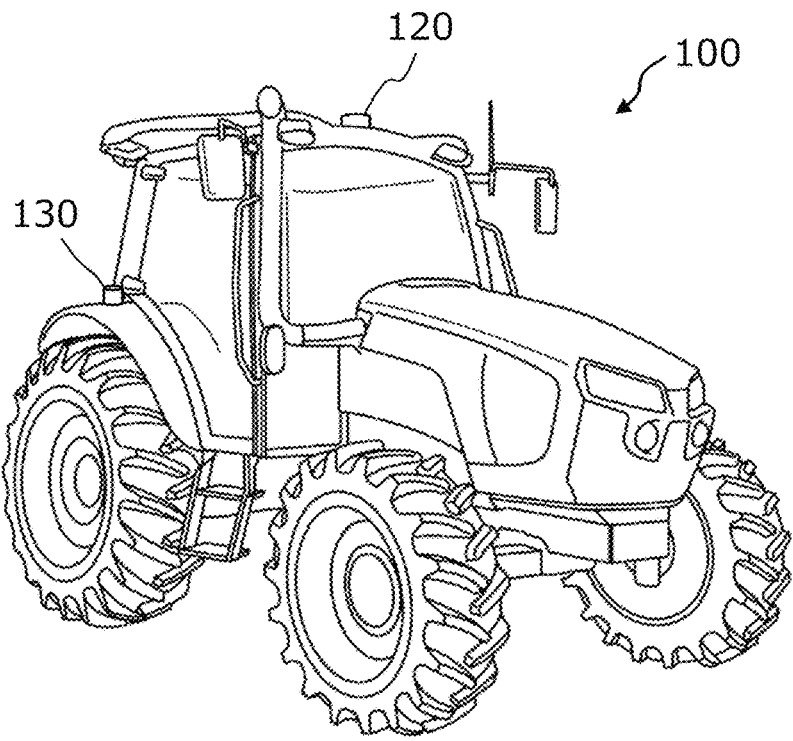
FIG. 1 is a perspective view showing an exemplary appearance of a work vehicle according to Preferred Embodiment 1 of the present invention.

Hereinafter, preferred embodiments of the present disclosure will be described more specifically. Note however that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of claims. In the following description, component elements having identical or similar functions are denoted by identical reference numerals.

The following preferred embodiments are only exemplary, and the technique according to the present disclosure is not limited to the following preferred embodiments. For example, numerical values, shapes, materials, steps, and orders of steps, layout of a display screen, etc., that are indicated in the following preferred embodiments are only exemplary, and admit of various modifications so long as it makes technological sense. Any one implementation may be combined with another so long as it makes technological sense to do so.

Described below are preferred embodiments where the technique according to the present disclosure is applied to a tractor, as an example of a work vehicle. Without being limited to a tractor, however, the techniques according to preferred embodiments of the present disclosure are applicable to any work vehicle that travels via automatic steering. The work vehicle may be a rice transplanter, a combine, a mower, a harvester, a snowplow vehicle, or a construction vehicle, for example.

Preferred Embodiment 1

A work vehicle and a control system for the work vehicle according to a first illustrative preferred embodiment of the present disclosure will be described.

A work vehicle according to the present preferred embodiment includes a control system for performing controls to realize auto-steer driving. The control system is a computer system that includes a storage device and a controller. The storage device includes one or more storage media to store various data, such as a target path of the work vehicle. The controller includes one or more processors or control circuits to control the operation of the work vehicle. Based on the position of the work vehicle as identified by a positioning device (position identifier) and the target path stored in the storage device, the controller controls steering of the work vehicle so that the work vehicle travels along the target path. The positioning device is disposed inside or outside the work vehicle. The positioning device includes, e.g., a GNSS receiver, and identifies the position of the work vehicle based on a signal from a GNSS satellite. The positioning device may include any device other than a GNSS receiver, such as a LiDAR sensor or a camera. Through matching between the data which is acquired by the LiDAR sensor or the camera and an environment map data that is prepared in advance, the position of the work vehicle can be estimated. The target path is a path to serve as a target of traveling that is set within an environment to be travelled by the work vehicle. The target path is set before beginning auto-steer driving, and is recorded in the storage device. The target path may include a plurality of parallel main paths, and one or more turning paths connecting the plurality of main paths. The controller controls the steering angle of the wheels responsible for steering of the work vehicle (e.g., front wheels) so that the work vehicle will reciprocate in the field while following along the target path.

The main paths are set in a work area within the field in which the work vehicle is supposed to perform tasks such as tilling, mowing, seeding, manure spreading, or preventive pest control, for example. Each main path may be a linear path, or a path containing a curved portion(s). The turning path(s) may be set at a headland that is located at the outer peripheral edge of the field, for example.

If the work vehicle mistracks from the intended turning path when turning in a headland via automatic steering, it may take some time to return to the target path after the turn is made, or in some cases, the work vehicle may stray out of the field. When mistracking from the path has occurred, it is important for the user to be promptly notified.

A method of notifying the user that the work vehicle has mistracked from the target path may be to, during travel via automatic steering, display an offset (or distance) of the position of the work vehicle from the target path on a display device (which hereinafter may be referred to as the "display") of an operational terminal that is provided in the work vehicle. However, merely displaying the offset on the display device may result in some time having elapsed before the user notices the mistracking from the path.

Therefore, in the present preferred embodiment, while the work vehicle is turning along a turning path via automatic steering, if the position of the work vehicle becomes deviated from the turning path by more than a reference distance, an alarm generator outputs an alarm. The alarm generator may include an audio output device such as a buzzer or a loudspeaker and/or a display device, for example. The alarm may be issued by a method which intensely stimulates the senses of the user, e.g., a loud sound, strong light, or vibrations. As a result, if the work vehicle mistracks from the target path when turning via automatic steering, the user can be notified of the situation early on. Consequently, before the work vehicle significantly mistracks from the target path, the user is able to perform manipulations to avoid mistracking. The reference distance is set to an appropriate value according to the work accuracy required by the user. The above operation allows the user to notice early on if the work accuracy required by the user fails to be satisfied.

Figure 2:
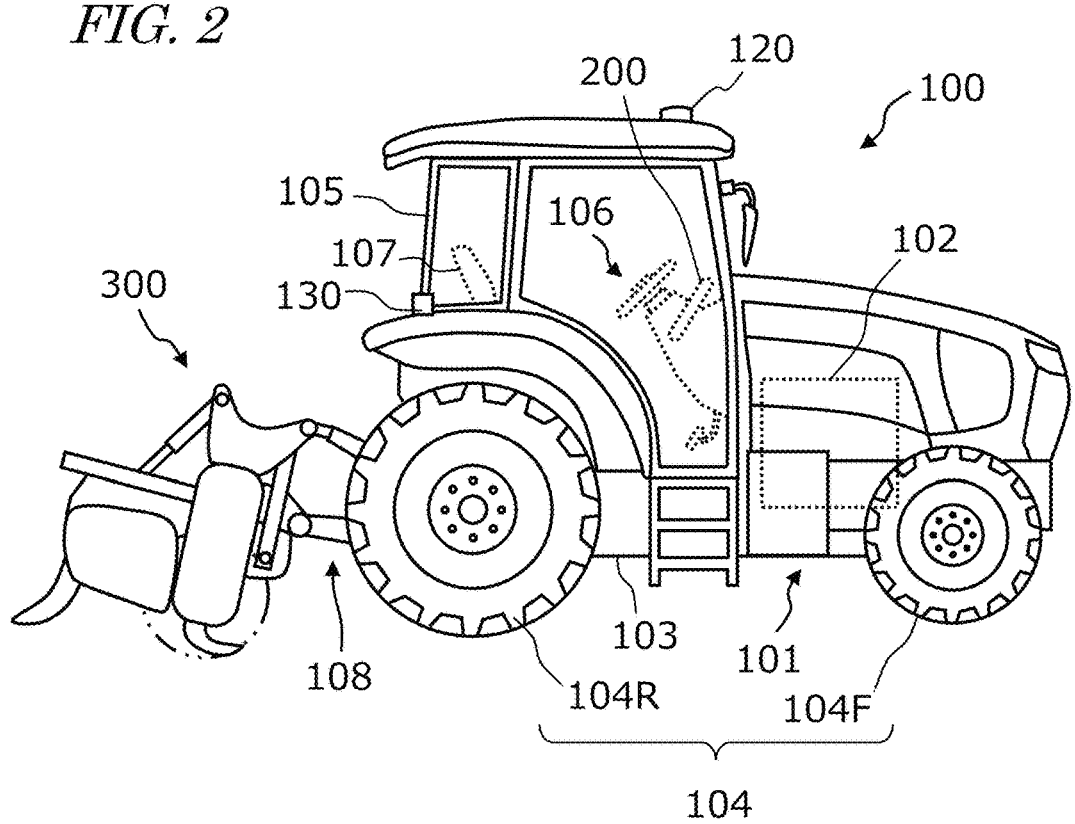
FIG. 2 is a side view schematically showing the work vehicle and an example of an implement that is linked to the work vehicle.

FIG. 1 is a perspective view showing an exemplary appearance of the work vehicle 100 according to the present preferred embodiment. FIG. 2 is a side view schematically showing the work vehicle 100 and an example of an implement 300 that is linked to the work vehicle 100. The work vehicle according to the present preferred embodiment is a tractor to be used in a field. The techniques according to the present preferred embodiment and any other preferred embodiment to be described below are applicable also to any work vehicle other than a tractor so long as it makes sense to do so.

The work vehicle 100 according to the present preferred embodiment includes a positioning device 120 and one or more obstacle sensors 130. Although one obstacle sensor 130 is illustrated in FIG. 1, obstacle sensors 130 may be provided at a plurality of positions of the work vehicle 100.

As shown in FIG. 2, the work vehicle 100 includes a vehicle body 101, a prime mover (engine) 102, and a transmission 103. On the vehicle body 101, tires (wheels) 104 and a cabin 105 are provided. The wheels 104 include a pair of front wheels 104F and a pair of rear wheels 104R. Inside the cabin 105, a driver's seat 107, a steering device 106, an operational terminal 200, and switches for manipulation are provided. Either pair of the front wheels 104F or the rear wheels 104R may be crawlers, rather than tires. The work vehicle 100 is a four-wheel drive vehicle including four wheels 104 as driving wheels, or a two-wheel drive vehicle including a pair of front wheels 104F or a pair of rear wheels 104R as driving wheels. In the following description, it is assumed that the work vehicle 100 is able to switch between a two-wheel drive (2W) mode and a four-wheel drive (4W) mode.

The positioning device 120 in the present preferred embodiment includes a GNSS receiver. The GNSS receiver includes an antenna to receive a signal(s) from a GNSS satellite(s) and a processing circuit to determine the position of the work vehicle 100 based on the signal(s) received by the antenna. The positioning device 120 receive a GNSS signal(s) transmitted from a GNSS satellite(s), and performs positioning on the basis of the GNSS signal(s). GNSS is a general term for satellite positioning systems, such as GPS (Global Positioning System), QZSS (Quasi-Zenith Satellite System, e.g., MICHIBIKI), GLONASS, Galileo, BeiDou, and the like. Although the positioning device 120 in the present preferred embodiment is disposed above the cabin 105, it may be disposed at any other position.

Instead of or in addition to the GNSS receiver, the positioning device 120 may include any other type of device, such as a LiDAR sensor or a camera (inclusive of an image sensor). When objects serving as characteristic points exist in the environment that is traveled by the work vehicle 100, the position of the work vehicle 100 can be estimated with a high accuracy based on data that is acquired with the LiDAR sensor or camera and an environment map that is previously recorded in the storage device. A LiDAR sensor or a camera may be used together with the GNSS receiver. By correcting or complementing position data based on the GNSS signal(s) using the data acquired by the LiDAR sensor or camera, it becomes possible to identify the position of the work vehicle 100 with a higher accuracy. Furthermore, the positioning device 120 may complement the position data by using a signal from an inertial measurement unit (IMU). The IMU can measure tilts and minute motions of the work vehicle 100. By complementing the position data based on the GNSS signal using the data acquired by the IMU, the positioning performance can be improved.

In the examples shown in FIGS. 1 and 2, the obstacle sensor(s) 130 is provided at the rear of the vehicle body 101. The obstacle sensor(s) 130 may be disposed at any other position than the rear of the vehicle body 101. For example, one or more obstacle sensors 130 may be disposed at any position selected from among the sides of the vehicle body 101, the front of the vehicle body 101, and the cabin 105. The obstacle sensor(s) 130 detects objects around the work vehicle 100. Each obstacle sensor 130 may include a laser scanner or an ultrasonic sonar, for example. When an object exists at a position closer to the obstacle sensor 130 than a predetermined distance, the obstacle sensor 130 outputs a signal indicating the presence of an obstacle. A plurality of obstacle sensors 130 may be provided at different positions of the body of the work vehicle 100. For example, a plurality of laser scanners and a plurality of ultrasonic sonars may be disposed at different positions of the body. Providing a multitude of obstacle sensors 130 can reduce blind spots in monitoring obstacles around the work vehicle 100.

The prime mover 102 may be a diesel engine, for example. Instead of a diesel engine, an electric motor may be used. The transmission 103 can change the propulsion and moving speed of the work vehicle 100 through a speed changing mechanism. The transmission 103 can also switch between forward travel and backward travel of the work vehicle 100.

The steering device 106 includes a steering wheel, a steering shaft connected to the steering wheel, and a power steering device to assist in the steering by the steering wheel. The front wheels 104F are the wheels responsible for steering, such that changing their angle of turn (also referred to as "steering angle") can cause a change in the traveling direction of the work vehicle 100. The steering angle of the front wheels 104F can be changed by manipulating the steering wheel. The power steering device includes a hydraulic device or an electric motor to supply an assisting force for changing the steering angle of the front wheels 104F. When automatic steering is performed, under the control of a controller disposed in the work vehicle 100, the steering angle may be automatically adjusted by the power of the hydraulic device or electric motor.

A linkage device 108 is provided at the rear of the vehicle body 101. The linkage device 108 may include, e.g., a three-point linkage (also referred to as a "three-point link" or a "three-point hitch"), a PTO (Power Take Off) shaft, a universal joint, and a communication cable. The linkage device 108 allows the implement 300 to be attached to or detached from the work vehicle 100. The linkage device 108 is able to raise or lower the three-point linkage device with a hydraulic device, for example, thus controlling the position and/or attitude of the implement 300. Moreover, motive power can be sent from the work vehicle 100 to the implement 300 via the universal joint. While towing the implement 300, the work vehicle 100 allows the implement 300 to perform a predetermined task. The linkage device may be provided frontward of the vehicle body 101. In that case, the implement may be connected frontward of the work vehicle 100.

Although the implement 300 shown in FIG. 2 is a rotary tiller, the implement 300 is not limited to a rotary tiller. For example, any arbitrary implement such as a mower, a seeder, a spreader, a rake implement, a baler, a harvester, a sprayer, or a harrow, may be connected to the work vehicle 100 for use.

Figure 3:
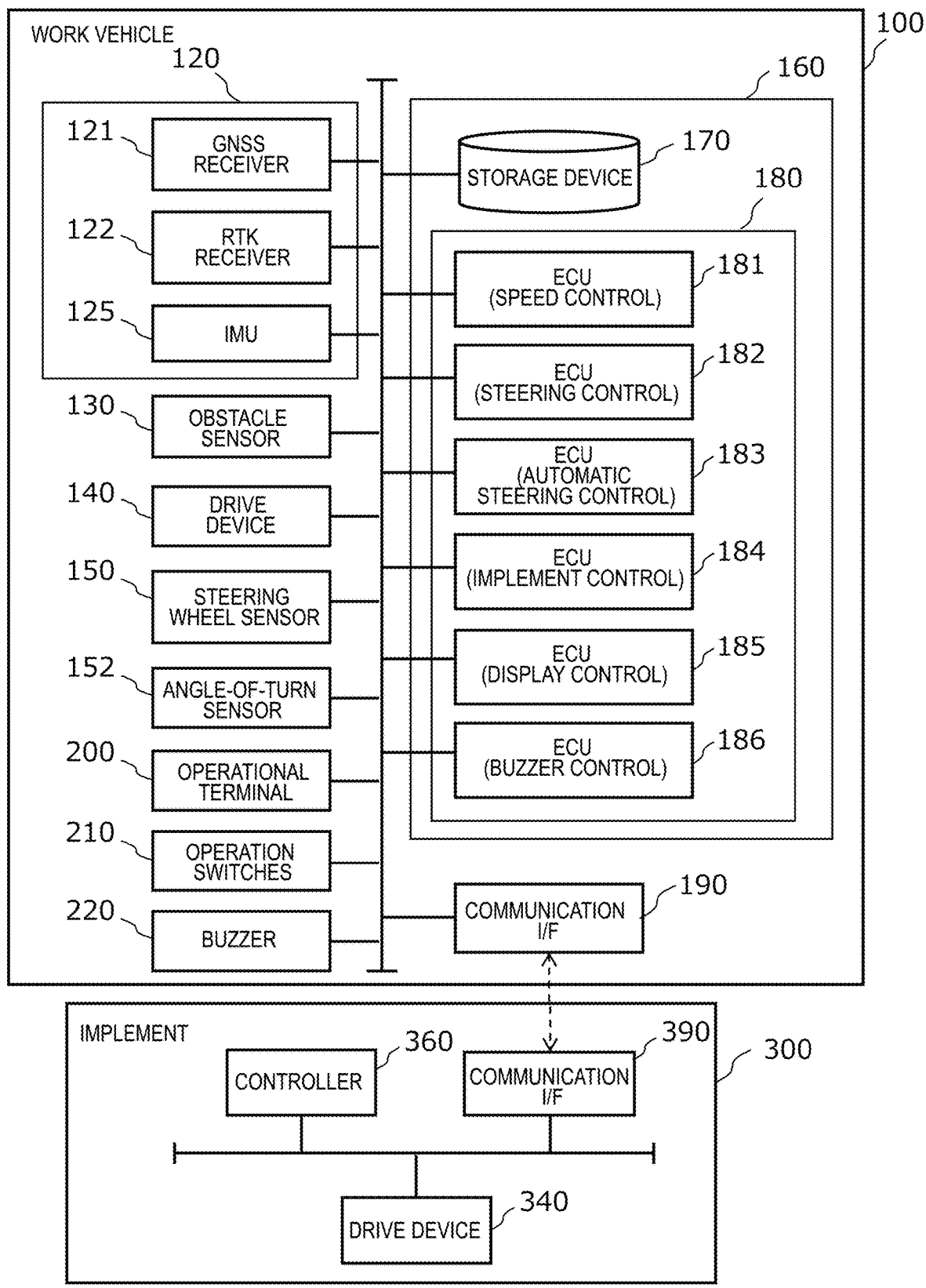
FIG. 3 is a block diagram showing an example of a schematic configuration of the work vehicle and the implement.

FIG. 3 is a block diagram showing an example of a schematic configuration of the work vehicle 100 and the implement 300. The work vehicle 100 and the implement 300 can communicate with each other via a communication cable that is included in the linkage device 108.

In addition to the positioning device 120, the obstacle sensor 130, and the operational terminal 200, the work vehicle 100 in the example of FIG. 3 includes a drive device 140, a steering wheel sensor 150, an angle-of-turn sensor 152, a control system 160, a communication interface (I/F) 190, operation switches 210, and a buzzer 220. The positioning device 120 includes a GNSS receiver 121, an RTK receiver 122, and an inertial measurement unit (IMU) 125. The control system 160 includes a storage device 170 and a controller 180. The controller 180 includes a plurality of electronic control units (ECU) 181 to 186. The implement 300 includes a drive device 340, a controller 380, and a communication interface (I/F) 390. Note that FIG. 3 shows component elements which are relatively closely related to the operation of automatic steering or self-driving by the work vehicle 100, while other component elements are omitted from illustration.

Figure 4:
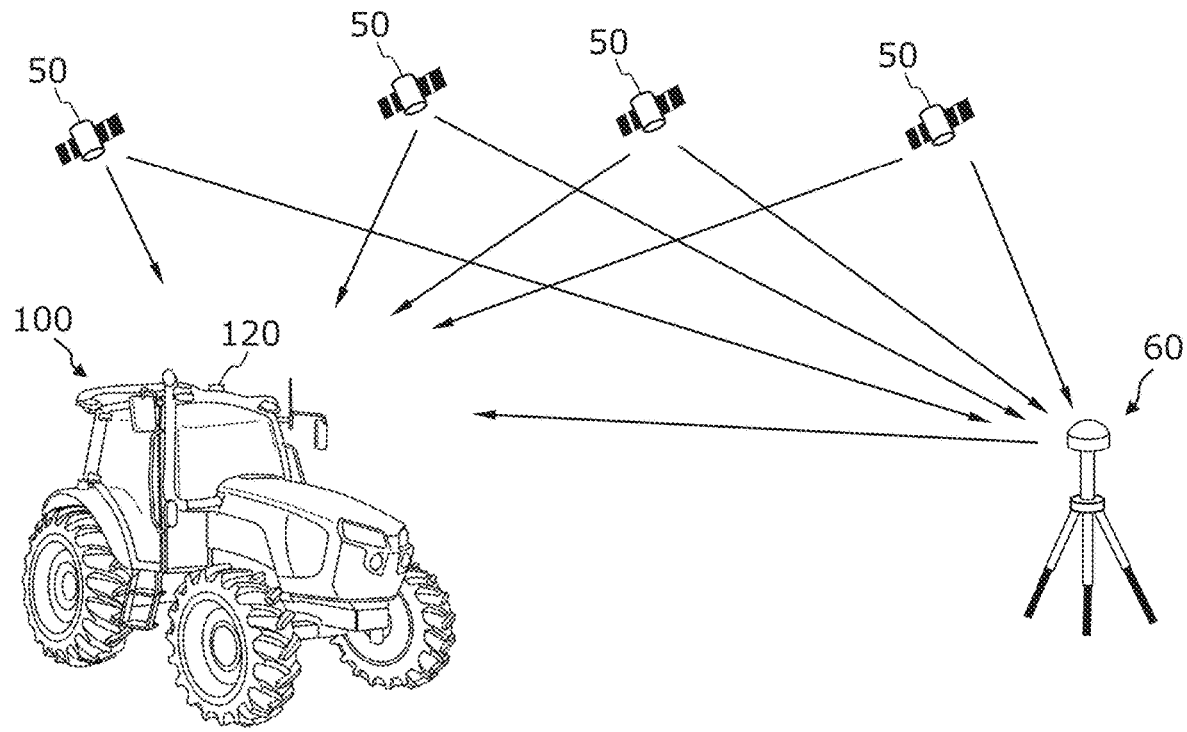
FIG. 4 is a conceptual diagram showing an example work vehicle which performs positioning based on an RTK-GNSS.

The positioning device 120 shown in FIG. 3 performs positioning of the work vehicle 100 by utilizing an RTK (Real Time Kinematic)-GNSS. FIG. 4 is a conceptual diagram showing an example of the work vehicle 100 which performs positioning based on an RTK-GNSS. In the positioning based on an RTK-GNSS, not only GNSS signals transmitted from multiple GNSS satellites 50, but also a correction signal that is transmitted from a reference station 60 is used. The reference station 60 may be disposed around the field that is traveled by the work vehicle 100 (e.g., at a position within 10 km of the work vehicle 100). The reference station 60 generates a correction signal based on the GNSS signals received from the multiple GNSS satellites 50, and transmits the correction signal to the positioning device 120. The GNSS receiver 121 in the positioning device 120 receives the GNSS signals transmitted from the multiple GNSS satellites 50. The RTK receiver 122 in the positioning device 120 receives the correction signal transmitted from the reference station 60. Based on the GNSS signals and the correction signal, the positioning device 120 calculates the position of the work vehicle 100, thus achieving positioning. Use of an RTK-GNSS enables positioning with an accuracy on the order of several cm of errors, for example. Positional information (including latitude, longitude, and altitude information) is acquired through the highly accurate positioning by an RTK-GNSS. The positioning device 120 may calculate the position of the work vehicle 100 as frequently as, e.g., one to ten times per second.

Note that the positioning method is not limited to an RTK-GNSS; any arbitrary positioning method (e.g., an interferometric positioning method or a relative positioning method) that provides positional information with the necessary accuracy can be used. For example, positioning may be performed by utilizing a VRS (Virtual Reference Station) or a DGPS (Differential Global Positioning System). In the case where positional information with the necessary accuracy can be obtained without the use of the correction signal transmitted from the reference station 60, positional information may be generated without using the correction signal. In that case, the positioning device 120 may lack the RTK receiver 122.

The positioning device 120 in the present preferred embodiment further includes an IMU 125. The IMU 125 includes a 3-axis accelerometer and a 3-axis gyroscope. The IMU 125 may include a direction sensor such as a 3-axis geomagnetic sensor. The IMU 125 functions as a motion sensor which can output signals representing parameters such as acceleration, velocity, displacement, and attitude of the work vehicle 100. Based not only on the GNSS signals and the correction signal but also on a signal that is output from the IMU 125, the positioning device 120 can estimate the position and orientation of the work vehicle 100 with a higher accuracy. The signal that is output from the IMU 125 may be used for the correction or complementation of the position that is calculated based on the GNSS signals and the correction signal. The IMU 125 outputs a signal more frequently than the GNSS signals. Utilizing this highly frequent signal allows the position and orientation of the work vehicle 100 to be measured more frequently (e.g., about 10 Hz or above). Instead of the IMU 125, a 3-axis accelerometer and a 3-axis gyroscope may be separately provided. The IMU 125 may be provided as a separate device from the positioning device 120.

In addition to or instead of the GNSS receiver 121, the RTK receiver 122, and the IMU 125, the positioning device 120 may include other kinds of sensors, e.g., LiDAR sensors or image sensors. Depending on the environment that is traveled by the work vehicle 100, it is possible to estimate the position and orientation of the work vehicle 100 with a high accuracy based on data from such sensors.

For example, the drive device 140 may include various devices that are needed for the traveling of the work vehicle 100 and the driving of the implement 300, e.g., the aforementioned prime mover 102, transmission 103, differential including a locking differential mechanism, steering device 106, and linkage device 108. The prime mover 102 includes an internal combustion engine such as a diesel engine.

Instead of an internal combustion engine or in addition to an internal combustion engine, the drive device 140 may include an electric motor that is dedicated to traction purposes.

The steering wheel sensor 150 measures the angle of rotation of the steering wheel of the work vehicle 100. The angle-of-turn sensor 152 measures the angle of turn of the front wheels 104F, which are the wheels responsible for steering. Measurement values by the steering wheel sensor 150 and the angle-of-turn sensor 152 are used for the steering control by the controller 180.

The storage device 170 includes one or more storage media such as a flash memory or a magnetic disc. The storage device 170 stores various data that is generated by the sensors and the controller 180. The data that is stored by the storage device 170 may include map data in the environment that is traveled by the work vehicle 100, and data of a target path of automatic steering. The storage device 170 also stores a computer program(s) to cause the ECUs in the controller 180 to perform various operations (to be described later). Such a computer program(s) may be provided for the work vehicle 100 via a storage medium (e.g., a semiconductor memory or an optical disc) or through telecommunication lines (e.g., the Internet). Such a computer program(s) may be marketed as commercial software.

The controller 180 includes a plurality of ECUs. The plurality of ECUs include an ECU 181 for speed control, an ECU 182 for steering control, an ECU 183 for automatic steering control, an ECU 184 for implement control, an ECU 185 for display control, and an ECU 186 for buzzer control. The ECU 181 controls the prime mover 102, the transmission 103, and the brakes included in the drive device 140, thus controlling the speed of the work vehicle 100. The ECU 182 controls the hydraulic device or electric motor included in the steering device 106 based on a measurement value of the steering wheel sensor 150, thus controlling the steering of the work vehicle 100. The ECU 183 performs computations and controls for achieving auto-steer driving, based on signals which are output from the positioning device 120, the steering wheel sensor 150, and the angle-of-turn sensor 152. During auto-steer driving, the ECU 183 sends the ECU 182 a command to change the steering angle. In response to this command, the ECU 182 controls the steering device 106 to change the steering angle. In order to cause the implement 300 to perform a desired operation, the ECU 184 controls the operation of the linkage device 108. Also, the ECU 184 generates a signal to control the operation of the implement 300, and transmits this signal from the communication I/F 190 to the implement 300. The ECU 185 controls displaying on the operational terminal 200. For example, the ECU 185 may cause a display device of the operational terminal 200 to present various indications, e.g., a map of the field, the position of the work vehicle 100 and a target path in the map, pop-up notifications, and setting screens. The ECU 186 controls outputting of alarm sounds by the buzzer 220.

Through the action of these ECUs, the controller 180 realizes driving via manual steering or automatic steering. During auto-steer driving, the controller 180 controls the drive device 140 based on the position of the work vehicle 100 as measured or estimated by the positioning device 120 and the target path stored in the storage device 170. As a result, the controller 180 causes the work vehicle 100 to travel along the target path. The controller 180 also has the function of causing the work vehicle 100 to automatically travel at a reference speed that is set by the user. This function is referred to as the "auto-cruise control function", or simply as the "cruise control function". The cruise control function is realized by the action of the ECU 181.

The plurality of ECUs included in the controller 180 may communicate with one another according to a vehicle bus standard such as CAN (Controller Area Network). Although the ECUs 181 to 186 are illustrated as individual corresponding blocks in FIG. 3, each of these functions may be implemented by a plurality of ECUs. Alternatively, an onboard computer that integrates the functions of at least some of the ECUs 181 to 186 may be provided. The controller 180 may include ECUs other than the ECUs 181 to 186, and any number of ECUs may be provided in accordance with functionality. Each ECU includes a control circuit including one or more processors.

The communication I/F 190 is a circuit that performs communications with the communication I/F 390 of the implement 300. The communication I/F 190 performs exchanges of signals complying with an ISOBUS standard such as ISOBUS-TIM, for example, between itself and the communication I/F 390 of the implement 300. This causes the implement 300 to perform a desired operation, or allows information to be acquired from the implement 300. Moreover, the communication I/F 190 can communicate with an external computer via a wired or wireless network. The external computer may be a server computer in a farming support system which centralizes management of information concerning fields by using a cloud, and assists in agriculture by utilizing the data on the cloud, for example.

The operational terminal 200 is a terminal for the user to perform a manipulation related to the traveling of the work vehicle 100 and the operation of the implement 300, and may also be referred to as a virtual terminal (VT). The operational terminal 200 may include a display device such as a touch screen panel, and/or one or more buttons. By manipulating the operational terminal 200, the user can perform various manipulations, such as switching ON/OFF the automatic steering mode, switching ON/OFF the cruise control, setting an initial position of the work vehicle 100, setting a target path, recording or editing a map, switching between 2WD/4WD, switching ON/OFF the locking differential, and switching ON/OFF the implement 300. At least some of these manipulations can also be realized by manipulating the operation switches 210. Displaying on the operational terminal 200 is controlled by the ECU 185.

The buzzer 220 is an audio output device to present an alarm sound for alerting the user of an abnormality. For example, during auto-steer driving, the buzzer 220 may present an alarm sound when the work vehicle 100 has mistracked from the target path by a predetermined distance or more. Instead of the buzzer 220, a loudspeaker of the operational terminal 200 may provide a similar function. The buzzer 220 is controlled by the ECU 186.

The drive device 340 in the implement 300 performs a necessary operation for the implement 300 to perform a predetermined task. The drive device 340 includes devices adapted to the intended use of the implement 300, e.g., a pump, a hydraulic device, an electric motor, or a pump. The controller 380 controls the operation of the drive device 340. In response to a signal that is transmitted from the work vehicle 100 via the communication I/F 390, the controller 380 causes the drive device 340 to perform various operations. Moreover, a signal that is in accordance with the state of the implement 300 may be transmitted from the communication I/F 390 to the work vehicle 100.

Figure 5:
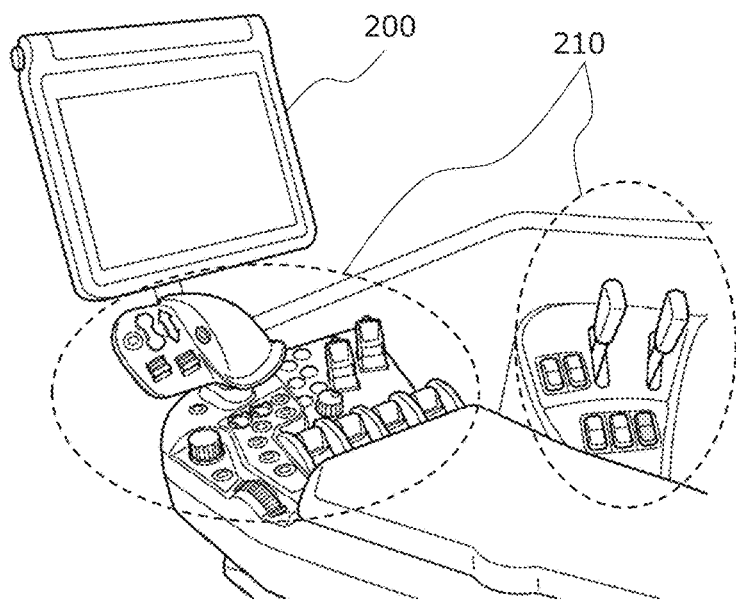
FIG. 5 is a schematic diagram showing an example of an operational terminal and operation switches to be provided in a cabin.

FIG. 5 is a diagram showing an example of the operational terminal 200 and operation switches 210 to be provided in the cabin 105. In the cabin 105, switches 210, which are a multitude of switches that are manipulable to the user, are disposed. The switches 210 may include, for example, a switch to select the gear shift as to a main gear shift or a range gear shift, a switch to switch between an automatic steering (also referred to as "auto-steering") mode and a manual steering mode, a switch to switch between forward travel and backward travel, a switch to raise or lower the implement 300, and a switch to switch ON/OFF the auto-cruise control function for traveling while maintaining a constant speed.

Next, the operation of the work vehicle 100 will be described. The controller 180 in the present preferred embodiment is able to switch between a manual steering mode and an automatic steering mode in response to a manipulation by a user (e.g., a driver) of the work vehicle 100. In the manual steering mode, the controller 180 controls steering by driving the power steering device in response to the user's manipulation of the steering wheel. In the automatic steering mode, the controller 180 controls steering by driving the power steering device based on the position of the work vehicle 100 as measured by the positioning device 120 and a previously-recorded target path. In the automatic steering mode, too, speed of the vehicle is adjustable through accelerating operations and braking operations by the user. However, while the cruise control function is enabled, the controller 180 performs speed control as well, thus causing the work vehicle 100 to travel at a speed that has been set by the user. While in the automatic steering mode and the cruise control function is enabled, the controller 180 causes the work vehicle 100 to automatically travel irrespective of the user's manipulation. Thus, the work vehicle 100 according to the present preferred embodiment can either automatically control the steering alone, or automatically control the steering and the speed.

Figure 6A:
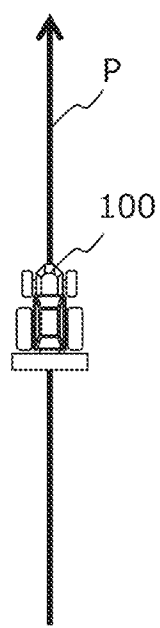
FIGS. 6A to 6c are diagrams showing examples of travel of the work vehicle in an automatic steering mode.
Figure 6B:
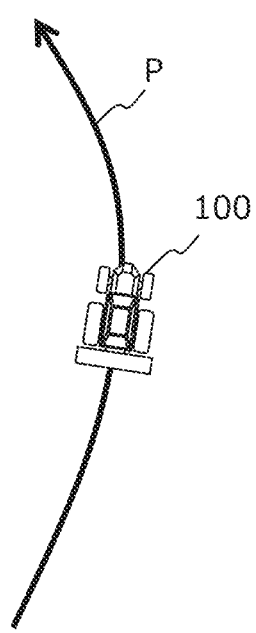
Figure 6C:
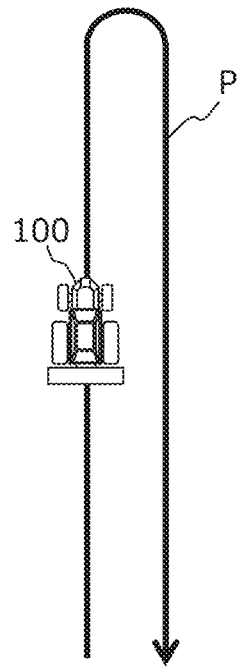

FIGS. 6A to 6c are diagrams showing examples of travel by the work vehicle 100 in the automatic steering mode. FIG. 6A schematically shows how the work vehicle 100 may travel along a linear target path P. FIG. 6B schematically shows how the work vehicle 100 may travel along a curved target path P. FIG. 6C schematically shows how the work vehicle 100 may travel along a target path P that contains two adjacent linear paths and a curved path interconnecting them. The target path P is previously set, and is recorded in the storage device 170. When the work vehicle 100 is traveling in the automatic steering mode, the controller 180 repeats an operation of calculating a deviation (or difference) between the position and orientation of the work vehicle 100 as measured by the positioning device 120 and the target path P and controlling the steering device so as to reduce this deviation. This causes the work vehicle 100 to travel along the target path P.

Figure 7:
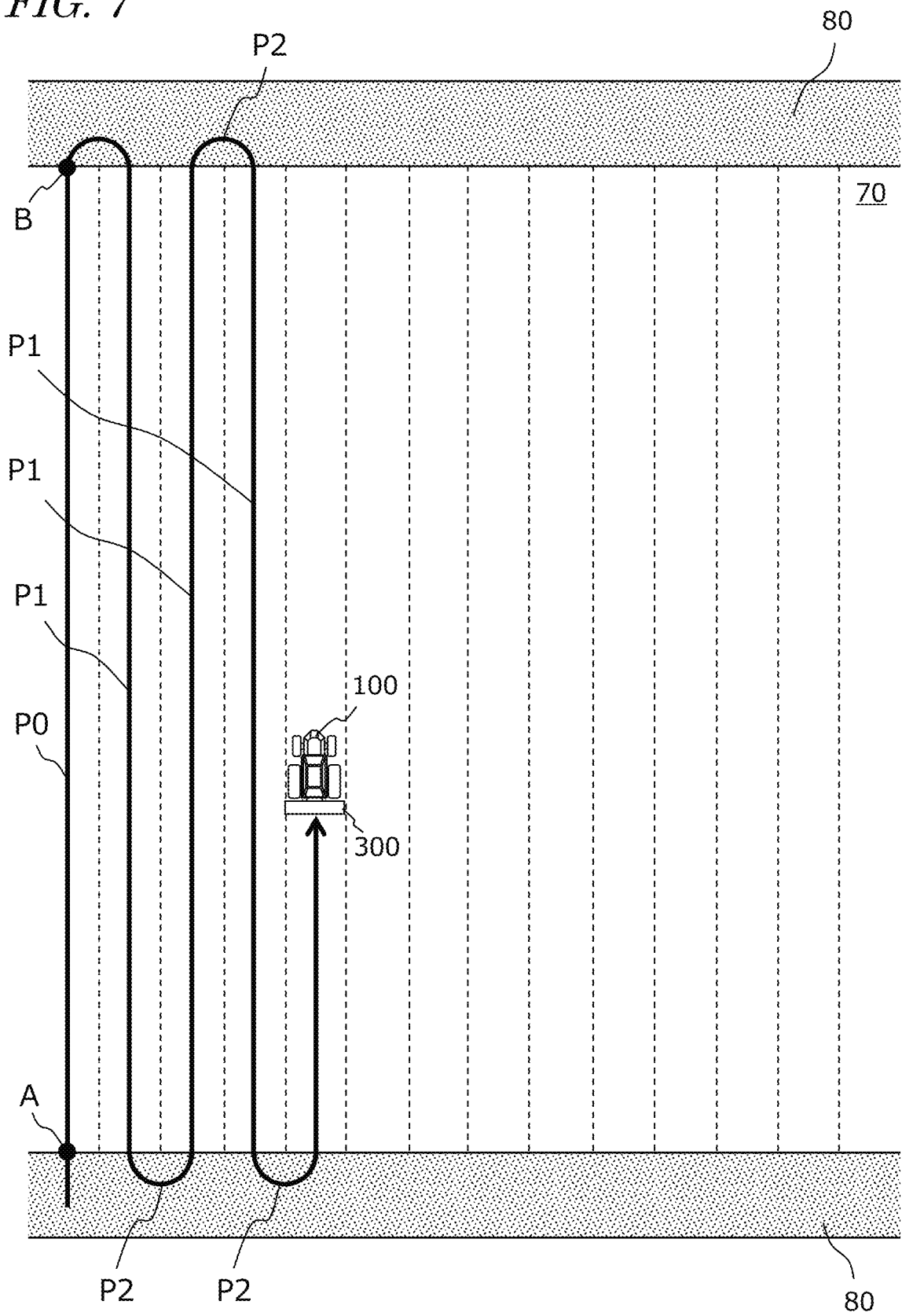
FIG. 7 is a diagram schematically showing an example of a target path of the work vehicle traveling in a field via automatic steering.

FIG. 7 is a diagram schematically showing an example of a target path of the work vehicle 100 traveling in the field via automatic steering. In this example, the field includes a work area 70 in which the work vehicle 100 and the implement 300 perform a task, and headlands 80 that are located near the outer peripheral edge of the field. Through a manipulation of the operational terminal 200, the user may designate which regions on the map of the field would correspond to the work area 70 and the headlands 80 in advance. The target path includes a plurality of parallel main paths P1 and a plurality of turning paths P2 interconnecting the plurality of main paths P1. The main paths P1 are located in the work area 70, whereas the turning paths P2 are located in the headlands 80. Broken lines in FIG. 7 depict the working breadth of the implement 300. The working breadth is previously set and recorded in the storage device 170. The working breadth may be set as the user manipulates the operational terminal 200, and recorded in the storage device 170. Alternatively, the working breadth may be automatically recognized when the implement 300 is connected to the work vehicle 100, and recorded to the storage device 170. The interval between the plurality of main paths P1 is matched to the working breadth. The target path, on the other hand, may be determined based on the user's manipulation, before auto-steer driving is begun.

An example of a method of setting the target path is described. First, the user manipulates the operational terminal 200 to register a start point A and an end point B that are located at ends (e.g., boundaries between the headlands 80 and the work area 70) of the field. For example, the user may manually drive the work vehicle 100 so as to cause the work vehicle 100 to travel from the start point A to the end point B. When the work vehicle 100 is located at the start point A and the end point B, the user may press a registration button that is displayed on the operational terminal 200, as a result of which the start point A and the end point B become registered. Once this manipulation has been performed, the controller 180 determines a guidance line P0 extending from the start point A to the end point B. Although FIG. 7 illustrates the guidance line P0 as a straight line, a curve may be adopted as the guidance line. Based on the working breadth of the implement 300 that is previously recorded in the storage device 170, the controller 180 determines a plurality of main paths P1 that are arranged at equal intervals from the guidance line P0, and a plurality of turning paths P2 interconnecting such main paths P1. As a result, the target path is determined. The target path may be determined so as to cover the entire work area 70 in the field, for example. Note that the target path may be set as the user manipulates the operational terminal 200, without causing the work vehicle 100 to travel via manual driving. For example, the target path may be set at the same time as registering the work area 70 and the headlands 80.

In the present preferred embodiment, not only the travel in the work area 70 but the turns at the headlands 80 can also be performed via automatic steering. A previously-recorded sequence of operations may be designated so as to be executed by the work vehicle 100 when turning at the headlands 80. A program defining this sequence of operations is referred to as the "operation sequence". The operation sequence is set by the user, and recorded in the storage device 170. When the work vehicle 100 turns along a turning path via automatic steering, the controller 180 causes the work vehicle 100 to execute the sequence of operations in accordance with the previously-recorded operation sequence. Respectively different operation sequences may be recorded when beginning a headland turn at an end of a main path P1 (upon "field-out"), and when finishing the headland turn and beginning to travel along the next main path P1 (upon "field-in"). As the operation sequence, the following example operations may be recorded:

raising/lowering three-point link
    turning PTO rotation ON/OFF
    turning locking differential ON/OFF
    switching between 4WD/2WD
    increasing/decreasing engine revolutions
    switching transmission The control system 160 functions as a headland management system (Headland Management System: HMS) to manage the sequence of operations to be executed during a headland turn. The sequence of operations may include a first operation to be performed at the beginning of a turn and a second operation to be performed at the finish of a turn. The first operation may include at least one of the operations of raising the implement 300 that is linked to the work vehicle 100, suspending output of motive power to the implement 300, disabling the locking differential function of the work vehicle 100, switching from the two-wheel drive mode to the four-wheel drive mode, and lowering the engine revolutions of the work vehicle 100. The second operation may include at least one of the operations of lowering the implement 300, starting output of motive power to the implement 300, starting the locking differential function; switching from the four-wheel drive mode to the two-wheel drive mode, and increasing the engine revolutions. The controller 180 can cause a setting screen to be displayed on the display device, on which the user is able to set the contents of the sequence of operations. The controller 180 causes the storage device 170 to store an operation sequence that is based on the contents of the sequence of operations having been set.

Recording of the operation sequence may be performed, before beginning auto-steer driving, together with an operation of setting the target path. Hereinafter, with reference to FIGS. 8A to 8F, an example flow of an operation of recording a target path and an operation sequence will be described.

Figure 8A:
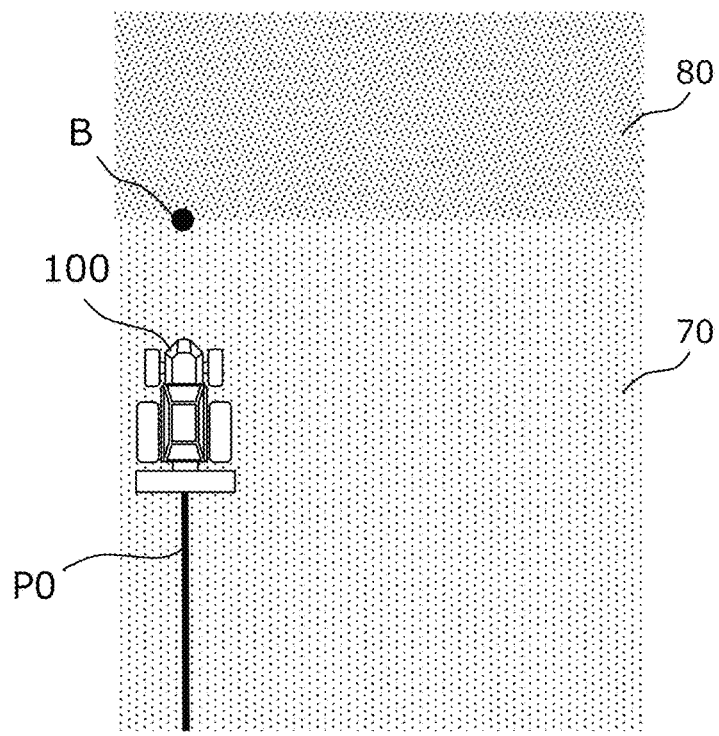
FIG. 8A is a first diagram for describing a flow of an operation of recording a target path and an operation sequence.
Figure 8B:
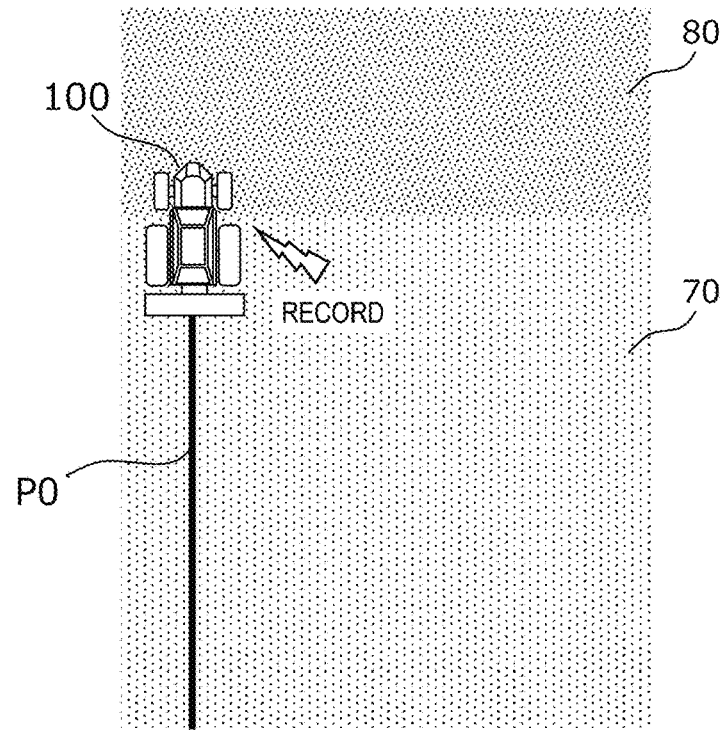
FIG. 8B is a second diagram for describing a flow of an operation of recording a target path and an operation sequence.
Figure 8C:
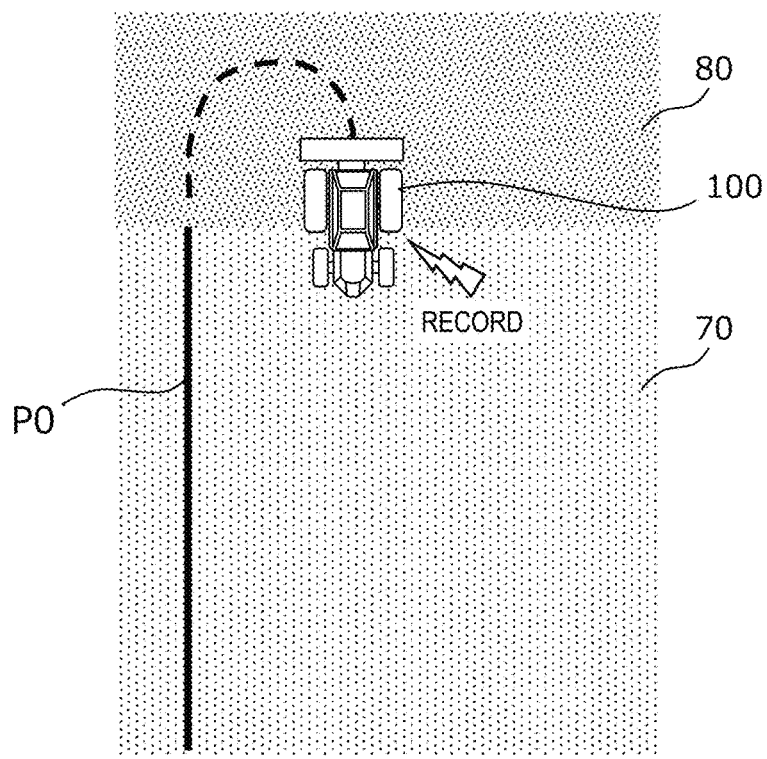
FIG. 8C is a third diagram for describing a flow of an operation of recording a target path and an operation sequence.
Figure 8D:
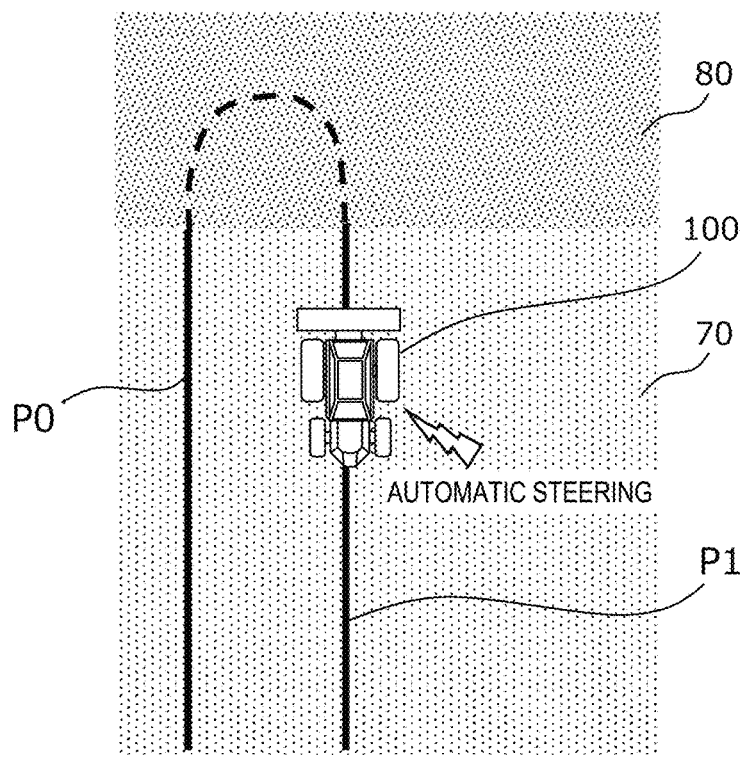
FIG. 8D is a fourth diagram for describing a flow of an operation of recording a target path and an operation sequence.
Figure 8E:
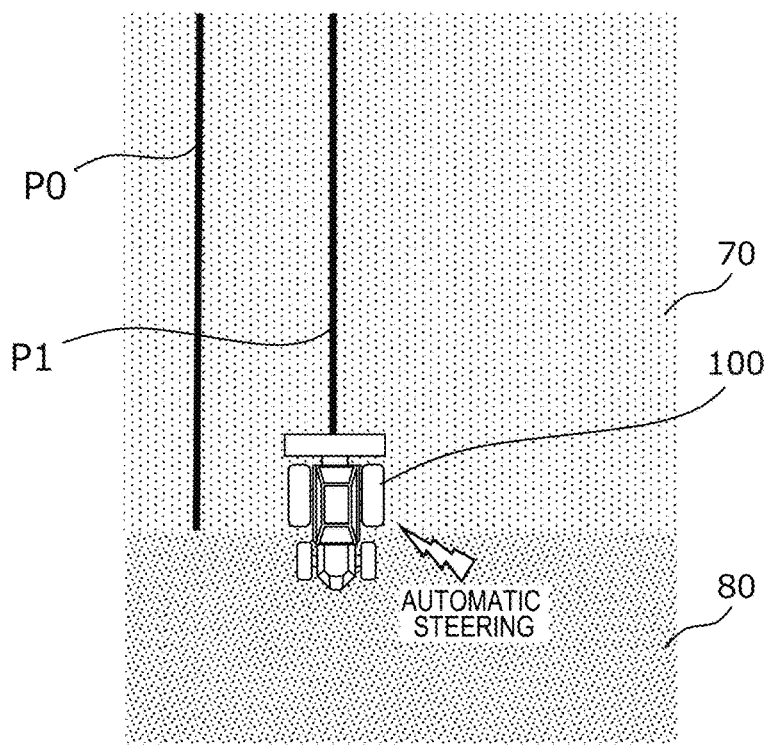
FIG. 8E is a fifth diagram for describing a flow of an operation of recording a target path and an operation sequence.
Figure 8F:
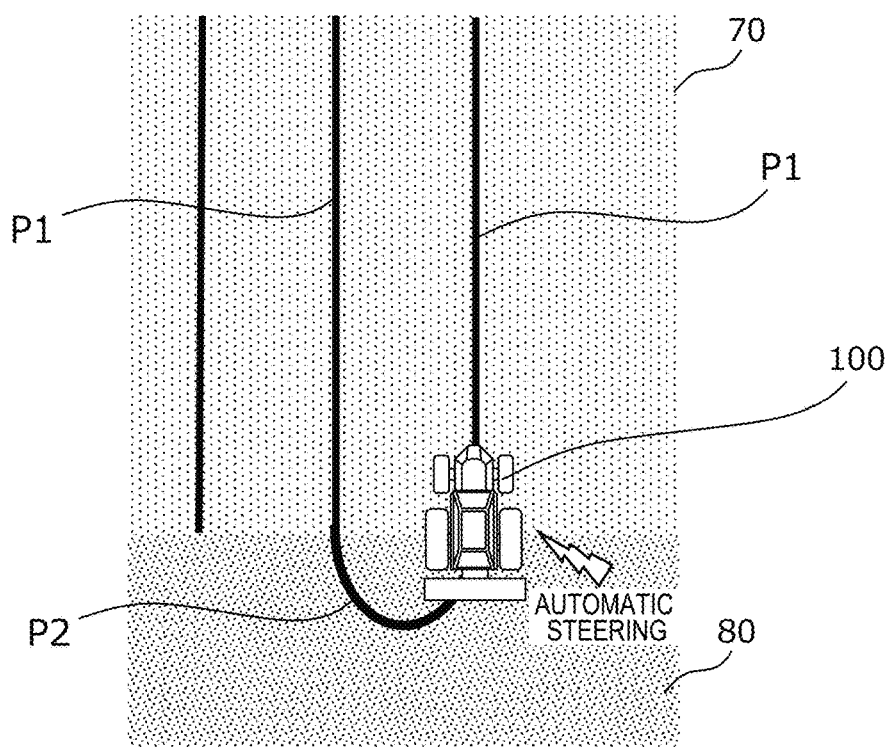
FIG. 8F is a sixth diagram for describing a flow of an operation of recording a target path and an operation sequence.

FIG. 8A illustrates a situation where the work vehicle 100 is traveling in the work area 70 of the field via manual driving. At this moment, the start point A as shown in FIG. 7 is already registered, and the user manually drives the work vehicle 100 toward the end point B of the guidance line P0. When the work vehicle 100 arrives at the end point B as shown in FIG. 8B, the user manipulates the operational terminal 200 to register the end point B. Furthermore, in order to begin a turn, for example, the user may perform manipulations such as raising the three-point link, turning PTO rotation OFF, turning the locking differential OFF, and/or lowering the engine revolutions, and manipulates the operational terminal 200 to record this sequence of operations. Thereafter, the user manually drives the work vehicle 100 so as to turn. FIG. 8C illustrates a situation where the work vehicle 100 has finished turning and returns from the headland 80 to the work area 70. At this time, in order to restart work, for example, the user may perform manipulations such as lowering the three-point link, turning PTO rotation ON, turning the locking differential ON, and/or increasing the engine revolutions, and manipulates the operational terminal 200 to record this sequence of operations. Thereafter, the user manipulates the operational terminal 200 to switch from the manual steering mode to the automatic steering mode. Then, as shown in FIG. 8D, the work vehicle 100 begins to travel along a main path P1 in the target path via automatic steering. During travel via automatic steering, the user can adjust the speed of the work vehicle 100 by manually manipulating the accelerator and brakes. Also, when the work vehicle 100 is traveling at the desired speed, the user can manipulate the operational terminal 200 to cause that speed to be recorded in the storage device 170. After recording, the user may turn the cruise control function ON to cause the work vehicle 100 to automatically travel at the recorded speed. After the state of FIG. 8D, when the work vehicle arrives at the opposite headland 80 as illustrated in FIG. 8E, the controller 180 of the work vehicle 100 reproduces the recorded "field-out" operation sequence to automatically execute the recorded sequence of operations, thus causing the work vehicle 100 to automatically perform a headland turn. Once the turn is completed, as shown in FIG. 8F, the controller 180 reproduces the recorded "field-in" operation sequence to automatically execute the recorded sequence of operations, thus beginning auto-steer driving along the next main path P1. Thereafter, by repeating similar operations, the work vehicle 100 reciprocates in the field along the target path via automatic steering, until reaching the final end of the field.

Next, an example control by the controller 180 during automatic steering will be described.

Figure 9:
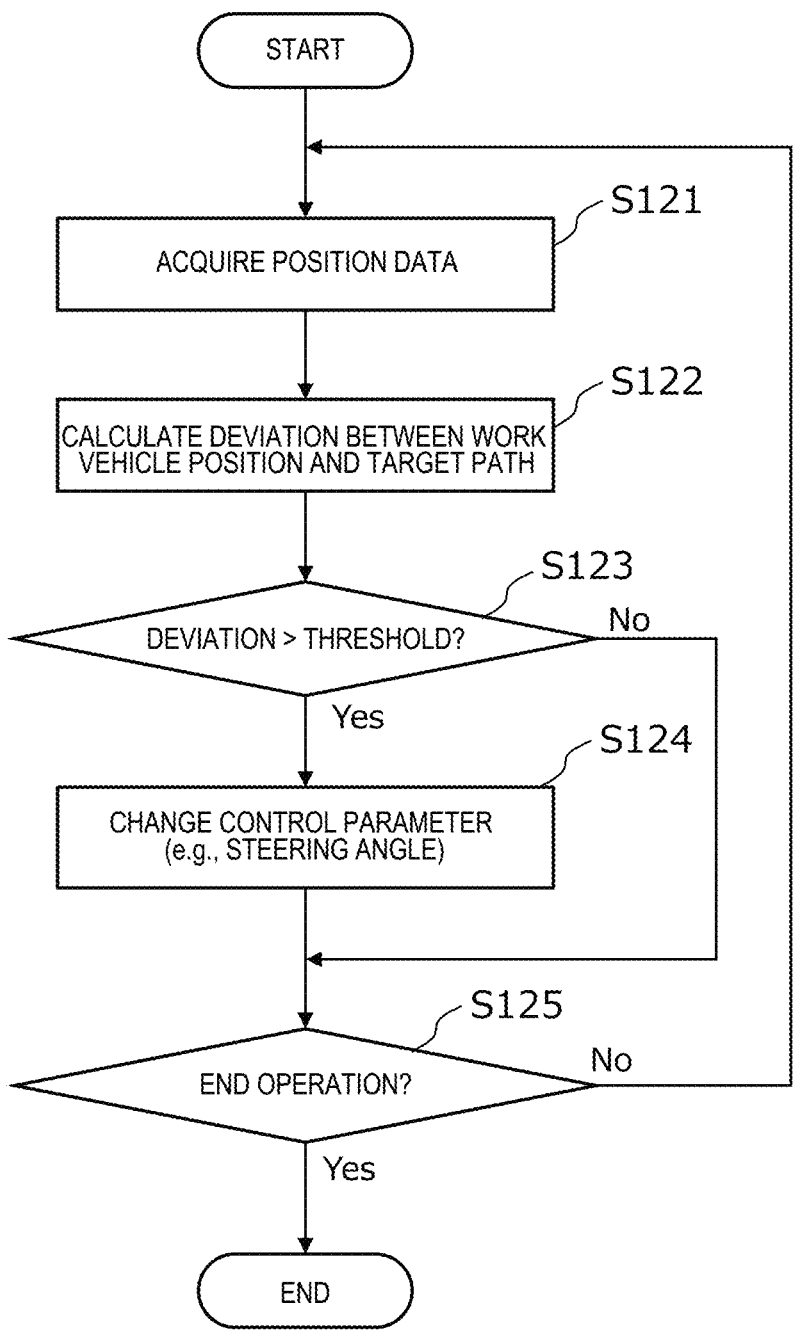
FIG. 9 is a flowchart showing an example operation to be performed by a controller during automatic steering.

FIG. 9 is a flowchart showing an example operation to be performed by the controller 180 during automatic steering. During travel of the work vehicle 100, the controller 180 performs auto-steer driving by performing the operation from steps S121 to S125 shown in FIG. 9. First, the controller 180 acquires data representing the position of the work vehicle 100 that is generated by the positioning device 120 (step S121). Next, the controller 180 calculates a deviation between the position of the work vehicle 100 and the target path (step S122). The deviation represents the distance between the position of the work vehicle 100 and the target path at that moment. The controller 180 determines whether the calculated deviation in position exceeds the previously-set threshold or not (step S123). If the deviation exceeds the threshold, the controller 180 changes a control parameter of the steering device included in the drive device 140 so as to reduce the deviation, thus changing the steering angle (step S124). If the deviation does not exceed the threshold at step S123, the operation of step S124 is omitted. At the following step S125, the controller 180 determines whether a command to end operation has been received or not. The command to end operation may be given when the user has used the operational terminal 200 to instruct that the automatic steering mode be suspended, or when the work vehicle 100 has arrived at the destination, for example. If the command to end operation has not been issued, the control returns to step S121 and performs a similar operation based on a newly measured position of the work vehicle 100. The controller 180 repeats the operation from steps S121 to S125 until a command to end operation is given. The aforementioned operation is executed by the ECU 183 in the controller 180.

In the example shown in FIG. 9, the controller 180 controls the drive device 140 based only on a deviation between the position of the work vehicle 100 as identified by the positioning device 120 and the target path. However, a deviation in terms of directions may further be considered in the control. For example, when a directional deviation exceeds a previously-set threshold, where the directional deviation is an angle difference between the orientation of the work vehicle 100 as identified by the positioning device 120 and the direction of the target path, the controller 180 may change the control parameter (e.g., steering angle) of the steering device of the drive device 140 in accordance with the deviation.

Hereinafter, with reference to FIGS. 10A to 10D, an example of steering control by the controller 180 will be described more specifically.

Figure 10A:
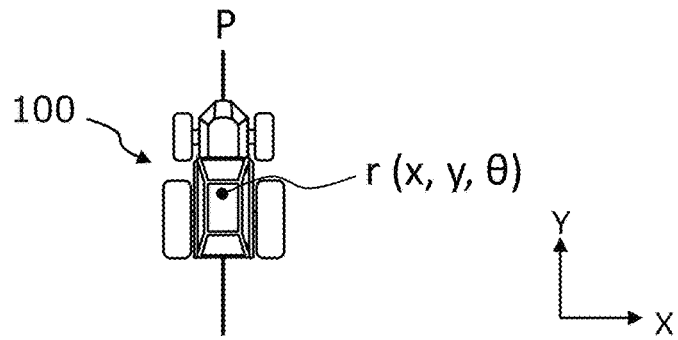
FIG. 10A is a diagram showing an example of a work vehicle that travels along a target path.
Figure 10B:
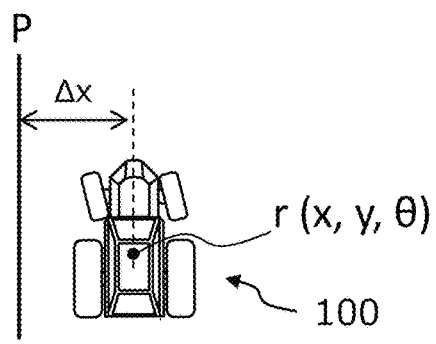
FIG. 10B is a diagram showing an example of a work vehicle at a position which is shifted rightward from the target path.
Figure 10C:
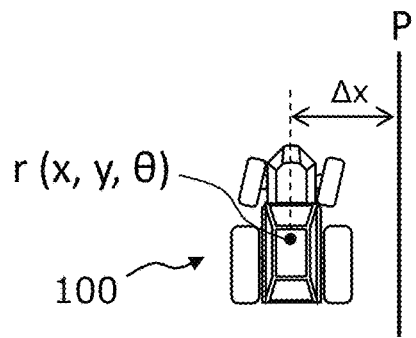
FIG. 10C is a diagram showing an example of a work vehicle at a position which is shifted leftward from the target path.
Figure 10D:
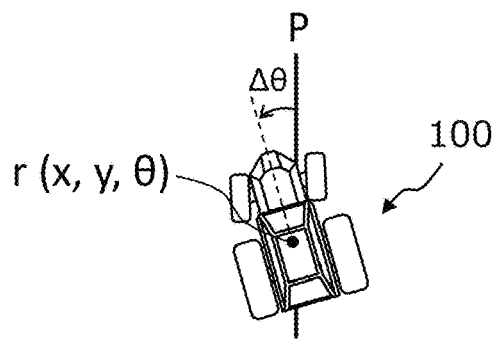
FIG. 10D is a diagram showing an example of a work vehicle which is oriented in an inclined direction with respect to the target path.

FIG. 10A is a diagram showing an example of a work vehicle 100 that travels along a target path P. FIG. 10B is a diagram showing an example of a work vehicle 100 at a position which is shifted rightward from the target path P. FIG. 10C is a diagram showing an example of a work vehicle 100 at a position which is shifted leftward from the target path P. FIG. 10D is a diagram showing an example of a work vehicle 100 which is oriented in an inclined direction with respect to the target path P. In these figures, the pose, i.e., the position and orientation, of the work vehicle 100 as measured by the positioning device 120 is expressed as r(x,y,θ). Herein, (x,y) are coordinates representing the position of a reference point on the work vehicle 100, in an XY coordinate system which is a two-dimensional coordinate system being fixed to the globe. In the examples shown in FIGS. 10A to 10D, the reference point on the work vehicle 100 is at a position on the cabin where a GNSS antenna is disposed, but the reference point may be at any arbitrary position. θ is an angle representing the measured orientation of the work vehicle 100. Although the target path P is shown parallel to the Y axis in the examples illustrated in these figures, generally speaking, the target path P may not necessarily be parallel to the Y axis.

As shown in FIG. 10A, in the case where the position and orientation of the work vehicle 100 are not deviated from the target path P, the controller 180 maintains the steering angle and speed of the work vehicle 100 without changing them.

As shown in FIG. 10B, when the position of the work vehicle 100 is shifted rightward from the target path P, the controller 180 changes the steering angle by changing the angle of rotation of the steering wheel included in the drive device 140 so that the traveling direction of the work vehicle 100 will be inclined leftward, thus bringing the work vehicle 100 closer to the path P. Herein, not only the steering angle but also the speed may be changed. The magnitude of the steering angle may be adjusted in accordance with the magnitude of a positional deviation $\Delta x$, for example.

As shown in FIG. 10C, when the position of the work vehicle 100 is shifted leftward from the target path P, the controller 180 changes the steering angle by changing the angle of rotation of the steering wheel so that the traveling direction of the work vehicle 100 will be inclined rightward, thus bringing the work vehicle 100 closer to the path P. In this case, too, not only the steering angle but also the speed may be changed. The amount of change of the steering angle may be adjusted in accordance with the magnitude of the positional deviation $\Delta x$, for example.

As shown in FIG. 10D, in the case where the position of the work vehicle 100 is not considerably deviated from the target path P but its orientation is nonetheless different from the direction of the target path P, the controller 180 changes the steering angle so that the directional deviation $\Delta \theta$ will become smaller. In this case, too, not only the steering angle but also the speed may be changed. The magnitude of the steering angle may be adjusted in accordance with the magnitudes of the positional deviation $\Delta x$ and the directional deviation $\Delta \theta$, for example. For instance, the amount of change of the steering angle (which is in accordance with the directional deviation $\Delta \theta$) may be increased as the absolute value of the positional deviation $\Delta x$ decreases. When the positional deviation $\Delta x$ has a large absolute value, the steering angle will be changed greatly in order for the work vehicle 100 to return to the path P, so that the directional deviation $\Delta \theta$ will inevitably have a large absolute value. Conversely, when the positional deviation $\Delta x$ has a small absolute value, the directional deviation $\Delta \theta$ needs to become closer to zero. Therefore, it may be advantageous to introduce a relatively large weight (i.e., control gain) for the directional deviation $\Delta \theta$ in determining the steering angle.

For the steering control and speed control of the work vehicle 100, control techniques such as PID control or MPC (Model Predictive Control) may be applied. Applying these control techniques will make for smoothness of the control of bringing the work vehicle 100 closer to the target path P.

Note that, when an obstacle is detected by one or more obstacle sensors 130 during travel, the controller 180 may halt the work vehicle 100, or switch from the automatic steering mode to the manual steering mode. Alternatively, when an obstacle is detected, the controller 180 may control the drive device 140 so as to avoid the obstacle.

Next, an example operation where, in the automatic steering mode, an alarm is output when the work vehicle 100 has mistracked from the target path will be described.

When the work vehicle 100 is traveling in the automatic steering mode, if the position of the work vehicle 100 becomes deviated from the target path by a reference distance or more, the controller 180 in the present preferred embodiment causes the buzzer 220 and the display device of the operational terminal 200 to output an alarm. The buzzer 220 and the display device of the operational terminal 200 function as alarming devices (alarm generators). The display device displays an alarm indication (e.g., a pop-up notification) that the work vehicle 100 has mistracked from the target path. The buzzer 220 outputs an alarm sound. Through such an operation, the user can be notified that the work vehicle 100 has mistracked from the target path. The reference distance may be set to different values depending on whether the work vehicle 100 is traveling along a main path P1 or the work vehicle 100 is traveling along a turning path P2. In the following description, a reference distance corresponding to a main path P1 may be referred to as the "first reference distance", whereas a reference distance corresponding to a turning path P2 may be referred to as the "second reference distance". In an alternative arrangement, it may be possible for each of the first reference distance and the second reference distance to be individually set by the user manipulating the operational terminal 200.

Figure 11A:
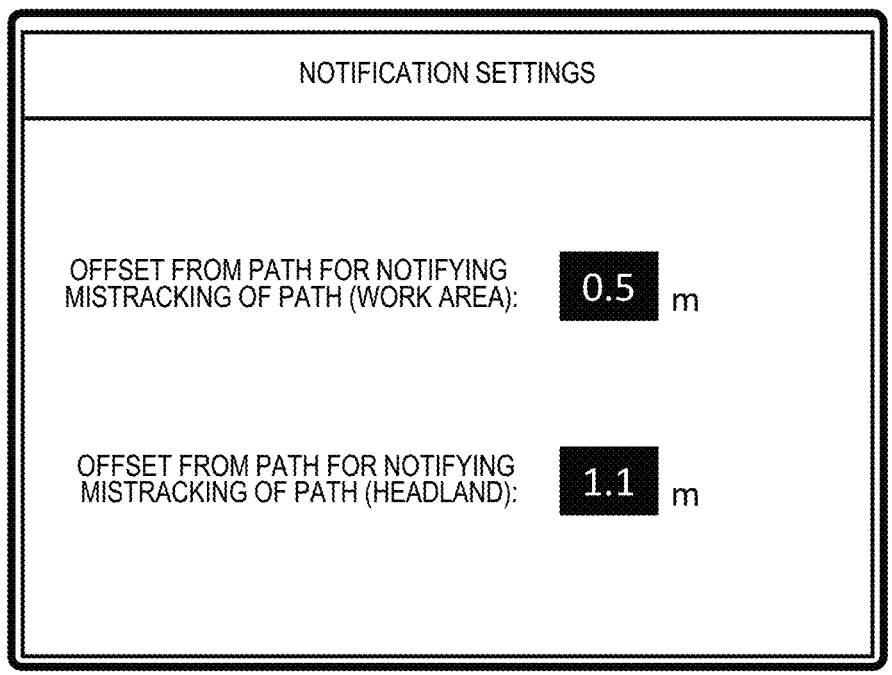
FIG. 11A is a diagram showing an exemplary setting screen concerning notifications on mistracking from the path.

FIG. 11A is a diagram showing an exemplary setting screen concerning notifications on mistracking from the path. In the example of FIG. 11A, reference distances (each expressed as "offset from path" in FIG. 11A) can be individually set for the work area 70 and for the headlands 80. In the setting screen displayed on the operational terminal 200 as illustrated in FIG. 11A, the user is able to set the respective reference distances. In the example of FIG. 11A, the first reference distance is set to 0.5 m, and the second reference distance is set to 1.1 m. The value of each reference distance can be arbitrarily changed within a predetermined range by the user.

Figure 11B:
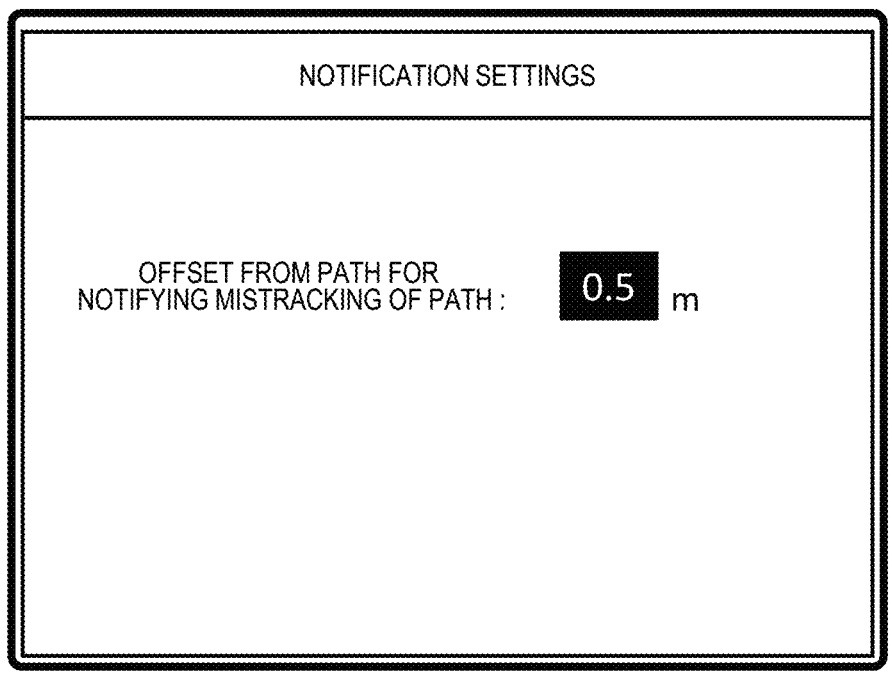
FIG. 11B is a diagram showing another exemplary setting screen concerning notifications on mistracking from the path.

FIG. 11B is a diagram showing another exemplary setting screen concerning notifications on mistracking from the path. In the example shown in FIG. 11B, the user is allowed to set one reference distance value. In other words, a common reference distance is to be set for the work area 70 and the headlands 80. Thus, the setting screen may be arranged so that one common reference distance is set for the work area 70 and the headlands 80.

In the present preferred embodiment, an alarm is output upon mistracking from the path, both while the work vehicle 100 is traveling in the work area 70 and while turning on the headlands 80. An alternative operation may be where an alarm is output upon mistracking from the path only while the work vehicle 100 is turning on the headlands 80, for example. On the headlands 80, the ground surface may be rough because of repetitive turns, which makes them more susceptible to mistracking from the path than is the work area 70. Moreover, since the headlands 80 are located near the outer peripheral edge of the field, the influence of mistracking of the work vehicle 100 from the target path on the headlands 80 is generally greater than in the work area 70. Therefore, valuable effects can be attained by an arrangement where an alarm is output upon mistracking from the path only while the work vehicle 100 is turning on the headlands 80.

The notification upon mistracking from the path may be made more than one time, i.e., multiple times. For example, after a certain amount of time has passed since an alarm was output from the alarming device (which in the present preferred embodiment may be the display device or the buzzer 220), if the position of the work vehicle 100 is still deviated from the target path (i.e., a main path or a turning path) by the reference distance or more, the controller 180 may cause the alarming device to output a second alarm having a higher alarming effect than that of the first alarm. For example, an alarm sound which is louder than the earlier-output alarm sound may be output by the buzzer 220. Alternatively, an alarm indication which is more eye-catching than the earlier-output alarm indication may be output by the display device.

Figure 12A:
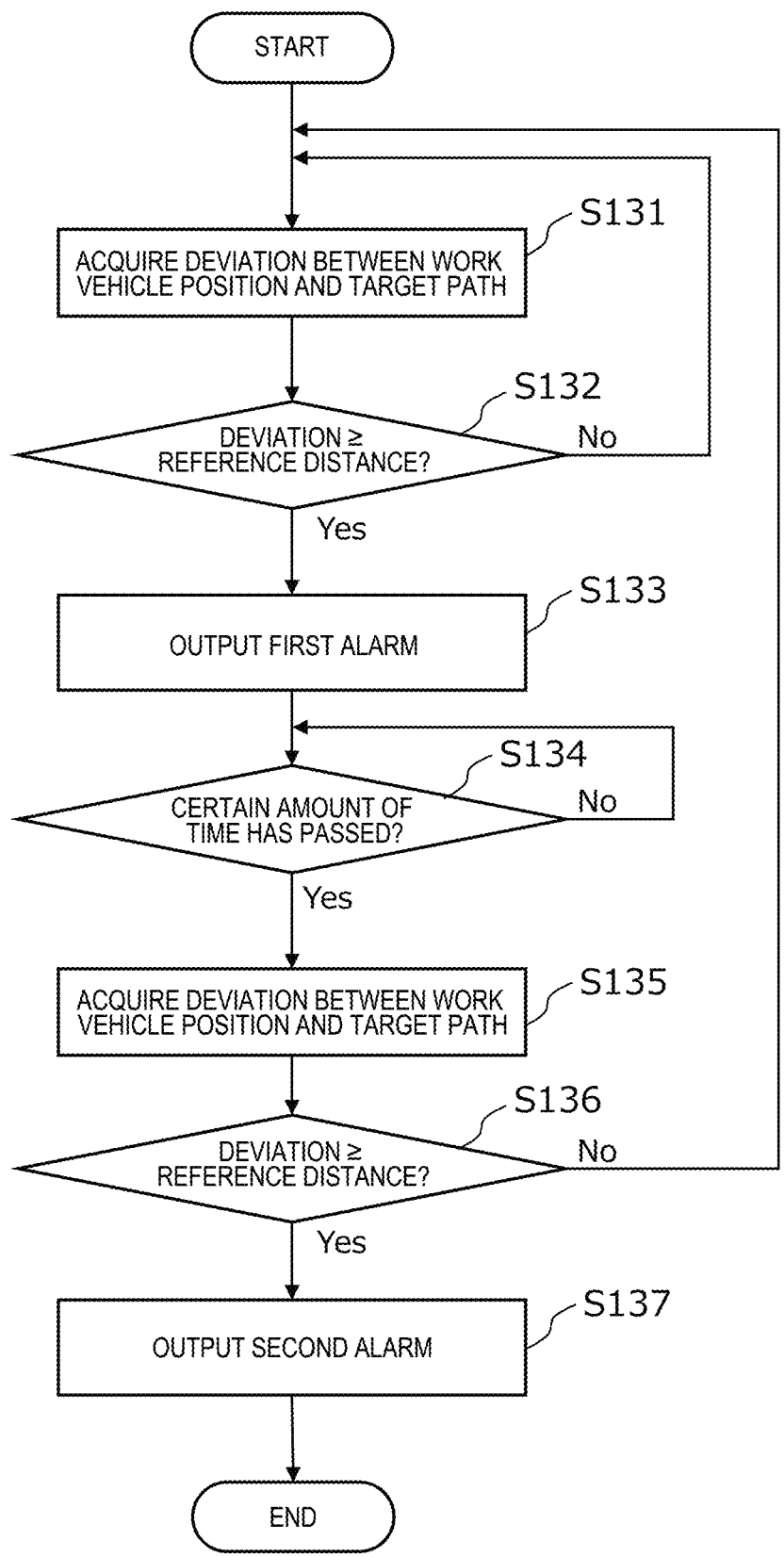
FIG. 12A is a flowchart showing an example operation where two alarms are output in response to mistracking from the path.

FIG. 12A is a flowchart showing an example operation where two alarms are output in response to mistracking from the path. In this example, first, the controller 180 acquires a deviation between the position of the work vehicle 100 and the target path (step S131). This step S131 represents the operation of acquiring the deviation value calculated at step S122 in FIG. 9. The controller 180 determines whether or not the deviation is greater than or equal to the reference distance (step S132). If the deviation is smaller than the reference distance, control returns to step S131. If the deviation is greater than or equal to the reference distance, the controller 180 causes the alarming device to output a first alarm (step S133). The first alarm may be an alarm sound from the buzzer 220 and/or a pop-up notification displayed on the display device, for example. After step S133, the controller 180 determines whether or not a certain amount of time (e.g., 2 seconds) which was previously set has passed (step S134). After the certain amount of time has passed, the controller 180 again acquires a deviation between the position of the work vehicle and the target path (step S135). The controller 180 determines whether or not the deviation is greater than or equal to the reference distance (step S136). If the deviation is smaller than the reference distance, control returns to step S131. If the deviation is greater than or equal to the reference distance, the controller 180 causes the alarming device to output a second alarm (step S137). The second alarm has a higher alarming effect than that of the first alarm. For example, a louder alarm sound, or a more eye-catching alarm indication may be output as a second alarm. The more eye-catching alarm indication may be a pop-up notification presented in a larger window, a pop-up notification in a lighter color, or a flickering pop-up notification, for example.

Figure 12B:
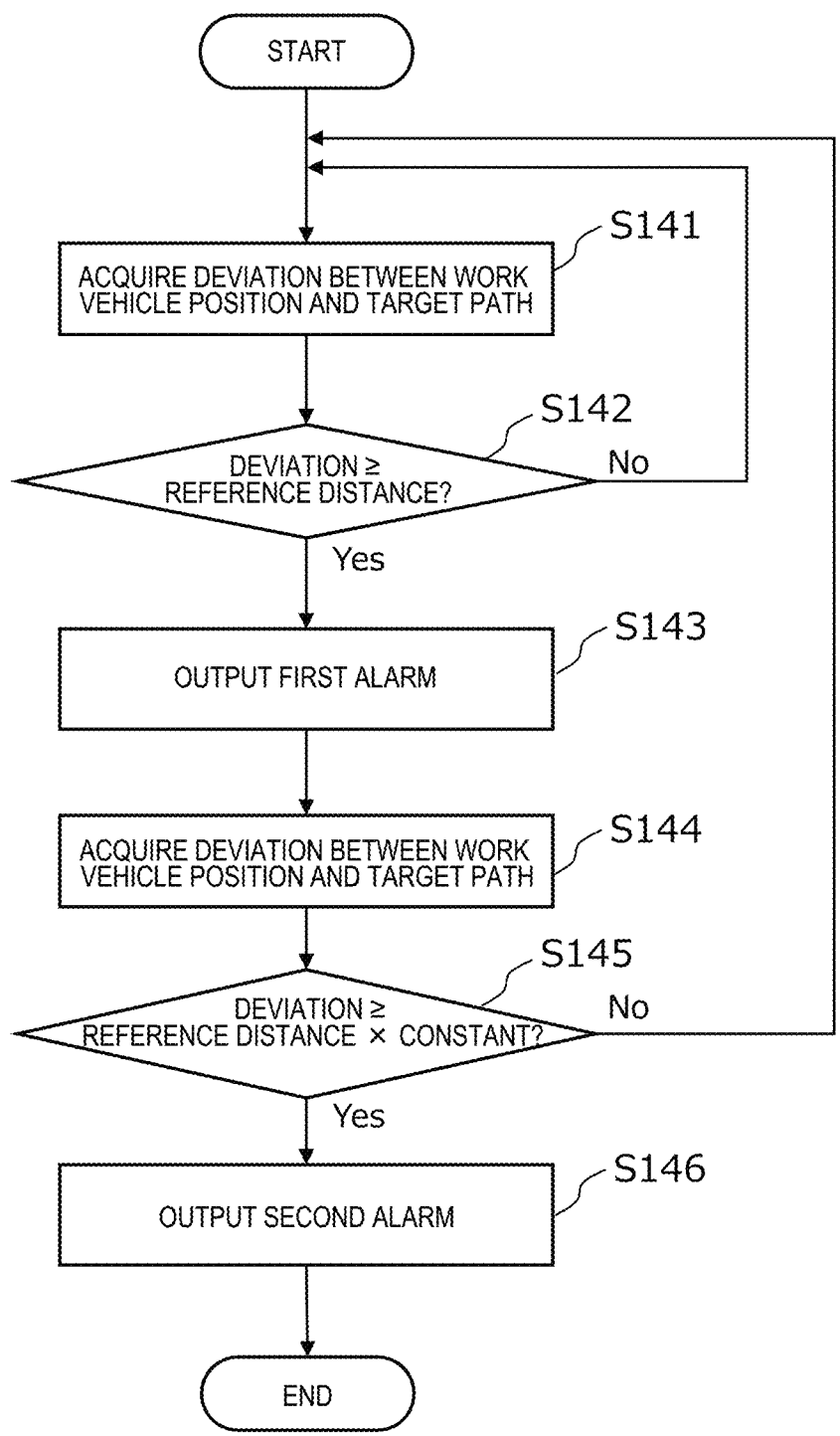
FIG. 12B is a flowchart showing another example of an operation of outputting two alarms in response to mistracking from the path.

FIG. 12B is a flowchart showing another example of an operation of outputting two alarms in response to mistracking from the path. In this example, after the controller 180 causes the alarming device to output a first alarm, if the position of the work vehicle 100 becomes deviated from the target path (i.e., a main path or a turning path) by a second reference distance that is larger than the aforementioned reference distance (which is referred to as the "first reference distance") or more, the controller 180 causes the alarming device to output a second alarm having a higher alarming effect than that of the first alarm. The second reference distance may be a value obtained by multiplying the first reference distance with a predetermined constant (e.g. 1.5) larger than 1. In the example of FIG. 12B, the controller 180 acquires a deviation between the position of the work vehicle 100 and the target path (step S141). The controller 180 determines whether or not the deviation is greater than or equal to the first reference distance (step S142). If the deviation is smaller than the first reference distance, control returns to step S141. If the deviation is greater than or equal to the reference distance, the controller 180 causes the alarming device to output a first alarm (step S143). The operations from steps S141 to S143 are respectively identical with the operations from steps S131 to S133 shown in FIG. 12A. After step S143, the controller 180 again acquires a deviation between the position of the work vehicle 100 and the target path (step S144). The controller 180 determines whether or not the deviation is greater than or equal to a value (second reference distance) obtained by multiplying the first reference distance with a predetermined constant (which is larger than 1; e.g. 1.5) (step S145). If the deviation is smaller than the second reference distance, control returns to step S141. If the deviation is greater than or equal to the second reference distance, the controller 180 causes a second alarm having a higher alarming effect than that of the first alarm to be output (step S146). Through the above operation, after the first alarm is output, if the work vehicle 100 has mistracked further from the target path, the second alarm with a higher alarming effect can be output.

In each of the above examples, when the position of the work vehicle 100 becomes deviated from the turning path by a reference distance or more, a notification via the buzzer 220 or the like is made, but the travel of the work vehicle 100 is continued. Without being limited to such an operation, when the position of the work vehicle 100 becomes deviated from the turning path by the reference distance or more, the controller 180 may make a notification via the buzzer 220, etc., and then halt the work vehicle 100. Alternatively, in the example illustrated in FIG. 12A or 12B, the travel may be continued when outputting a first alarm, and the work vehicle 100 may be halted when outputting a second alarm. The control may be arranged so that a reference distance in the case of outputting an alarm and a reference distance in the case of halting the work vehicle 100 can be individually set. By halting the work vehicle 100 when the work vehicle 100 has mistracked from the target path, a further mistracking from the target path can be avoided. Note that three or more alarms may be output in response to mistracking from the path.

Next, an example of a pop-up notification to be displayed on the display device of the operational terminal 200 will be described.

Figure 13A:
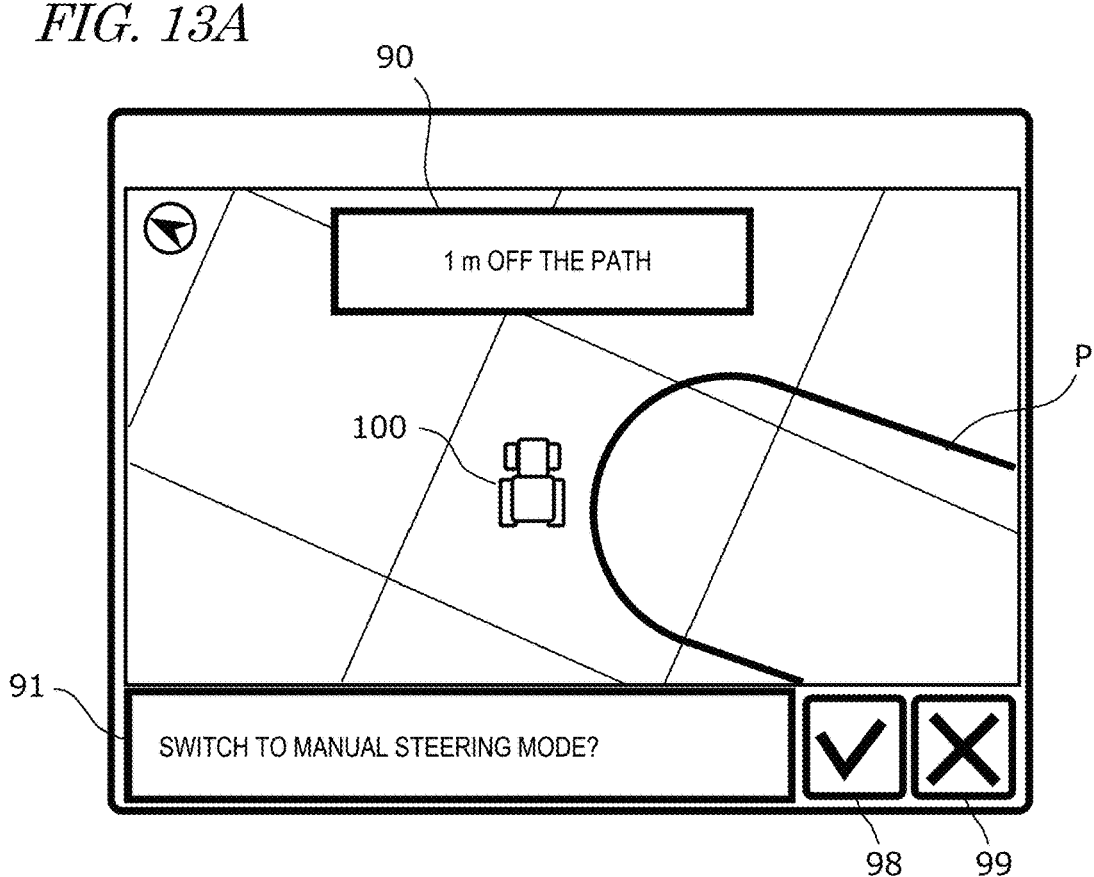
FIG. 13A is a diagram showing an example of a pop-up notification to be displayed upon mistracking from the path.

FIG. 13A is a diagram showing an example of a pop-up notification to be displayed upon mistracking from the path. When the work vehicle 100 is traveling via automatic steering, as shown in FIG. 13A, a map of the field containing the work vehicle 100 and the target path P is displayed on the display device of the operational terminal 200. If the work vehicle 100 becomes deviated from the target path P by a reference distance or more, a beep sound is output from the buzzer 220 as an alarm sound, and a pop-up notification 90 is displayed as shown in FIG. 13A. The pop-up notification 90 may contain a message such as "1 m OFF THE PATH", for example. In the example of FIG. 13A, in addition to the pop-up notification 90, a pop-up notification 91 containing an indication to ask the user whether or not to switch from the automatic steering mode to the manual steering mode is also displayed. By pressing a button 98 that is displayed in the lower right corner of the screen, the user is able to switch from the automatic steering mode to the manual steering mode. By pressing a button 99 that is displayed to the right of the button 98, the user is able to continue the automatic steering mode.

Figure 13B:
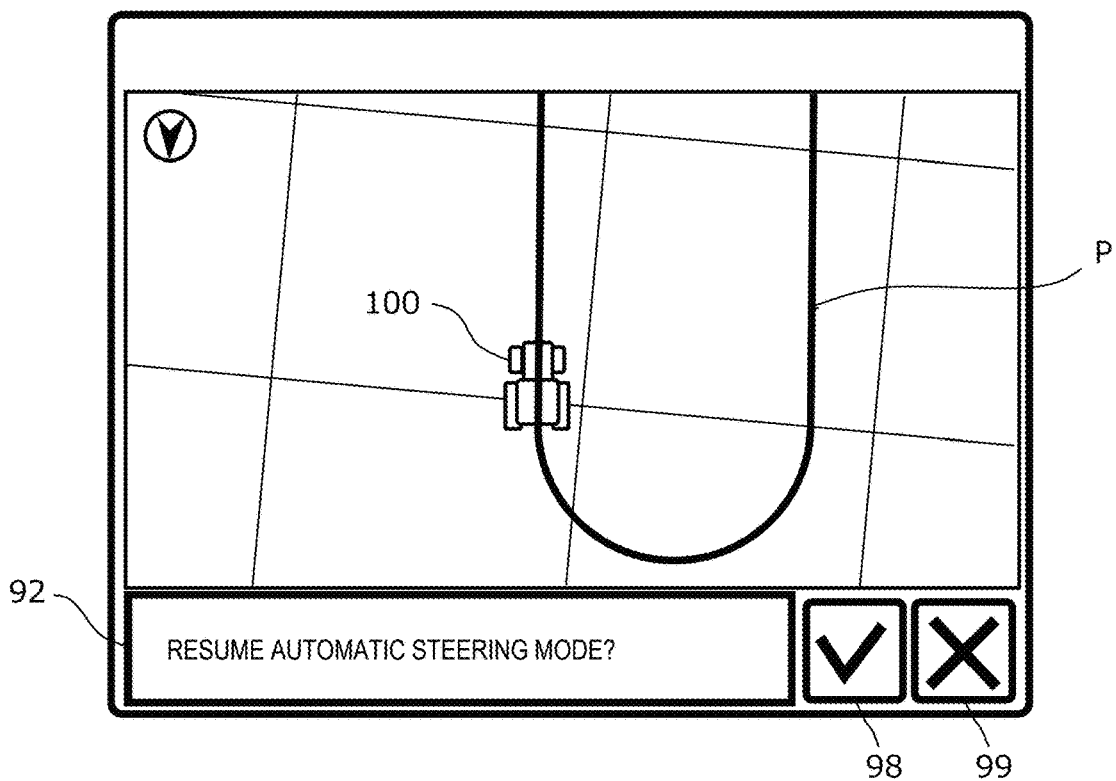
FIG. 13B is a diagram showing an example of a display screen in a state where, after switching to a manual steering mode, the user's driving has properly placed the work vehicle onto the target path.

FIG. 13B is a diagram showing an example of the display screen in a state where, after switching to the manual steering mode, the user's driving has properly placed the work vehicle 100 onto the target path P. In this example, the controller 180 causes the display device to display a pop-up notification 92 to ask the user whether or not to resume the automatic steering mode after a turn in the manual steering mode is completed. When the user presses the button 98, in response to that manipulation, the controller 180 resumes the automatic steering mode. When the user presses the button 99, the manual steering mode is continued.

When the work vehicle 100 enters a turning path via automatic steering, the case may be either that the cruise control function is enabled (i.e., the controller 180 is automatically controlling speed) or that the user is manually controlling speed. If the work vehicle 100 enters a turning path while the cruise control function is enabled and mistracking from the path occurs, and if the user switches from the automatic steering mode to the manual steering mode following the pop-up notification 91, the controller 180 may resume the automatic steering mode after the turn in the manual steering mode is completed, with the cruise control function still being enabled. Through such an operation, the cruise control is continued without the user having to perform a manipulation of re-enabling the cruise control function such that increased convenience can be provided.

In the present preferred embodiment, the pop-up notification 90 is displayed on the operational terminal 200 when the work vehicle 100 mistracks from the target path P; however, this function may be omitted. In that case, if mistracking from the path occurs, only an alarm sound from the buzzer 220 is output as an alarm. In this scenario, too, the user can readily notice the mistracking from the path because of the alarm sound from the buzzer 220. In implementations where an alarm sound from an audio output device such as the buzzer 220 or a loudspeaker is output as an alarm, the user can notice mistracking from the path without having to watch the screen of the display device. Since the user may not always be watching the screen, causing the audio output device to output an alarm sound allows the user to notice mistracking from the path more promptly.

In each of the above examples, when the deviation between the position of the work vehicle 100 and the target path becomes greater than or equal to the reference distance, the controller 180 causes the alarming device, e.g., the buzzer 220, to output an alarm. In addition to such an operation, when the work vehicle 100 has a high likelihood of deviating greatly from the target path, the controller 180 may decelerate the work vehicle 100 and/or notify the user. For example, before causing the alarming device to output the aforementioned alarm, the controller 180 may perform an operation of causing the alarming device to output another alarm and/or an operation of decelerating the work vehicle 100, if at least one of the following has exceeded its respective threshold: a change rate over time of the deviation between the position of the work vehicle 100 and the turning path during a turn; the magnitude of an acceleration of the work vehicle 100; a change rate of the pitch angle of the work vehicle 100 over time; and a change rate of the roll angle of the work vehicle 100 over time. Through such an operation, when the work vehicle 100 has a high likelihood of mistracking from the target path, it is easier to prevent mistracking.

When causing the alarming device to output an alarm, the controller 180 may cause the storage device 170 to store the turning path. The next time the work vehicle 100 travels along another turning path that is adjacent to this turning path, the controller 180 may perform an operation of causing the alarming device to output another alarm and/or an operation of decelerating the work vehicle 100, before arriving at this other adjacent turning path. When the work vehicle 100 deviates greatly from an intended turning path, there is a high possibility that the ground surface is rough around that turning path. The next time when traveling along an adjacent turning path that is located in that neighborhood, having recorded the turning path which is located at such a rough headland and making an advance notification or a deceleration before turning allows a turn at the rough headland to be made more smoothly.

Thus, according to the present preferred embodiment, if mistracking from the path occurs when the work vehicle 100 is turning via automatic steering, the user can be promptly notified. This allows for a quick execution of an operation where the user returns the work vehicle 100 to the target path via manual driving, for example. This can solve problems such as the work vehicle 100 straying out of the field, or a long time having elapsed before returning to the target path, for example. Moreover, this allows the user to notice early on if the accuracy of automatic steering that is required by the user fails to be satisfied.

Preferred Embodiment 2

Next, a second illustrative preferred embodiment of the present disclosure will be described.

The work vehicle 100 according to the present preferred embodiment controls its speed in accordance with the curvature of the turning path when turning along a turning path via automatic steering. As a result, even if the curvature of the turning path is large, the work vehicle 100 can be prevented from mistracking from the turning path. The work vehicle 100 according to the present preferred embodiment is identical in configuration to the work vehicle 100 according to Preferred Embodiment 1. Differences from Preferred Embodiment 1 will mainly be described below, while omitting the description of some overlapping aspects.

Figure 14A:
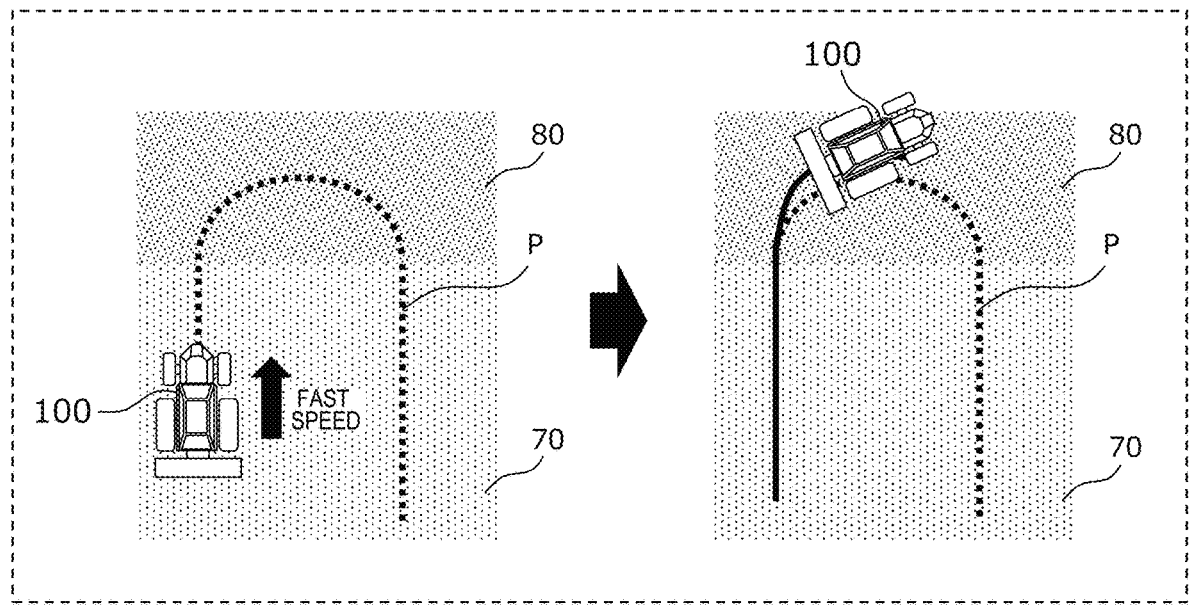
FIG. 14A is a diagram showing an example of mistracking from the target path that may occur when the work vehicle turns at a fast speed.

FIG. 14A is a diagram showing an example of mistracking from the target path P that may occur when the work vehicle 100 turns at a fast speed. In general, a turning path has a large curvature (that is, a small radius of curvature). Therefore, when the work vehicle 100 turns at a fast speed in a headland 80, depending on the turning performance of the work vehicle, a delay in control or the like may cause the work vehicle 100 to deviate from the intended turning path. In the right illustration of FIG. 14A, an actual travel path of the work vehicle 100 is exemplified by a solid-line curve. When such mistracking occurs, the work vehicle 100 may stray out of the field during the turn, or some time may elapse before it can return to the intended path.

Figure 14B:
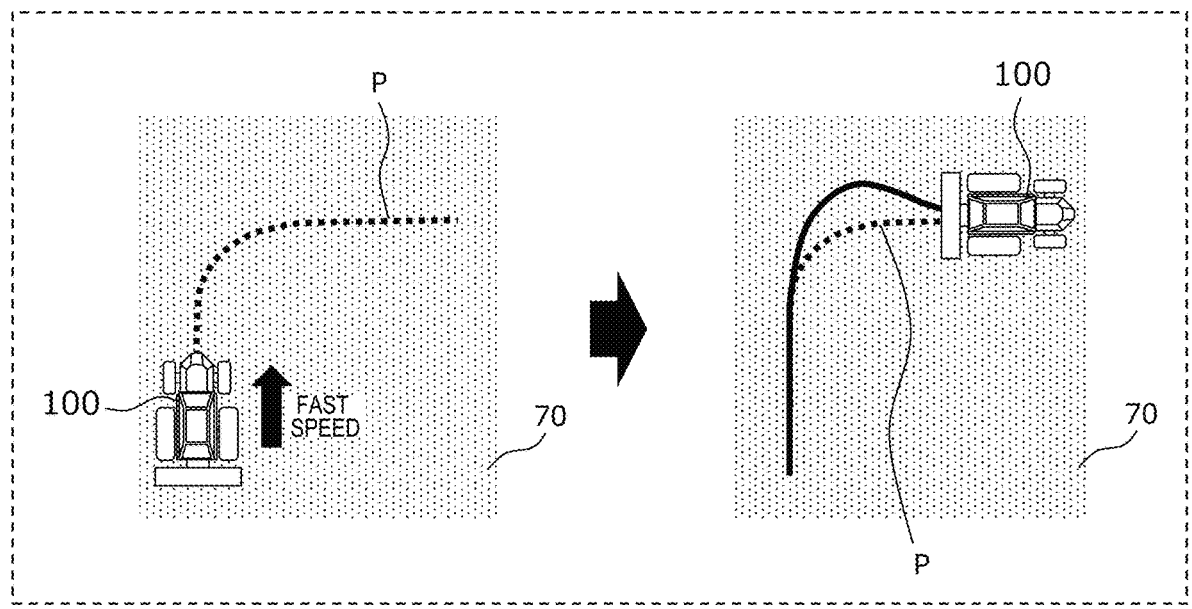
FIG. 14B is a diagram showing an example of mistracking from the target path that may occur when the work vehicle travels at a fast speed along a main path that includes a sharp curve in a work area.

The aforementioned problem may occur not only in connection with a turning path, but also in the case where the main path includes a sharp curve. FIG. 14B is a diagram showing an example of mistracking from the target path P that may occur when the work vehicle 100 travels at a fast speed along a main path that includes a sharp curve in the work area 70. As shown in the right illustration of FIG. 14B, the work vehicle 100 may deviate greatly from the target path P. If such mistracking from the target path P occurs, some sites may be redundantly worked on ("redundant working"), while other sites may not be adequately worked on ("inadequate working"), and thus redoing of such work may be needed.

Therefore, in the present preferred embodiment, in the automatic steering mode, the controller 180 controls the speed of the work vehicle 100 in accordance with the curvature of the target path P. For example, as the curvature of the target path P increases (i.e., as the radius of curvature decreases), the controller 180 may lower the speed of the work vehicle 100. Through such control, when turning in a headland, for example, the work vehicle 100 can be prevented from mistracking from the intended turning path. Moreover, even when the target path P includes a sharp curve(s) in the work area 70, redundant working or inadequate working on such sites can be reduced.

Hereinafter, a specific example of speed control in the present preferred embodiment will be described. In the following, an example of controlling the speed of the work vehicle 100 based on the radius of curvature of the target path will be described. Instead of the radius of curvature, an inverse thereof (i.e., curvature) may be calculated, and the speed of the work vehicle 100 may be controlled based on the curvature.

First, a method of calculating the radius of curvature will be described.

Figure 15:
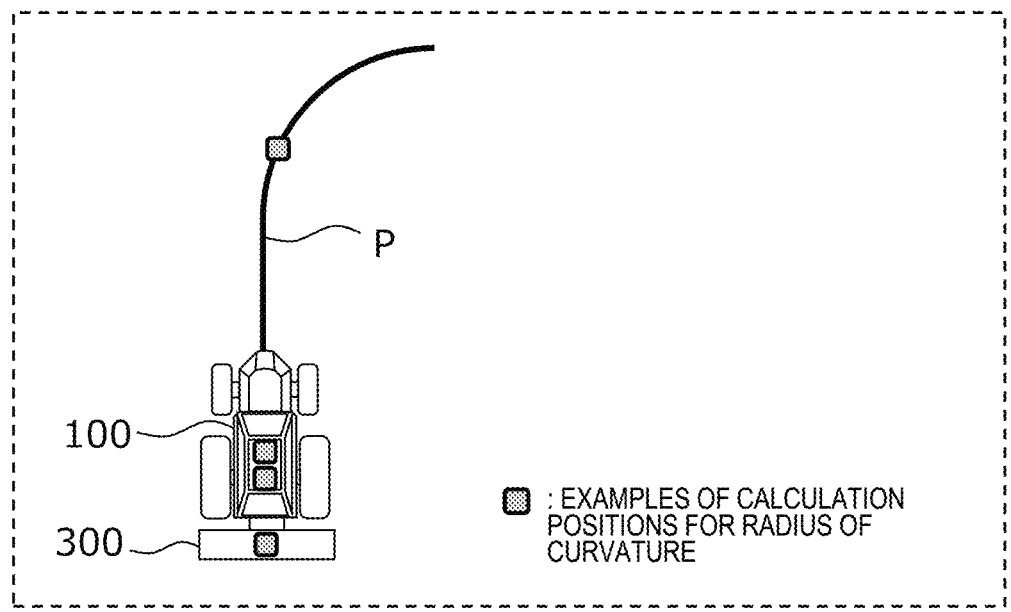
FIG. 15 is a diagram showing example positions for calculating a radius of curvature.

FIG. 15 is a diagram showing example positions for calculating a radius of curvature. The radius of curvature may be calculated with respect to the position of the reference point of the work vehicle 100 serving as a reference of steering control, or a position which is a predetermined distance (e.g., a few meters or so) ahead of that position, for example. The position of the reference point may be a position at which the GNSS antenna of the positioning device 120 is disposed, the center position of the rear wheel axis, or the center position of the implement 300, for example. In the case where a position which is a predetermined distance ahead of the reference point is adopted as a position for calculating the radius of curvature, the predetermined distance may be a fixed value, or the predetermined distance may be varied in accordance with the speed of the work vehicle 100.

Figure 16:
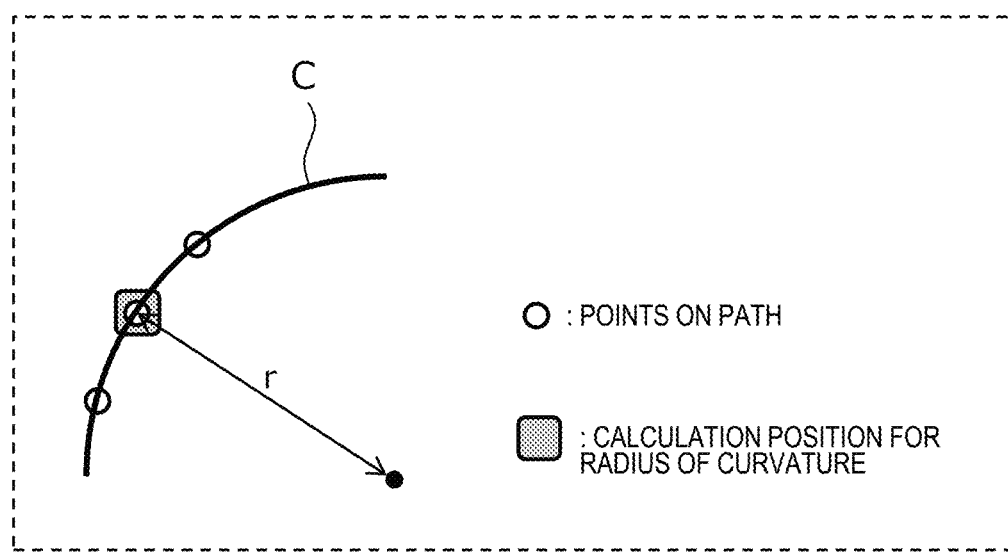
FIG. 16 is a diagram showing an example method of calculating a radius of curvature.

FIG. 16 is a diagram showing an example method of calculating a radius of curvature. The radius of curvature can be calculated by determining three points on the target path (including any of the calculation positions shown in FIG. 15 and two other points in its neighborhood), and determining a circle that passes through these three points. For example, assuming respective coordinates $(x_1,y_1)$, $(x_2,y_2)$ and $(x_3,y_3)$ of the three points, center coordinates $(a,b)$ of the circle, and a radius r, then, the center coordinates $(a,b)$ and the radius r of the circle can be determined by solving the following simultaneous equations.

$$(x_1-a)^2+(y_1-b)^2=r^2$$

$$(x_2-a)^2+(y_2-b)^2=r^2$$

$$(x_3-a)^2+(y_3-b)^2=r^2$$

The controller 180 calculates the radius of curvature to be the radius r.

Next, a specific example of an operation of restricting the speed of the work vehicle 100 in accordance with the radius of curvature is described.

Figure 17:
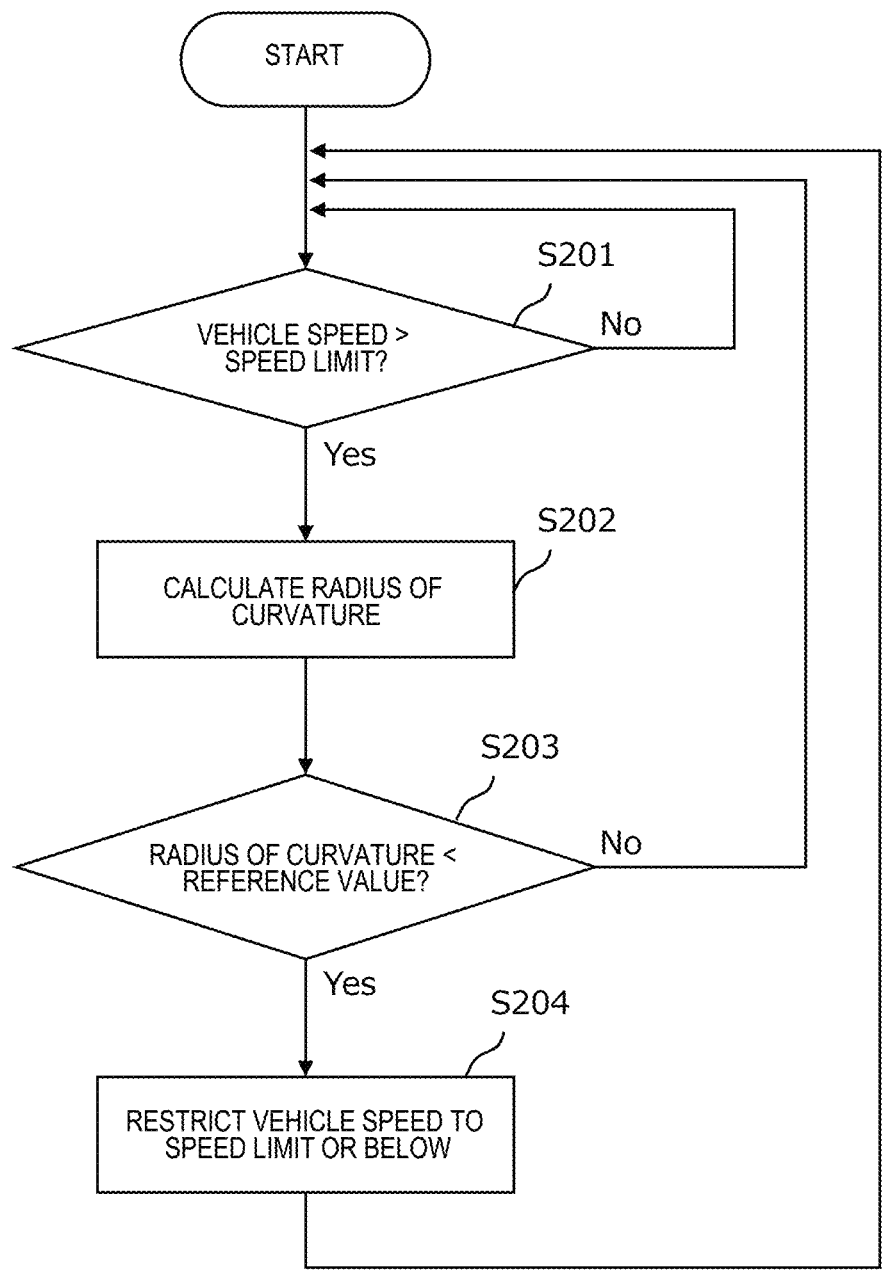
FIG. 17 is a flowchart showing a first example of an operation of restricting the speed of the work vehicle in accordance with the radius of curvature.

FIG. 17 is a flowchart showing a first example of an operation of restricting the speed of the work vehicle 100 in accordance with the radius of curvature. It is assumed that the work vehicle 100 is traveling via automatic steering, and that the speed is adjusted by the user, or maintained at a constant speed via auto-cruise control. The controller 180 performs the operation shown in FIG. 17 when the work vehicle 100 turns along a turning path, or travels along a main path that includes a curve. In the example of FIG. 17, first, the controller 180 determines whether or not the speed of the work vehicle 100 (which hereinafter may be referred to as the "vehicle speed") is higher than a predetermined speed limit (e.g. 10 km/h) (step S201). The speed limit is previously determined based on the turning performance of the work vehicle 100 and the minimum radius of curvature of the turning path, and recorded in the storage device 170. If the vehicle speed does not exceed the speed limit, after the lapse of a predetermined time (e.g., 0.2 seconds), the operation of step S201 is performed again. If the vehicle speed exceeds the speed limit, the controller 180 calculates the radius of curvature of the target path (i.e., a turning path or a main path) (step S202). By the aforementioned method, the controller 180 calculates the radius of curvature at the position of the reference point of the work vehicle 100 at that moment, or at a position which is a predetermined distance (e.g. 1 meter) ahead of the reference point on the target path. Next, the controller 180 determines whether or not the calculated radius of curvature is smaller than a reference value (step S203). Note that determining whether the radius of curvature is smaller than the reference value or not is equivalent to determining whether the curvature exceeds the reference value or not. The reference value for the radius of curvature or the curvature is previously determined in accordance with the turning performance of the work vehicle 100, and recorded in the storage device 170. When the radius of curvature is equal to or greater than the reference value (i.e., when the curvature is equal to or smaller than the reference value), control returns to step S201. If the radius of curvature is smaller than the reference value (i.e., when the curvature exceeds the reference value), the controller 180 restricts the speed of the work vehicle 100 to the speed limit or below (step S204). By automatically performing braking operations or switching the gear shift, the controller 180 decelerates the work vehicle 100. Even while the user is performing accelerating operations, the controller 180 may forcibly decelerate the work vehicle 100. Alternatively, when the user is performing accelerating operations, the controller 180 may give priority to such operations being performed by the user. In other words, the controller 180 may enforce a speed restriction in accordance with the curvature only while conducting automatic speed control via auto-cruise control. After step S204, control returns to step S201. The above operation is repeated while the work vehicle 100 is traveling via automatic steering. If the automatic steering mode is canceled or a command to stop operating is issued while the operation shown in FIG. 17 is being performed, the operation is ended. Through such an operation, the work vehicle 100 can be prevented from mistracking from the target path while turning or traveling along a curve.

Figure 18:
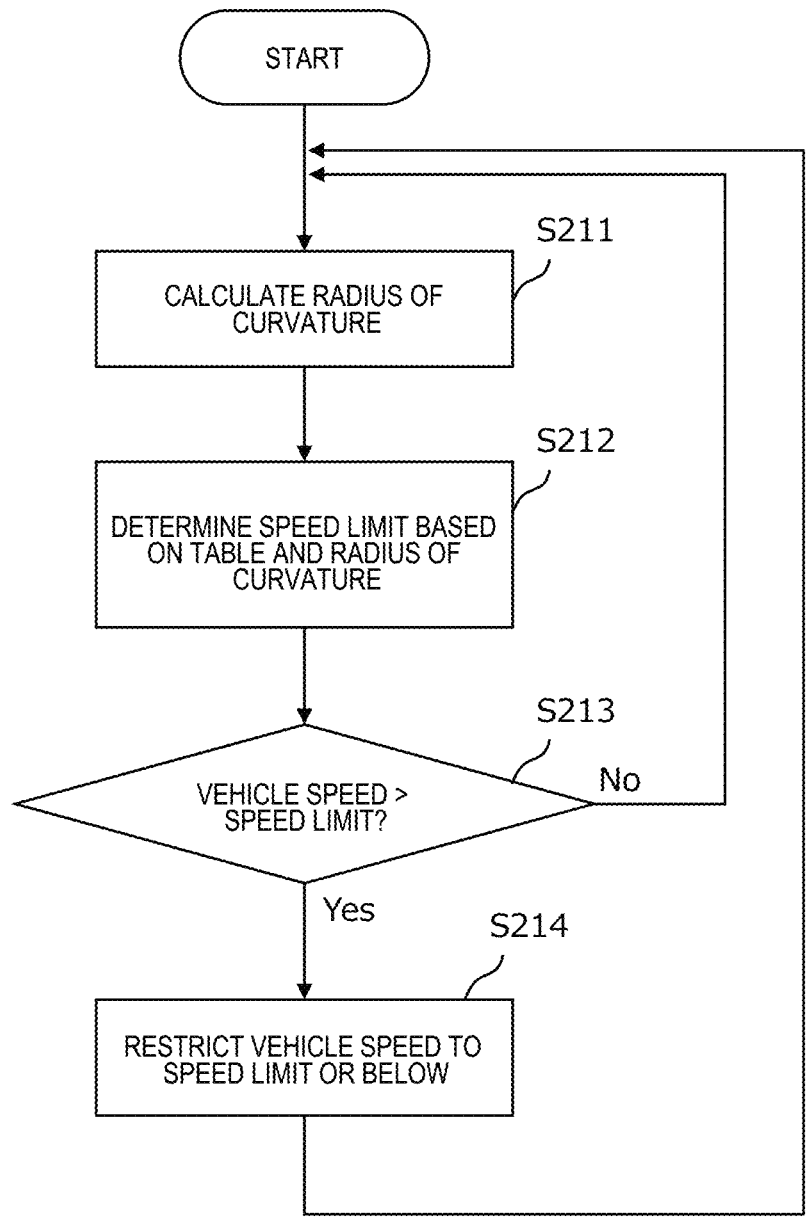
FIG. 18 is a flowchart showing a second example of an operation of restricting the speed of the work vehicle in accordance with the radius of curvature.

FIG. 18 is a flowchart showing a second example of an operation of restricting the speed of the work vehicle 100 in accordance with the radius of curvature. In this example, the speed limit is not a fixed value but a variable value that is determined in accordance with the radius of curvature. Data such as a table or a mathematical function defining correspondence between the radius of curvature and the speed limit is previously recorded in the storage device 170. Since the radius of curvature is an inverse of the curvature, the data defining correspondence between the radius of curvature and the speed limit is equivalent to data defining correspondence between the curvature and the speed limit. In the example of FIG. 18, while the work vehicle 100 is traveling along the target path via automatic steering, the controller 180 calculates a radius of curvature of the target path (step S211). Next, based on the data recorded in the storage device 170 and the calculated radius of curvature, the controller 180 determines a speed limit (step S212). The controller 180 determines whether or not the vehicle speed exceeds the speed limit (step S213). If the vehicle speed does not exceed the speed limit, control returns to step S211. If the vehicle speed exceeds the speed limit, the controller 180 restricts the vehicle speed to the speed limit or below (step S214). After step S214, control returns to step S211. The above operation is repeated while the work vehicle 100 is traveling via automatic steering. If the automatic steering mode is canceled or a command to stop operating is issued while the operation shown in FIG. 18 is being performed, the operation is ended. Through such an operation, the work vehicle 100 can be prevented from mistracking from the target path while turning or traveling along a curve.

Next, with reference to FIGS. 19A to 19D, examples of data defining correspondence between the curvature and the speed limit will be described.

Figure 19A:
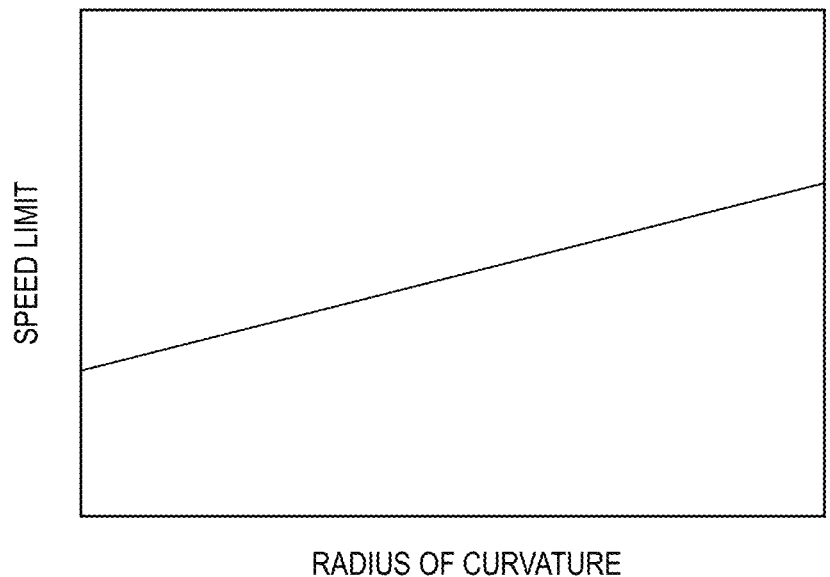
FIG. 19A is a graph showing a first example of a mathematical function defining a relationship between the radius of curvature and the speed limit.
Figure 19B:
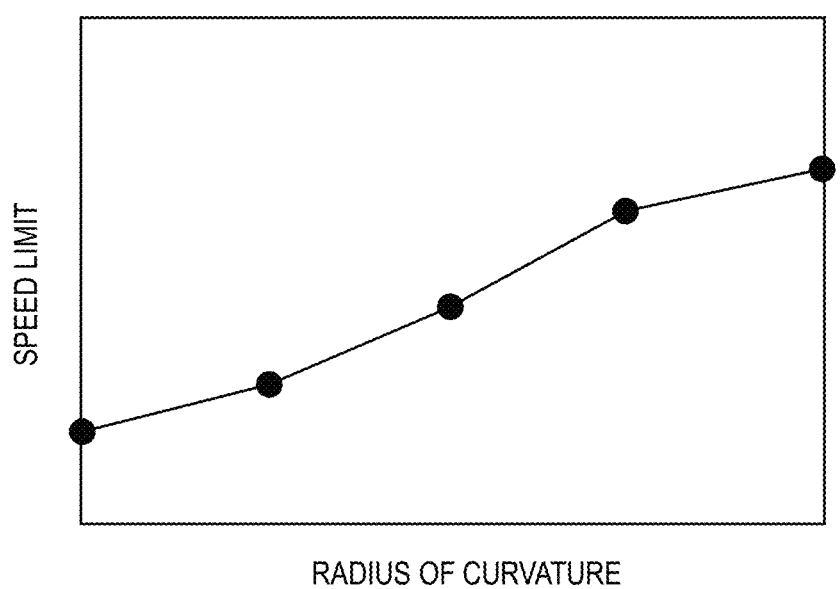
FIG. 19B is a graph showing a second example of a mathematical function defining a relationship between the radius of curvature and the speed limit.
Figure 19C:
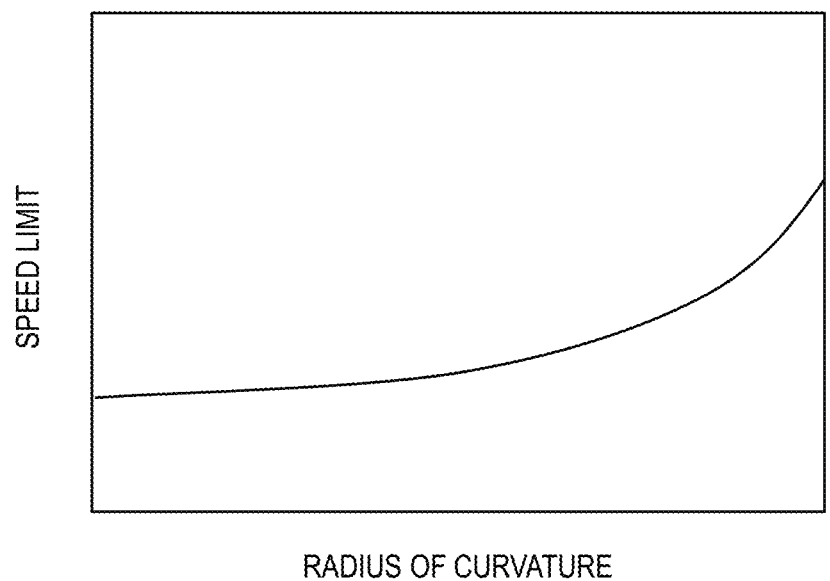
FIG. 19C is a graph showing a third example of a mathematical function defining a relationship between the radius of curvature and the speed limit.
Figure 19D:
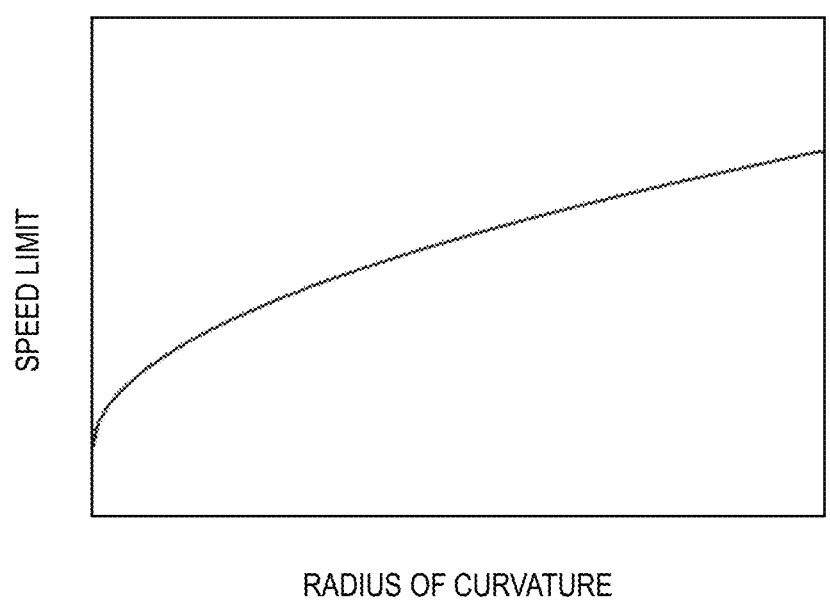
FIG. 19D is a graph showing a fourth example of a mathematical function defining a relationship between the radius of curvature and the speed limit.

FIG. 19A is a graph showing an exemplary mathematical function where the speed limit monotonically and linearly increases with increasing radius of curvature. FIG. 19B is a graph showing another exemplary mathematical function where the speed limit monotonically increases with increasing radius of curvature. The example of FIG. 19B uses data of a polyline function where multiple points are linearly interpolated. FIG. 19C is a graph showing an exemplary mathematical function where the speed limit nonlinearly increases with increasing radius of curvature. FIG. 19D is a graph showing an exemplary mathematical function where the speed limit is proportional to the square root of the radius of curvature. In the example of FIG. 19D, the vehicle speed is restricted so that the lateral acceleration of the work vehicle 100 will be equal to or smaller than a threshold. Steering control is properly achieved when the lateral acceleration is small. Given a lateral acceleration a, a vehicle velocity v, and a radius of curvature r, the relationship $v=\sqrt{(r \cdot a)}$ holds true. It is effective to set the speed limit in accordance with the mathematical function shown in FIG. 19D so that the lateral acceleration a will be equal to or smaller than a certain value even when the radius of curvature is small (i.e., the curvature is large). Data in the form of a mathematical function or a table as shown in any of FIGS. 19A to 19D may be used as data defining correspondence between the curvature and the speed limit. As in these examples, the smaller the radius of curvature is (i.e., the larger the curvature is), the lower value the speed limit may be set.

During travel of the work vehicle 100, the controller 180 may repetitively calculate the curvature of the turning path, and vary the speed limit in accordance with the change rate of curvature over time. Calculating the curvature is synonymous with calculating the radius of curvature, and varying the speed limit in accordance with the change rate of curvature is synonymous with varying the speed limit in accordance with the change rate of radius of curvature. One scenario where the work vehicle 100 may mistrack from the target path is where the radius of curvature is too small (i.e., the curvature is too large) for the given speed of the work vehicle 100, such that sufficient steering cannot be attained even with the maximum steering angle; another scenario where the work vehicle 100 may mistrack from the target path is where the change rate of curvature over time is too high for the given speed, such that sufficient steering cannot be attained even with the maximum steering speed. Therefore, it is effective to vary the speed limit in accordance with the change rate of curvature (or radius of curvature) over time. For example, it is effective to increase the speed limit as the magnitude (i.e., absolute value) of the change rate of curvature (or radius of curvature) over time increases.

Figure 20:
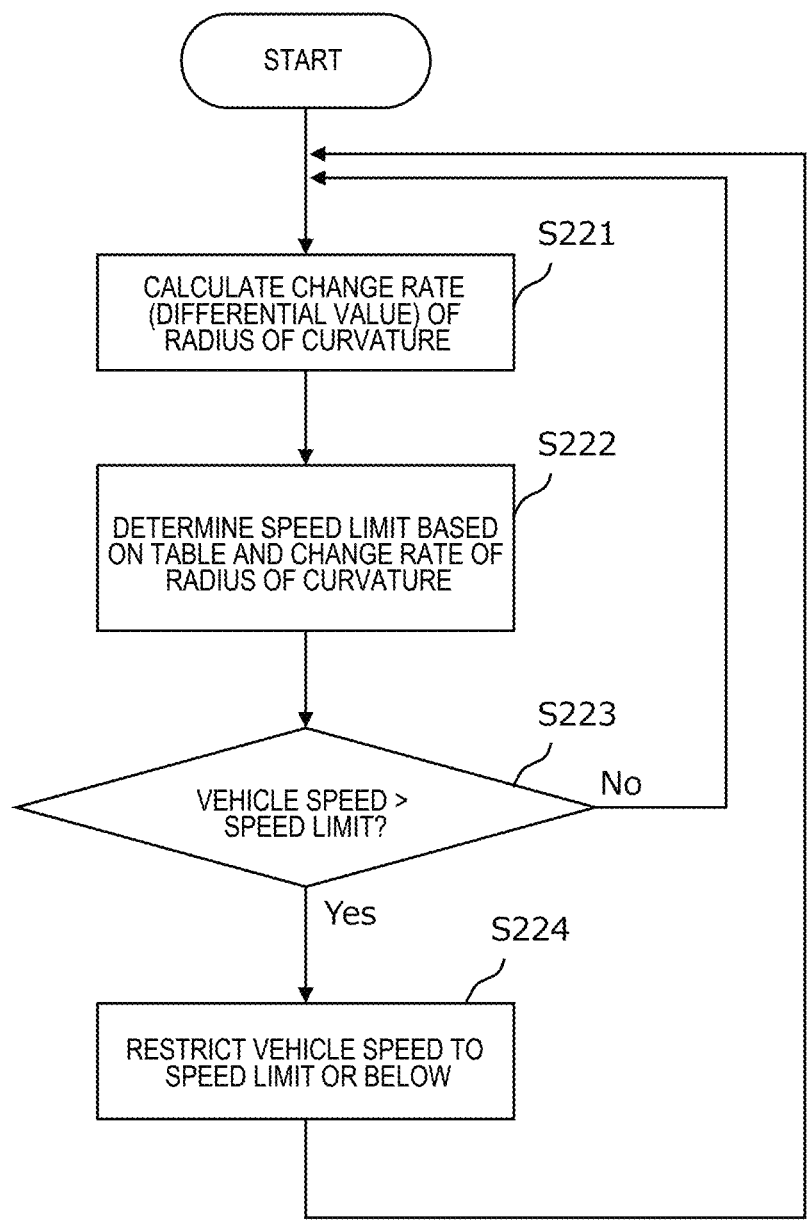
FIG. 20 is a flowchart showing an example operation where the speed of the work vehicle is restricted in accordance with the change rate of radius of curvature over time.

FIG. 20 is a flowchart showing an example operation where the speed of the work vehicle 100 is restricted in accordance with the change rate of radius of curvature over time. In this example, when the work vehicle 100 is traveling via automatic steering, the controller 180 calculates the change rate over time (i.e., differential value) of radius of curvature of the target path (step S221). Next, based on a table that is previously recorded in the storage device 170 and the calculated change rate of radius of curvature over time, the controller 180 determines the speed limit. The controller 180 determines whether or not the vehicle speed exceeds the speed limit (step S223). If the vehicle speed does not exceed the speed limit, control returns to step S221. If the vehicle speed exceeds the speed limit, the controller 180 restricts the vehicle speed to the speed limit or below (step S224). After step S224, control returns to step S221. The above operation is repeated while the work vehicle 100 is traveling via automatic steering. If the automatic steering mode is canceled or a command to stop operating is issued while the operation shown in FIG. 20 is being performed, the operation is ended. Through such an operation, the work vehicle 100 can be prevented from mistracking from the target path from while turning or traveling along a curve.

Figure 21A:
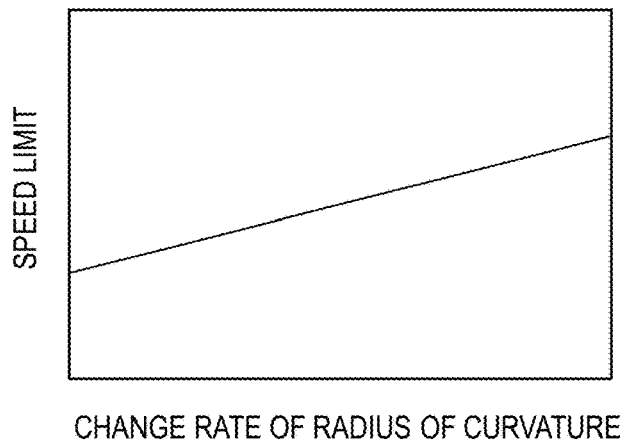
FIG. 21A is a graph showing a first example mathematical function defining a relationship between the absolute value of the change rate of radius of curvature over time and the speed limit.
Figure 21B:
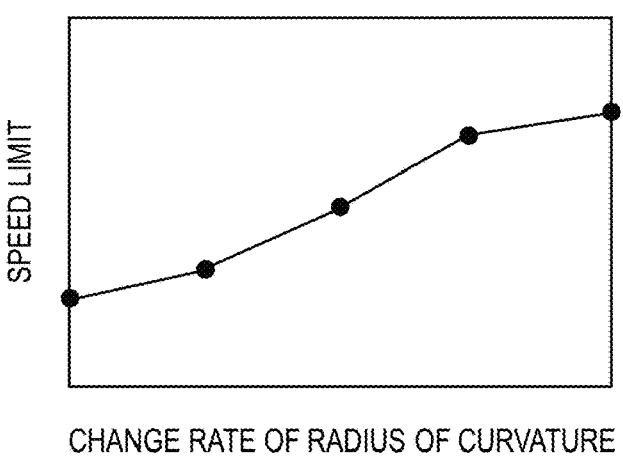
FIG. 21B is a graph showing a second example mathematical function defining a relationship between the absolute value of the change rate of radius of curvature over time and the speed limit
Figure 21C:
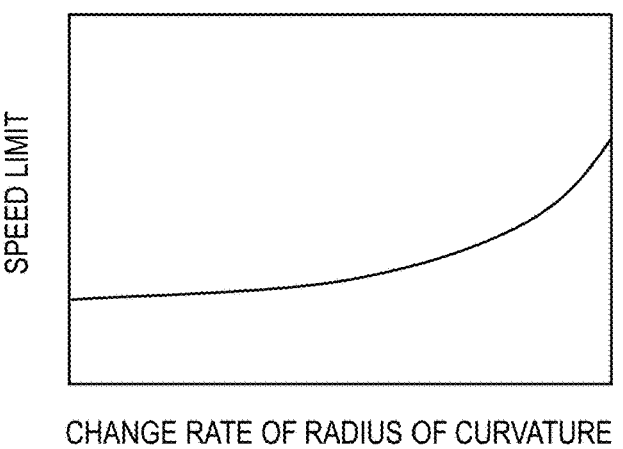
FIG. 21C is a graph showing a third example mathematical function defining a relationship between the absolute value of the change rate of radius of curvature over time and the speed limit.

FIGS. 21A to 21C are graphs showing example mathematical functions that are defined by the table to be used in the example of FIG. 20. In these graphs, the horizontal axis represents the absolute value of the change rate of radius of curvature over time. FIG. 21A shows an exemplary mathematical function where the speed limit monotonically and linearly increases with increasing absolute values of the change rate of radius of curvature over time. FIG. 21B shows another exemplary relationship where the speed limit monotonically increases with increasing absolute values of the change rate of radius of curvature over time. The example of FIG. 21B uses data of a polyline function where multiple points are linearly interpolated. FIG. 21C shows an exemplary mathematical function where the speed limit monotonically and nonlinearly increases with increasing absolute values of the change rate of radius of curvature over time. Data in the form of a mathematical function or a table as shown in any of FIGS. 21A to 21C may be used as data defining correspondence between the change rate of curvature and the speed limit. In these examples, the greater the absolute value of the change rate of curvature over time is, the lower value the speed limit is set to.

Next, another example of an operation of restricting the speed of the work vehicle 100 when it turns along a turning path will be described.

Figure 22:
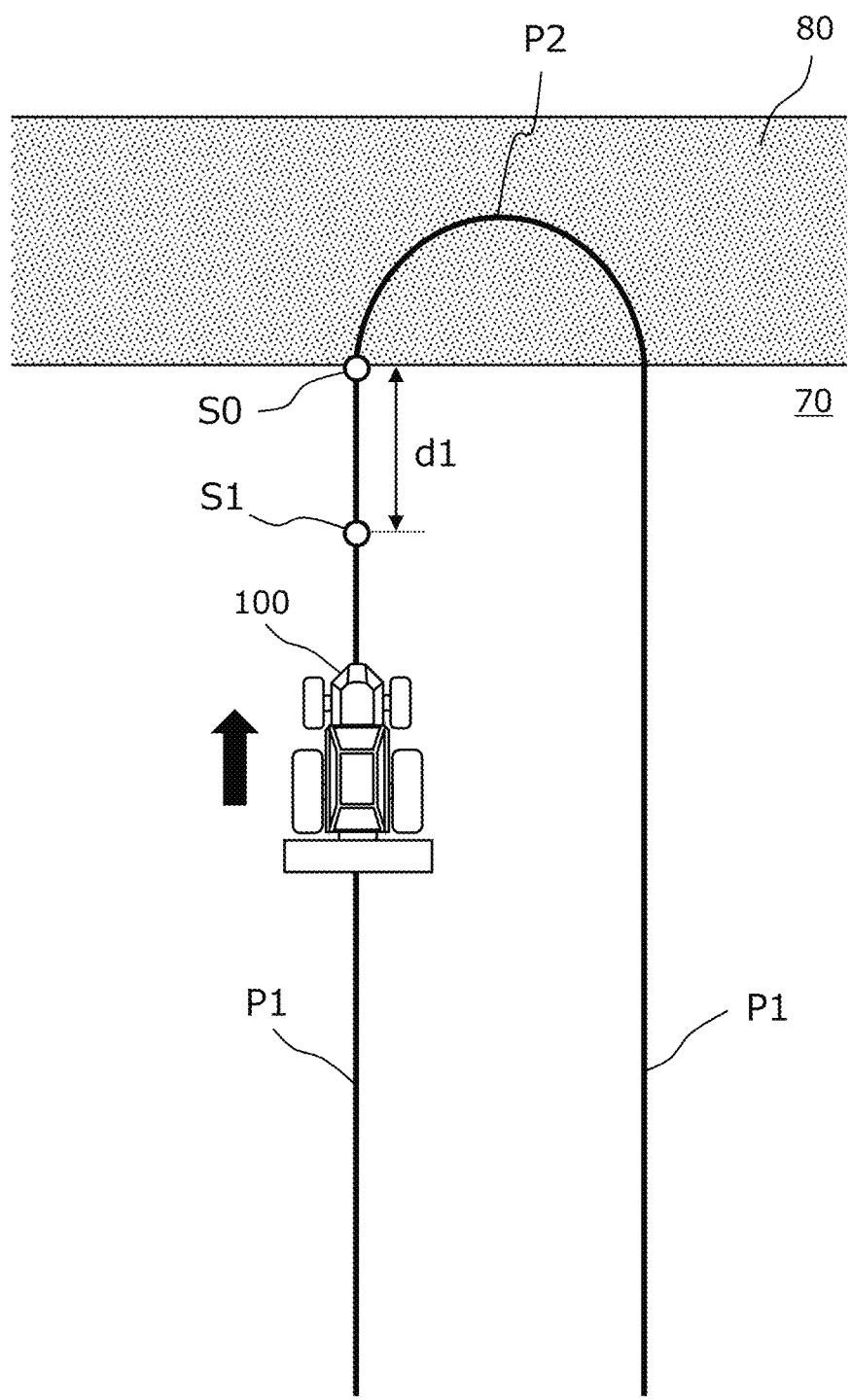
FIG. 22 is a diagram for describing an example timing for deceleration during a turn.

FIG. 22 shows an exemplary situation where the work vehicle 100 is traveling along one main path P1 in the work area 70 toward a headland 80. When the work vehicle 100 is traveling toward a headland 80 at a relatively high speed, the controller 180 restrains the work vehicle 100 from mistracking from the turning path P2, by performing speed restriction in accordance with the curvature of the turning path P2. In one example, when the work vehicle 100 arrives at a beginning point S0 of the turning path P2, the controller 180 lowers the speed of the work vehicle 100 to the speed limit or below if the speed of the work vehicle 100 exceeds the speed limit and the curvature of the turning path P2 exceeds the reference value. If the curvature of the turning path P2 is too large or the speed of the work vehicle 100 when entering the headland 80 is too high, beginning deceleration upon arrival of the work vehicle 100 at the beginning point S0 of the turning path P2 may be too late. In such a case, the controller 180 may begin decelerating the work vehicle 100 when arriving at a point that is situated before the beginning point S0 of the turning path P2 by a predetermined distance d1. The predetermined distance d1 may be determined in accordance with the curvature of the turning path P2 or the speed of the work vehicle 100.

The controller 180 may perform the aforementioned speed control in accordance with the path curvature only while the cruise control function is enabled. Alternatively, even while the cruise control function is disabled, i.e., while the user is performing their own accelerating operations, the controller 180 may perform the aforementioned speed control in accordance with the path curvature.

While the cruise control function is enabled, the controller 180 causes the work vehicle 100 to travel along the main path P1 at a reference speed that is set by the user. When the work vehicle 100 approaches the turning path P2, as described above, the controller 180 decelerates the work vehicle 100 to a speed that is determined in accordance with the curvature of the turning path P2 and then causes it to turn along the turning path P2. After turning, the controller 180 may set the speed of the work vehicle 100 back to the reference speed, and continue cruise control. In other words, after turning, the controller 180 may cause the work vehicle 100 to travel at the reference speed along another main path P1 that is connected to the turning path P2.

In the present preferred embodiment, steering of the work vehicle 100 is controlled by the ECU 182, in accordance with a command from the ECU 183 shown in FIG. 3. The speed of the work vehicle 100 is controlled by the ECU 181. The ECU 182 functions as a first control circuit to control steering of the work vehicle 100. The ECU 181 functions as a second control circuit to control speed of the work vehicle.

When the work vehicle 100 enters a predetermined range containing the turning path P2, the controller 180 may cause the display device of the operational terminal 200 to display a pop-up notification indicating that the work vehicle 100 has approached the turning path P2. The predetermined range containing the turning path P2 may be a range that is located at a previously-set predetermined distance from an end of the turning path P2, for example.

Figure 23:
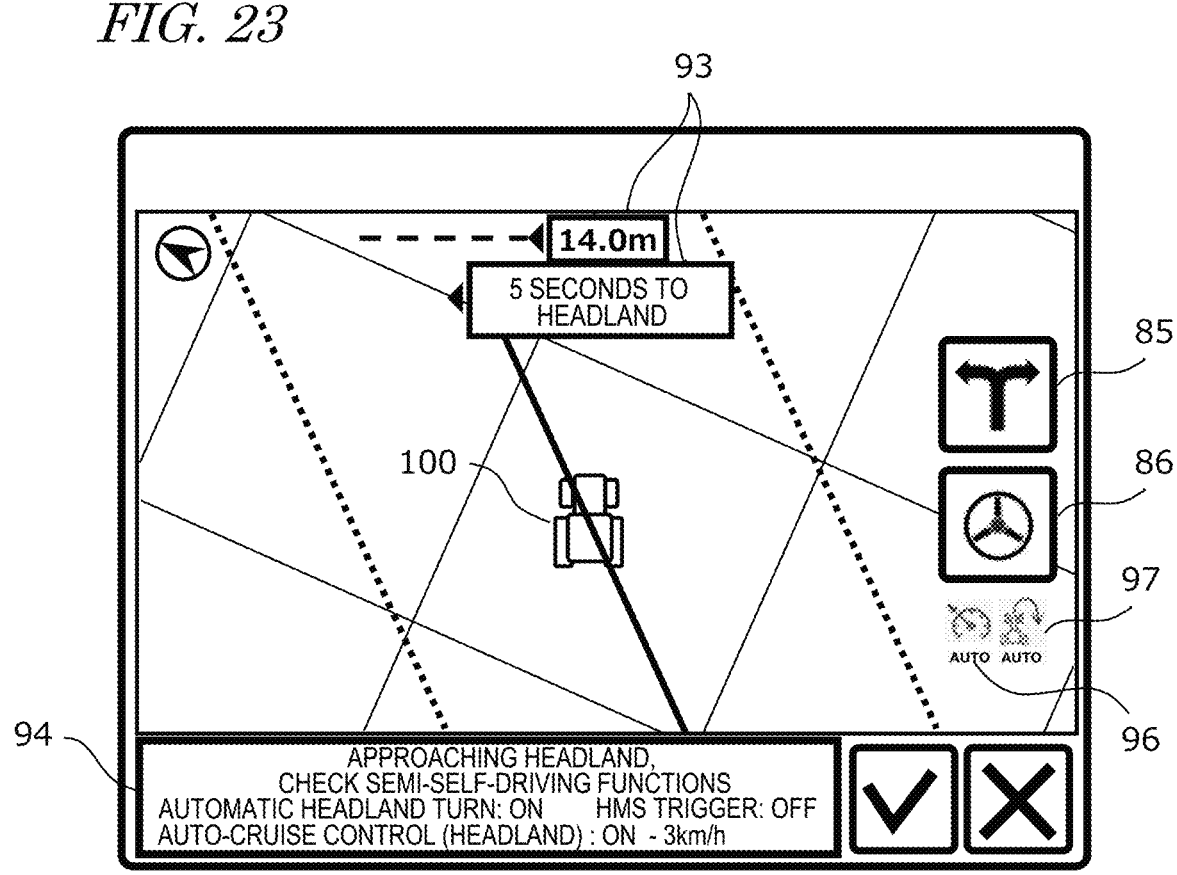
FIG. 23 is a diagram showing an example of a pop-up notification indicating that the work vehicle has approached a turning path.

FIG. 23 is a diagram showing an example of a pop-up notification indicating that the work vehicle 100 has approached the turning path P2. In the example of FIG. 23, when the work vehicle 100 approaches a headland, a pop-up notification 93 including information of an amount of time and distance before arriving at the headland is displayed on the display device. The pop-up notification 93 shown in FIG. 23 includes the text "5 SECONDS TO HEADLAND" and "14.0 M" and a mark indicating that the turning direction is LEFT.

In accordance with the speed of the work vehicle 100, the controller 180 may change how closely the work vehicle 100 needs to have approached the turning path P2 (or a headland) for the pop-up notification 93 to be indicated. In an alternative arrangement, the user may be allowed to set how closely the work vehicle 100 needs to have approached the turning path P2 for the pop-up notification 93 to be indicated.

In the example of FIG. 23, furthermore, a pop-up notification 94 is also displayed in the lower left corner of the screen, which prompts the user to check settings concerning automatic headland turn, auto-cruise control at a headland, and HMS trigger (hereinafter, these functions may be referred to as the "semi-self-driving functions"). The HMS trigger function is a function of executing a sequence of operations in accordance with a previously-recorded operation sequence when turning in a headland. The pop-up notification 94 in the example of FIG. 23 indicates that the automatic headland turn function is ON; the HMS trigger is OFF; auto-cruise control in headlands is ON; and auto-cruise control is set at a speed of 3 km/h. By pressing certain buttons or icons in the display screen, or pressing certain switches provided in the driver's seat, the user is able to change the settings concerning these semi-self-driving functions.

Thus, the pop-up notifications to be displayed when the work vehicle 100 approaches the turning path P2 may include information concerning at least one of the turning direction, the distance and/or time until the beginning point of the turn, whether or not to turn via automatic steering, and the speed during the turn. The pop-up notifications may include other information, such as line numbers before and after the turn, for example.

On the display screen shown in FIG. 23, an icon 85 for transitioning to the setting screen, an icon 86 for switching ON/OFF the automatic steering (auto-steering) function, an indicator 96 indicating that the auto-cruise control function is enabled (ON), and an indicator 97 indicating that the automatic headland turn function is enabled (ON). The controller 180 activates the indicator 96 while the auto-cruise control function is enabled, and activates the indicator 97 while the automatic headland turn function is enabled. While restricting the speed of the work vehicle 100 based on the curvature of the turning path, the controller 180 may cause the display device of the operational terminal 200 to display information indicating that speed is being restricted. For example, while restricting the speed of the work vehicle 100 based on the curvature of the turning path, the controller 180 may flicker the indicator 97 to indicate that speed is being restricted. Such an indication allows the user to know that deceleration is not a malfunction, but is a result of trying to avoid mistracking from the path.

When the work vehicle 100 has entered the predetermined range containing a turning path, the controller 180 may cause an audio output device such as the buzzer 220 or a loudspeaker of the operational terminal 200 to output an alarm sound. Not only displaying pop-up notifications but also outputting an alarm sound allows the user to be effectively notified that a headland is being approached.

Preferred Embodiment 3

Next, a third illustrative preferred embodiment of the present disclosure will be described.

As mentioned earlier, semi-self-driving functions include the headland turn function, the auto-cruise control function, and the HMS trigger function. A work vehicle 100 which is capable of semi-self-driving performs a control that combines these functions. Although turns are usually made in the headlands, depending on the work situation, the user may wish to perform a turn at an arbitrary timing. The function which allows the user to make a turn at an arbitrary timing via automatic steering is herein referred to as "on-demand turn".

When the user causes the work vehicle 100 to turn at an arbitrary timing, depending on the user, the HMS trigger function and the auto-cruise control function may not always be used together. In some situations, a turn may be made while tilling or other tasks is performed with the implement 300; in other situations, a turn may be made while the implement 300 is halted and raised out of the way.

Therefore, in the present preferred embodiment, when the user makes a manipulation for an on-demand turn, the controller 180 causes a pop-up to be displayed on the display device, such that the pop-up allows the user to select whether or not to utilize the HMS trigger function and the like. In other words, when the user makes a manipulation to instruct that a turn be made while the work vehicle 100 is traveling along one of the plurality of main paths via automatic steering, the controller 180 causes a pop-up to be displayed on the display device in response to the manipulation. The pop-up includes an indication for allowing the user to select whether or not to cause the work vehicle 100 to execute a sequence of operations in accordance with a previously-recorded operation sequence. If causing the work vehicle 100 to execute the sequence of operations is selected, the controller 180 causes the work vehicle 100 to make a turn that involves the sequence of operations in accordance with the previously-recorded operation sequence. On the other hand, if not causing the work vehicle 100 to execute the sequence of operations is selected, the controller 180 causes the work vehicle 100 to make a turn that does not involve the sequence of operations. Through such an operation, when turning in the work area, it becomes possible for the user to select whether or not to utilize the HMS trigger function, depending on the situation.

As mentioned earlier, the sequence of operations may include a first operation to be performed at the beginning of a turn and a second operation to be performed at the finish of a turn. The first operation may include at least one of the operations of raising the implement 300 that is linked to the work vehicle 100, suspending output of motive power to the implement 300, disabling the locking differential function of the work vehicle 100, switching from the two-wheel drive mode to the four-wheel drive mode, and lowering the engine revolutions of the work vehicle 100. The second operation may include at least one of the operations of lowering the implement 300, starting output of motive power to the implement 300, starting the locking differential function; switching from the four-wheel drive mode to the two-wheel drive mode, and increasing the engine revolutions. The controller 180 can cause a setting screen to be displayed on the display device, on which the user is able to set the contents of the sequence of operations. The controller 180 causes the storage device 170 to store an operation sequence that is based on the contents of the sequence of operations having been set.

Hereinafter, the operation of the work vehicle 100 according to the present preferred embodiment will be described in more detail. The work vehicle 100 according to the present preferred embodiment is identical in configuration to the work vehicle 100 according to Preferred Embodiment 1. Differences from Preferred Embodiment 1 will be mainly described below.

Figure 24:
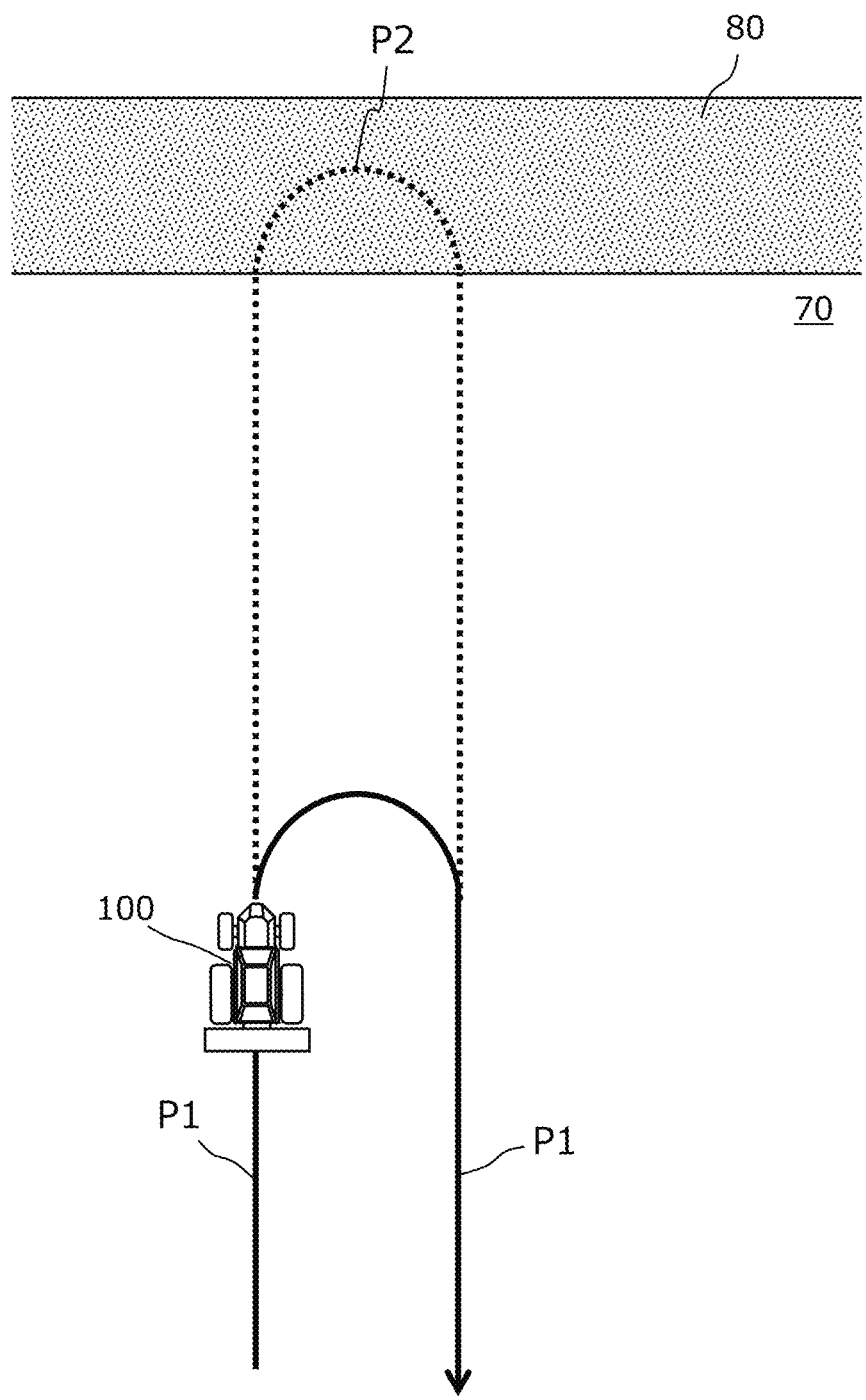
FIG. 24 is a diagram showing an example operation of the work vehicle according to Preferred Embodiment 3 of the present invention.

FIG. 24 is a diagram showing an example operation of the work vehicle 100 according to the present preferred embodiment. As is indicated by an arrow in FIG. 24, the work vehicle 100 according to the present preferred embodiment has an on-demand turn function, where the work vehicle 100 automatically turns in response to the user's manipulation while traveling via automatic steering along a main path P1. While the work vehicle 100 is traveling via automatic steering, by pressing a certain button or icon on a screen that is displayed by the operational terminal 200, the user can instruct that an on-demand turn be made. Once an instruction for an on-demand turn is given, the controller 180 causes a pop-up to be displayed on the display device, such that the pop-up allows the user to select whether or not to execute a similar sequence of operations to that of a usual turning operation in a headland 80. After the user selects whether or not to execute the sequence of operations, the controller 180 causes the work vehicle 100 to make a turn.

Not only when the work vehicle 100 turns along a turning path P2 as indicated by a dotted line in FIG. 24, but also during this on-demand turn, the controller 180 may provide notifications concerning mistracking from the path by using an alarming device (e.g., the buzzer 220) as in Preferred Embodiment 1 and/or perform curvature-based speed control as in Preferred Embodiment 2.

In the present preferred embodiment, the controller 180 continues automatic steering mode even after causing the work vehicle 100 to turn in response to the user's manipulation instructing that a turn be made. As a result, without the user having to perform any particular manipulations after the turn is begun, travel via automatic steering can be continued.

Figure 25:
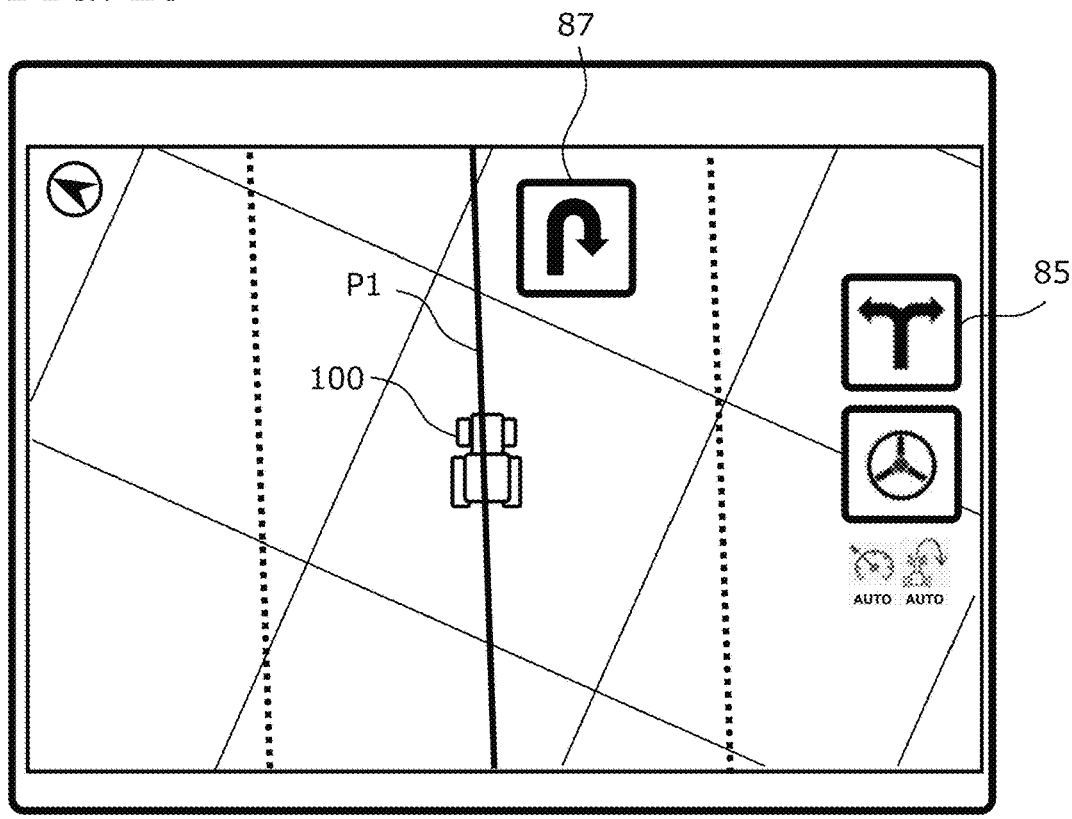
FIG. 25 is a diagram showing an example of a screen to be displayed on the display device when the work vehicle is traveling via automatic steering along a linear main path.

FIG. 25 is a diagram showing an example of a screen to be displayed on the display device when the work vehicle 100 is traveling via automatic steering along a linear main path P1. This screen includes an icon 85 for making settings concerning semi-self-driving and an icon 87 for instructing that an on-demand turn be made. When the user presses on the icon 85, the screen transitions to a setting screen for making settings concerning semi-self-driving functions (which include on-demand turns). When the user presses on the icon 87 while the work vehicle 100 is traveling, an on-demand turn operation is begun. At this time, a pop-up for allowing the user to select whether or not to execute a sequence of operations in accordance with a previously-recorded HMS operation sequence is displayed first.

Figure 26:
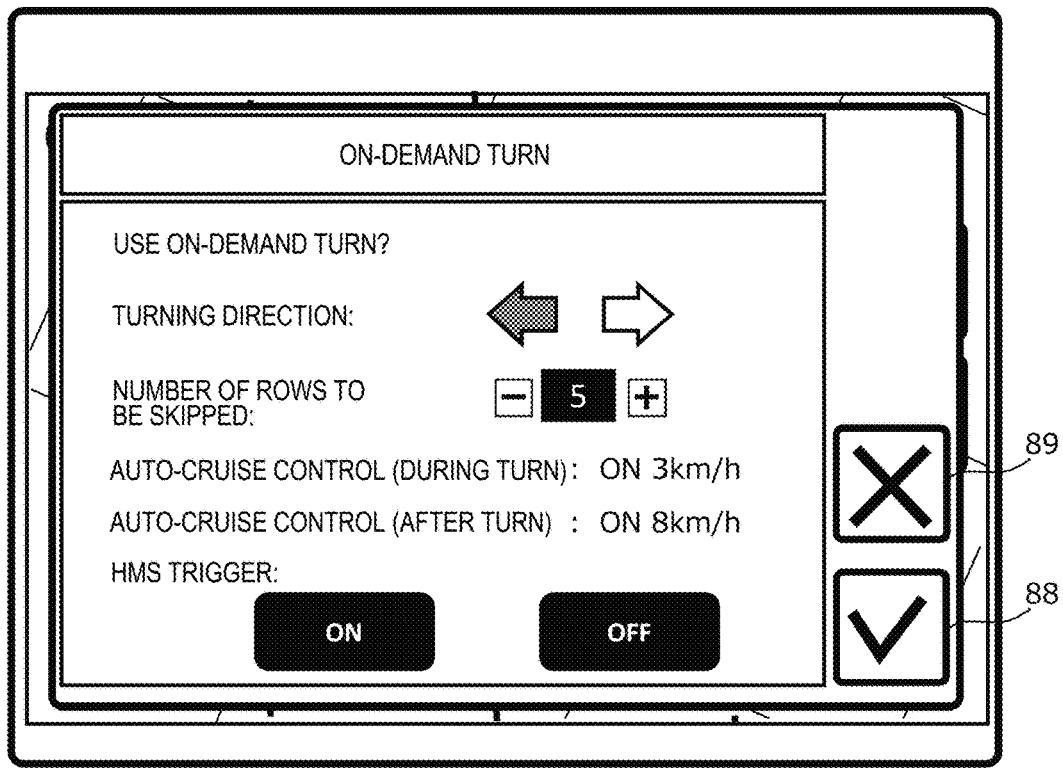
FIG. 26 is a diagram showing an example of a pop-up screen to be displayed when the user instructs that an on-demand turn be made.

FIG. 26 is a diagram showing an example of a pop-up screen to be displayed when the user presses on the icon 87. Following this pop-up screen, the user is able to set the on-demand turn operation. The pop-up in this example includes arrows for designating a turning direction (left/right), an input box for designating the number of rows to be skipped during a turn, an indication of whether or not to perform auto-cruise control (ON/OFF) during a turn, and a speed used when performing it, an indication of whether or not to perform auto-cruise control (ON/OFF) after a turn, and a speed used when performing it, and a button for selecting ON/OFF of the HMS trigger. By following this pop-up screen, the user may make settings and press the check button 88 in the lower right corner, then, the controller 180 causes the work vehicle 100 to turn in accordance with the settings having been made. When the user presses the cancel button 89, the on-demand turn function is canceled, and travel along the main path P1 is continued.

In the example of FIG. 26, when beginning an on-demand turn, the user is able to designate the turning direction, the number of rows to be skipped, and whether or not to enable the HMS trigger function. In one arrangement, with respect to during a turn and after a turn separately, an ability to set whether or not to enable the auto-cruise control function and change the vehicle speed when the function is enabled may be provided. Thus, the pop-up includes indications for allowing the user to set various items, such as the turning direction and the number of rows to be skipped. In accordance with the particular settings having been set, e.g., the turning direction and the number of rows to be skipped, the controller 180 causes the work vehicle 100 to turn.

In the example of FIG. 26, the cruise control is set to ON for both during a turn and after a turn. In such a case, even after causing the work vehicle 100 to turn in response to the user's manipulation instructing that a turn be made while the cruise control function is enabled, the controller 180 keeps the cruise control function enabled. In this case, without the user having to make any manipulations, the work vehicle 100 can automatically perform the turn and the travel after the turn.

Figure 27:
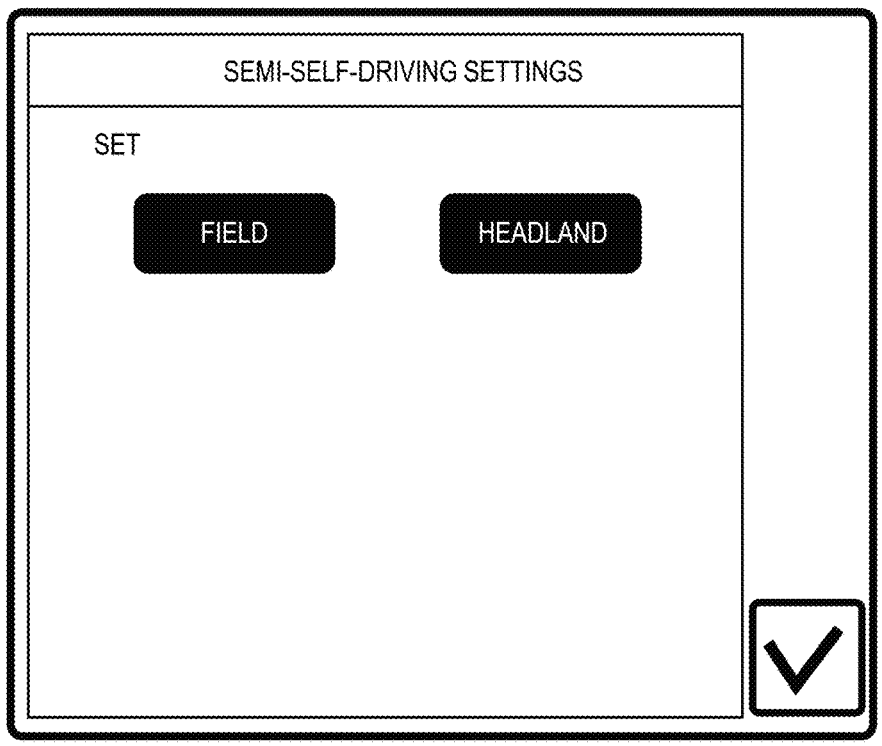
FIG. 27 is a diagram showing an example of a screen for making settings concerning semi-self-driving.

The settings concerning on-demand turns can be made in advance. FIG. 27 shows an example of a screen to which a transition occurs after pressing on the icon 85 in FIG. 25. In this example, settings concerning semi-self-driving in each of the work area 70 (field) and the headlands 80 can be made. When the user selects either a "field" button or a "headland" button included in the screen and presses a check button in the lower right corner, a transition occurs to a screen for making settings concerning semi-self-driving within the selected region.

Figure 28:
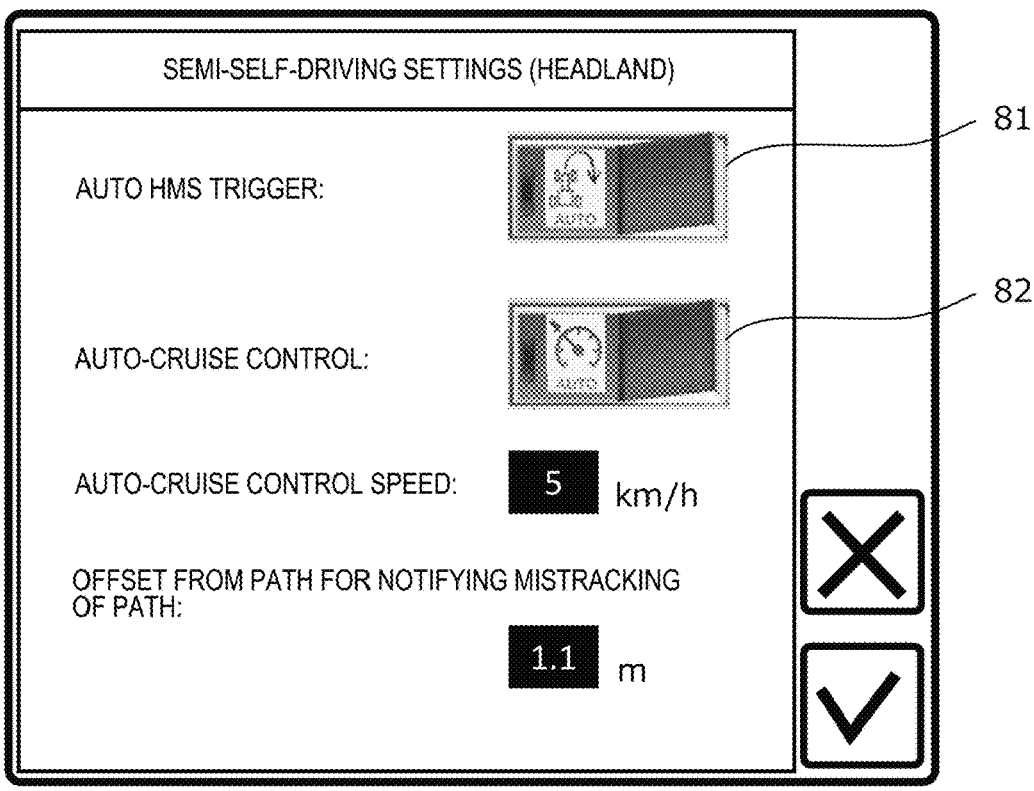
FIG. 28 is a diagram showing an example of a screen for making settings concerning semi-self-driving in headlands.

FIG. 28 is a diagram showing an example of a screen for making settings concerning semi-self-driving in the headlands. On this screen, the user is able to make settings concerning the HMS trigger function, the auto-cruise control function, and the offset from the path for notifying a mistracking from the path. By pressing on the "auto HMS trigger" icon 81, the user can switch between the enabled/disabled statuses of the HMS trigger function during a turn. By pressing on the "auto-cruise control" icon 82, the user can switch between the enabled/disabled statuses of the auto-cruise control function. In the example of FIG. 28, the user is also able to set the vehicle speed under auto-cruise control, and the offset from the path for notifying a mistracking from the path. The particular settings made on the screen may be applicable not only to headland turns but also to on-demand turns. In an alternative arrangement, different settings may be possible for headland turns and for on-demand turns.

When an instruction for an on-demand turn is given from the user, the controller 180 generates a path for the on-demand turn based on the interval between the rows before and after the turn, and causes the work vehicle 100 to turn along this path. At this time, if the interval between the rows before and after the turn is short, the work vehicle 100 may step on a region where tilling or other tasks have already been completed. In such cases, the controller 180 may cause an alarm (e.g., a pop-up) to be displayed on the display device, thus alarming the user. When this function is implemented, to the storage device 170, the controller 180 consecutively stores regions of the work area 70 where work by the work vehicle 100 has been completed. When a generated path and a work-completed region overlap, the controller 180 causes an alarm to be displayed on the display device. When displaying an alarm on the display device, the controller 180 may further cause the display device to display a user interface that allows the user to change the path of the turn. For example, the user may be allowed to select in the pop-up indication a turning path that prevents any worked region from being stepped on by the work vehicle 100.

Figure 29A:
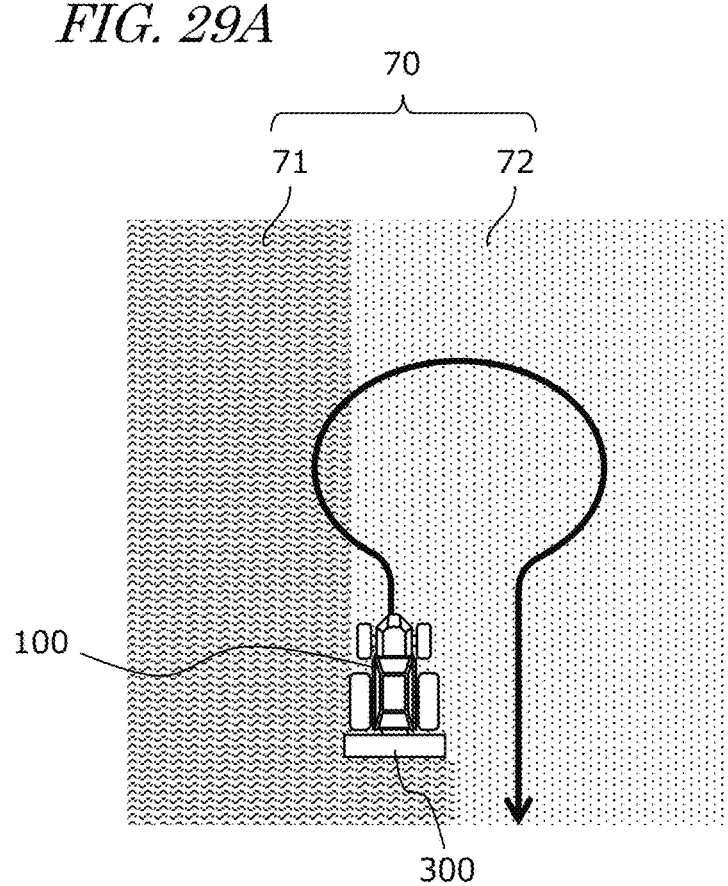
FIG. 29A is a diagram showing an example of a path that is generated by the controller when the user gives an instruction that an on-demand turn be made.
Figure 29B:
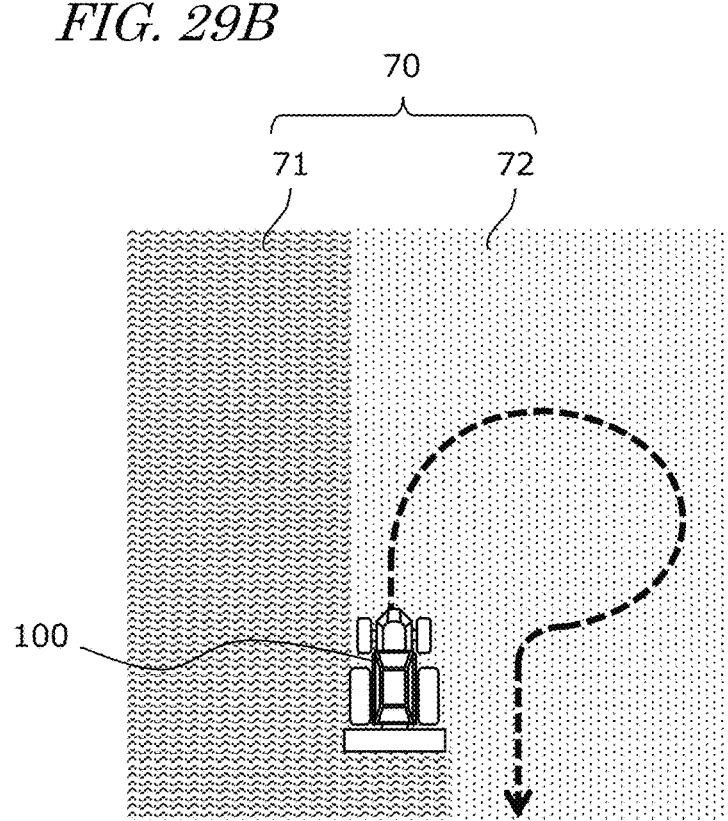
FIG. 29B is a diagram showing an example of a changed path.

FIG. 29A is a diagram showing an example of a path that is generated by the controller 180 when the user gives an instruction that an on-demand turn be made. The work vehicle 100 in this example uses the implement 300 to perform tilling work. In the following description, within the work area 70, any region where tilling work by the implement 300 has been completed is referred to as "tilled land", whereas any region where tilling work has not been performed is referred to as "untilled land". In the example shown in FIG. 29A, a portion of the work area 70 is tilled land 71, while the remainder of the work area 70 is untilled land 72. A portion of the path generated by the controller 180 overlaps the tilled land 71. When the work vehicle 100 travels along such a path, the work vehicle 100 will step on a portion of the tilled land 71. Turning along such a path is not a problem in a headland. However, during an on-demand turn, turning along such a path may result in the need for redoing of work. Therefore, in such a case, the controller 180 causes a pop-up to be displayed on the display device to allow the user to select a turning path such that the tilled land 71 will not be stepped on. For example, a pop-up with a user interface that allows the user to select a path as indicated by a broken arrow in FIG. 29B may be displayed.

Figure 30A:
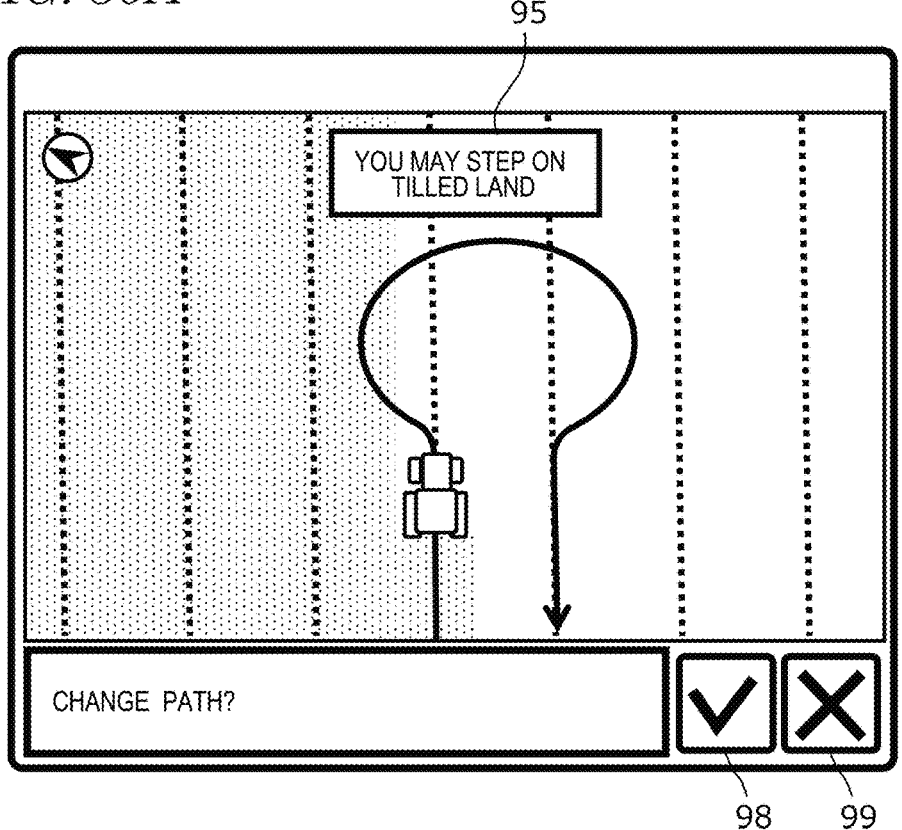
FIG. 30A is a diagram showing an example of a pop-up to be displayed when a path overlapping tilled land is generated during an on-demand turn.
Figure 30B:
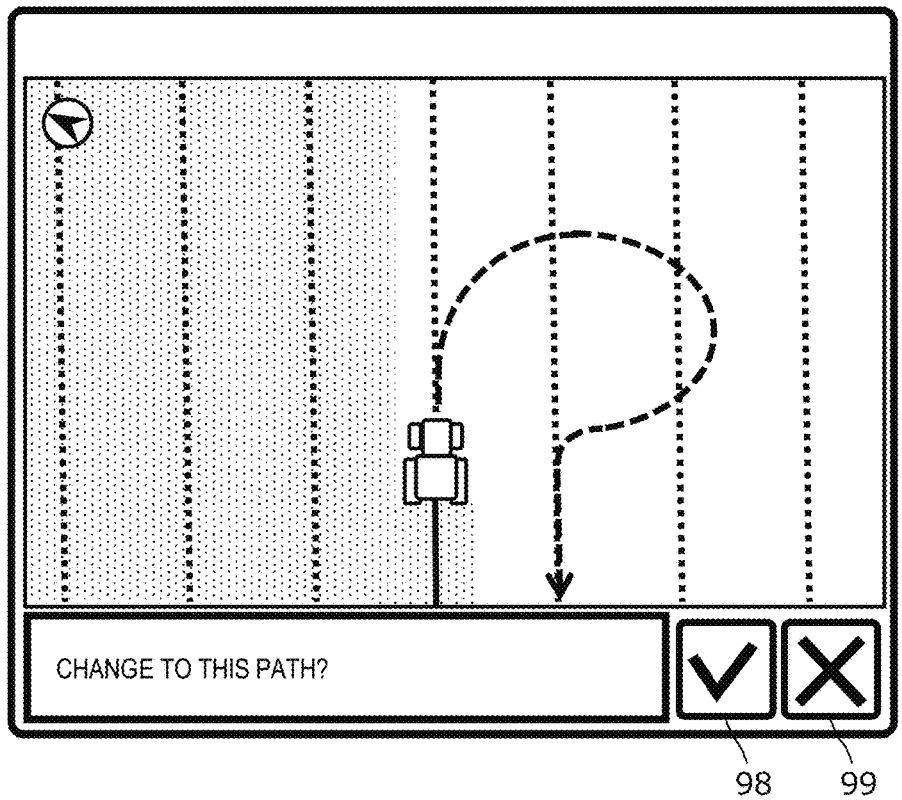
FIG. 30B is a diagram showing an example of a display screen when the path of an on-demand turn is to be changed.

FIG. 30A is a diagram showing an example of a pop-up to be displayed when a path overlapping tilled land is generated during an on-demand turn. In this example, a pop-up 95 containing a message "YOU MAY STEP ON TILLED LAND" is displayed. In the example of FIG. 30A, a message "CHANGE PATH?" is also displayed in a window below the screen. To change the path, the user presses the check button 98. To not change the path, the user presses the cancel button 99. If the user presses the check button 98, as shown in FIG. 30B, for example, the controller 180 causes the display device to display an alternative path after the change. Although one alternative path is illustrated in the example of FIG. 30B, multiple alternatives may be displayed. Alternatively, the user may be allowed to edit the path through drag-and-drop or other manipulations. In the example of FIG. 30B, one of the alternative paths is selected, and a message "CHANGE TO THIS PATH?" is displayed in the window below the screen. As the user presses the check button 98, the path after the change is determined, and the work vehicle 100 begins a turn along this path. If the user presses the cancel button 99, the change is canceled.

Thus, the controller 180 displays alternative turning paths on the display device, thus allowing the user to check the motion of the work vehicle 100 to occur after beginning the turn. If the motion is not intended by the user, the user may set another path. With such a function, the work vehicle 100 is prevented from stepping on the worked regions, e.g., tilled land, during an on-demand turn.

Thus, in the present preferred embodiment, when the user makes a manipulation to begin an on-demand turn, a pop-up that allows the contents of the settings concerning semi-self-driving functions (e.g., the HMS trigger function) to be confirmed and changed is displayed on the display device. As a result of this, any semi-self-driving function that was not intended by the user can be prevented from launching during an on-demand turn, or the user may be allowed to set a desired operation that is specific to an on-demand turn. Furthermore, because the user is able to select a path of the turn, the work vehicle 100 can be prevented from stepping on the worked regions during an on-demand turn. This reduces the need for redoing of work such that the efficiency of work can be improved.

Preferred Embodiment 4

Next, a fourth preferred embodiment of the present disclosure will be described.

In the case where a headland turn is made via automatic steering, the path of the turn is to be generated based on geometrical conditions, e.g., the working breadth or the turnable radius. However, when the work vehicle 100 enters a headland at a predetermined speed or faster and tries to turn along the turning path, a significant mistracking from the path may occur. In the case where gear shift control or brake control is possible through electronic control, it is relatively easy to perform immediate deceleration or braking upon entry. However, in the non-electronic case where gear shift control or brake control is performed hydraulically, etc., it may not be easy to perform immediate deceleration or braking.

Therefore, in the present preferred embodiment, when the work vehicle 100 enters a headland via automatic steering, if the speed exceeds a threshold, automatic steering is canceled. Even if the speed does not exceed the threshold at the moment of entering the headland, automatic steering is canceled when the speed exceeds the threshold during the turn. After automatic steering is canceled, the user causes the work vehicle 100 to travel via manual steering. As the user manually performs steering, mistracking from the target path is restrained.

The work vehicle 100 according to the present preferred embodiment is identical in configuration to the work vehicle 100 according to Preferred Embodiment 1. Differences from Preferred Embodiment 1 will be mainly described below.

Figure 31:
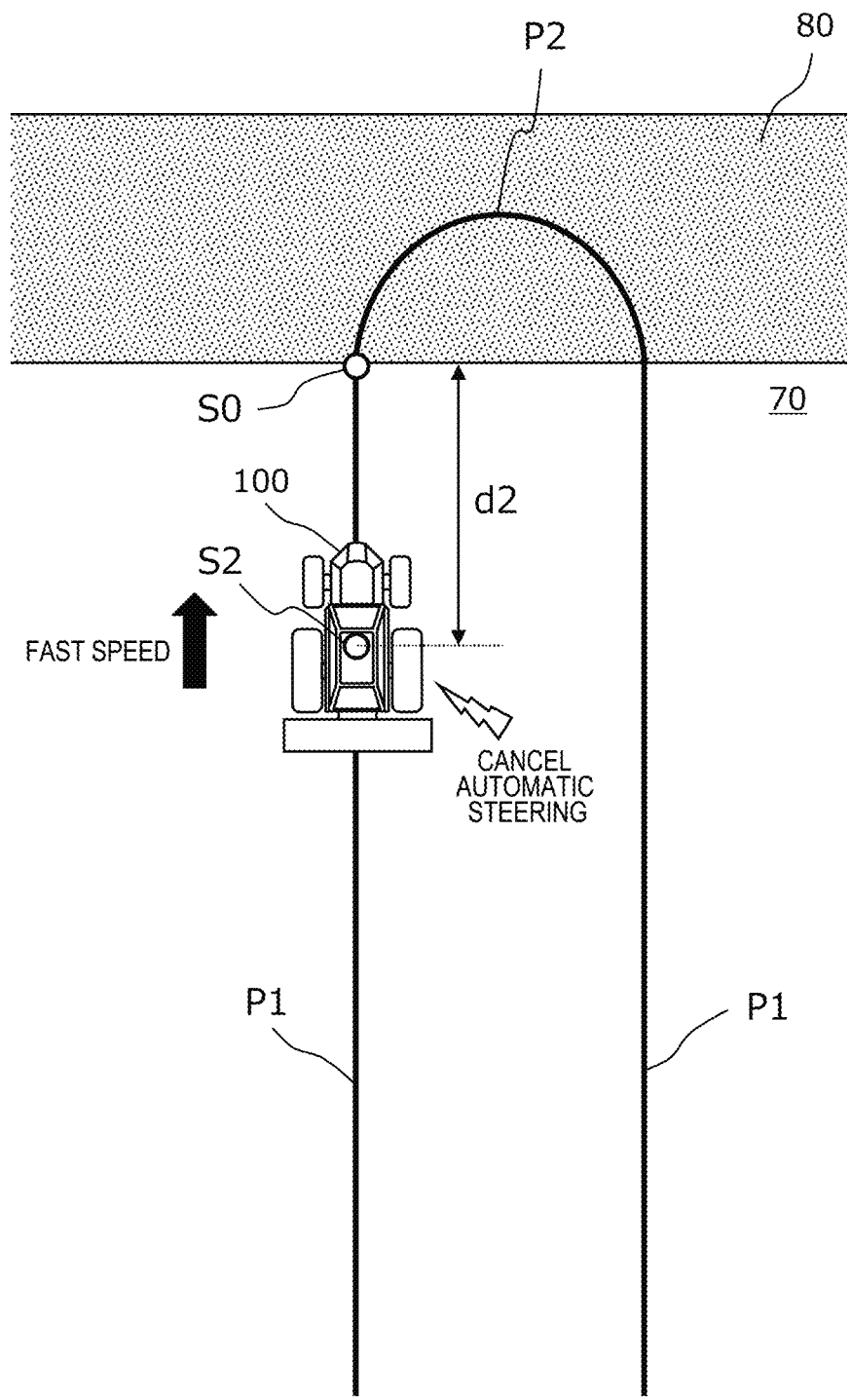
FIG. 31 is a diagram for describing the operation of the work vehicle according to Preferred Embodiment 4 of the present invention.

FIG. 31 is a diagram for describing the operation of the work vehicle 100 according to the present preferred embodiment. FIG. 31 shows how the work vehicle 100 may travel toward a headland 80 along one of the main paths P1 in the work area 70. In the automatic steering mode, when the work vehicle 100 travels along one of the main paths P1 and arrives at the beginning point S0 of a turning path P2, or a point 52 that is situated before the beginning point S0 by a predetermined distance d2, the controller 180 in the present preferred embodiment determines whether the speed of the work vehicle 100 exceeds the threshold or not. In the example of FIG. 22, assuming that the position of a GNSS sensor mounted on the cabin of the work vehicle 100 is the reference position of the work vehicle 100, when this reference position arrives at the point 52 that is situated before the beginning point S0 of the turning path P2 by the predetermined distance d2, it is determined whether the speed of the work vehicle 100 exceeds the threshold or not. If the speed of the work vehicle 100 exceeds the threshold, the controller 180 cancels the automatic steering mode, and switches to the manual steering mode. If the speed of the work vehicle 100 does not exceed the threshold, the controller 180 continues the automatic steering mode, and controls steering of the work vehicle 100 so that the work vehicle 100 turns along the turning path.

The distance d2 between the point 52 (at which the determination as to whether the speed of the work vehicle 100 exceeds the threshold or not is made) and the beginning point S0 of the turning path P2 may not be a fixed value, but may be set to any arbitrary value. The distance d2 may be set to different values depending on the speed, e.g., a distance that is traveled in a predetermined time (e.g. 5 seconds) by the work vehicle 100. Alternatively, the distance d2 may be determined in accordance with the curvature of the turning path P2. Depending on the situation, the distance d2 may be set to zero (0).

Figure 32A:
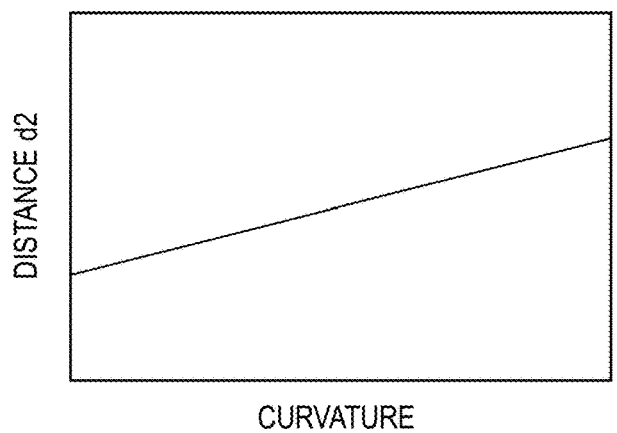
FIG. 32A is a graph showing a first example of a mathematical function defining correspondence between the curvature of the turning path and a distance d2.
Figure 32B:
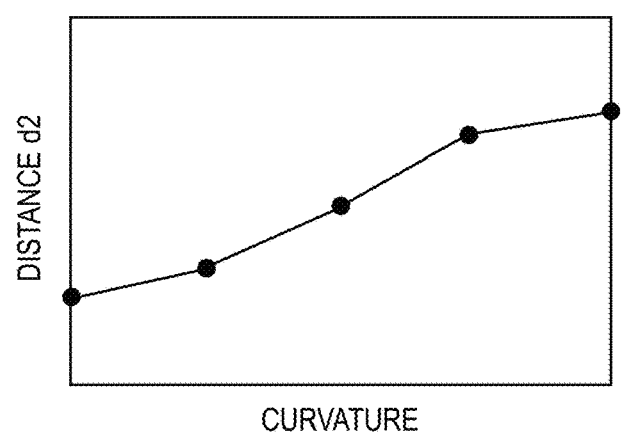
FIG. 32B is a graph showing a second example of a mathematical function defining correspondence between the curvature of the turning path and the distance d2.
Figure 32C:
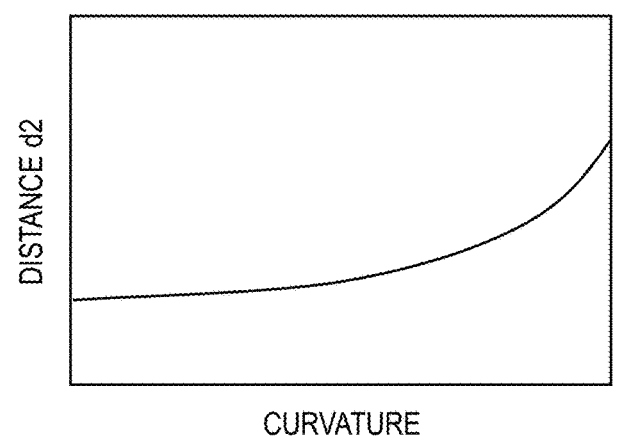
FIG. 32C is a graph showing a third example of a mathematical function defining correspondence between the speed of the work vehicle and the distance d2.
Figure 33A:
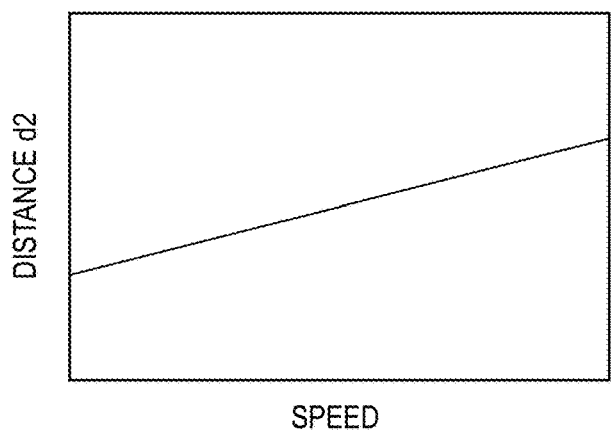
FIG. 33A is a graph showing a first example of a mathematical function defining correspondence between the speed of the work vehicle and the distance d2.
Figure 33B:
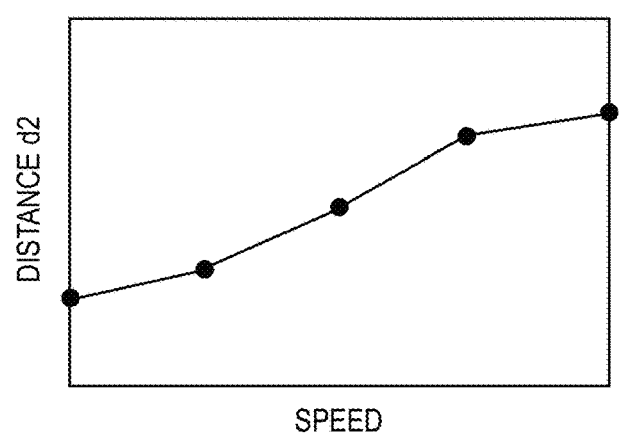
FIG. 33B is a graph showing a second example of a mathematical function defining correspondence between the speed of the work vehicle and the distance d2.
Figure 33C:
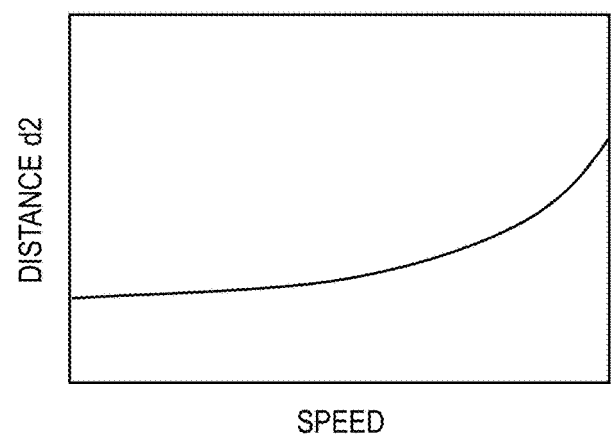
FIG. 33C is a graph showing a third example of a mathematical function defining correspondence between the speed of the work vehicle and the distance d2.

The distance d2 may be determined based on data such as a table or a mathematical function that is previously recorded in the storage device 170. For example, the storage device 170 may store data such as a table or a mathematical function defining correspondence between the curvature of the turning path P2 and the distance d2. FIGS. 32A to 32C show examples of mathematical functions defining correspondence between the curvature of the turning path P2 and the distance d2. The controller 180 may determine the distance d2 in accordance with the curvature of the turning path P2, based on data defining a mathematical function as shown in any of FIGS. 32A to 32C. The distance d2 may be set so as to become longer as the curvature of the turning path increases. In the case where the curvature is not constant along the turning path P2, the predetermined distance may be determined in accordance with the maximum curvature on the turning path P2. The storage device 170 may store data such as a table or a mathematical function defining correspondence between the speed of the work vehicle 100 and the distance d2. FIGS. 33A to 33C show examples of mathematical functions defining correspondence between the speed of the work vehicle 100 and the distance d2. The controller 180 may determine the distance d2 in accordance with the speed of the work vehicle 100 traveling along the main path P1, based on data defining a mathematical function as shown in any of FIGS. 33A to 33C. The distance d2 may be set so as to become longer as the speed of the work vehicle 100 increases.

Figure 34A:
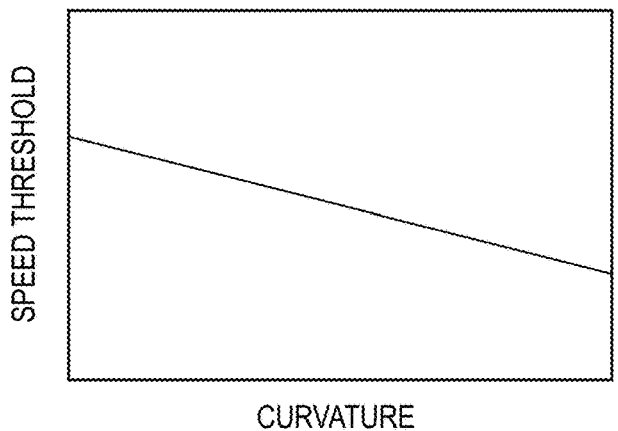
FIG. 34A is a graph showing a first example of a mathematical function defining correspondence between the curvature of a turning path and a speed threshold.
Figure 34B:
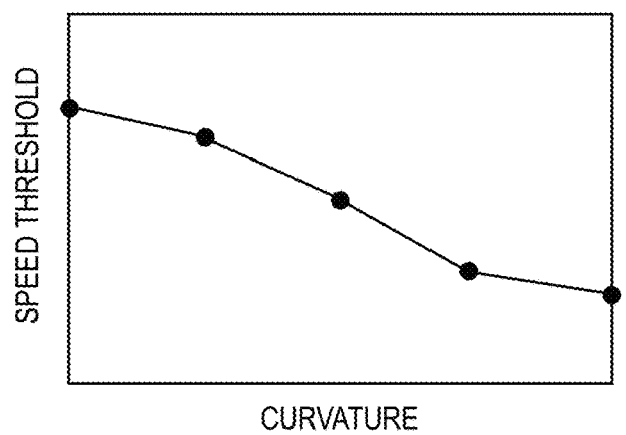
FIG. 34B is a graph showing a second example of a mathematical function defining correspondence between the curvature of a turning path and a speed threshold.
Figure 34C:
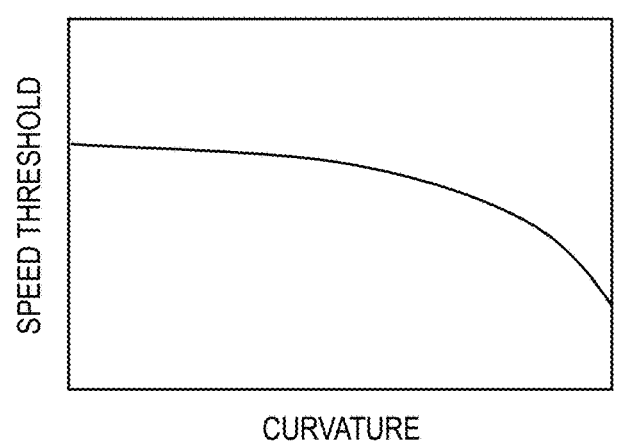
FIG. 34C is a graph showing a third example of a mathematical function defining correspondence between the curvature of a turning path and a speed threshold.

The speed threshold against which to determine whether or not cancel the automatic steering mode may not be a fixed value, but be variable. For example, the speed threshold may be varied in accordance with the curvature of the turning path P2. The storage device 170 may store data such as a table or a mathematical function defining correspondence between the curvature of the turning path P2 and the speed threshold. FIGS. 34A to 34C show examples of mathematical functions defining correspondence between the curvature of the turning path P2 and the speed threshold. The controller 180 may determine the speed threshold in accordance with the curvature of the turning path P2, based on data defining a mathematical function as shown in any of FIGS. 34A to 34C. The speed threshold may be set to a smaller value as the curvature of the turning path P2 increases.

Figure 35:
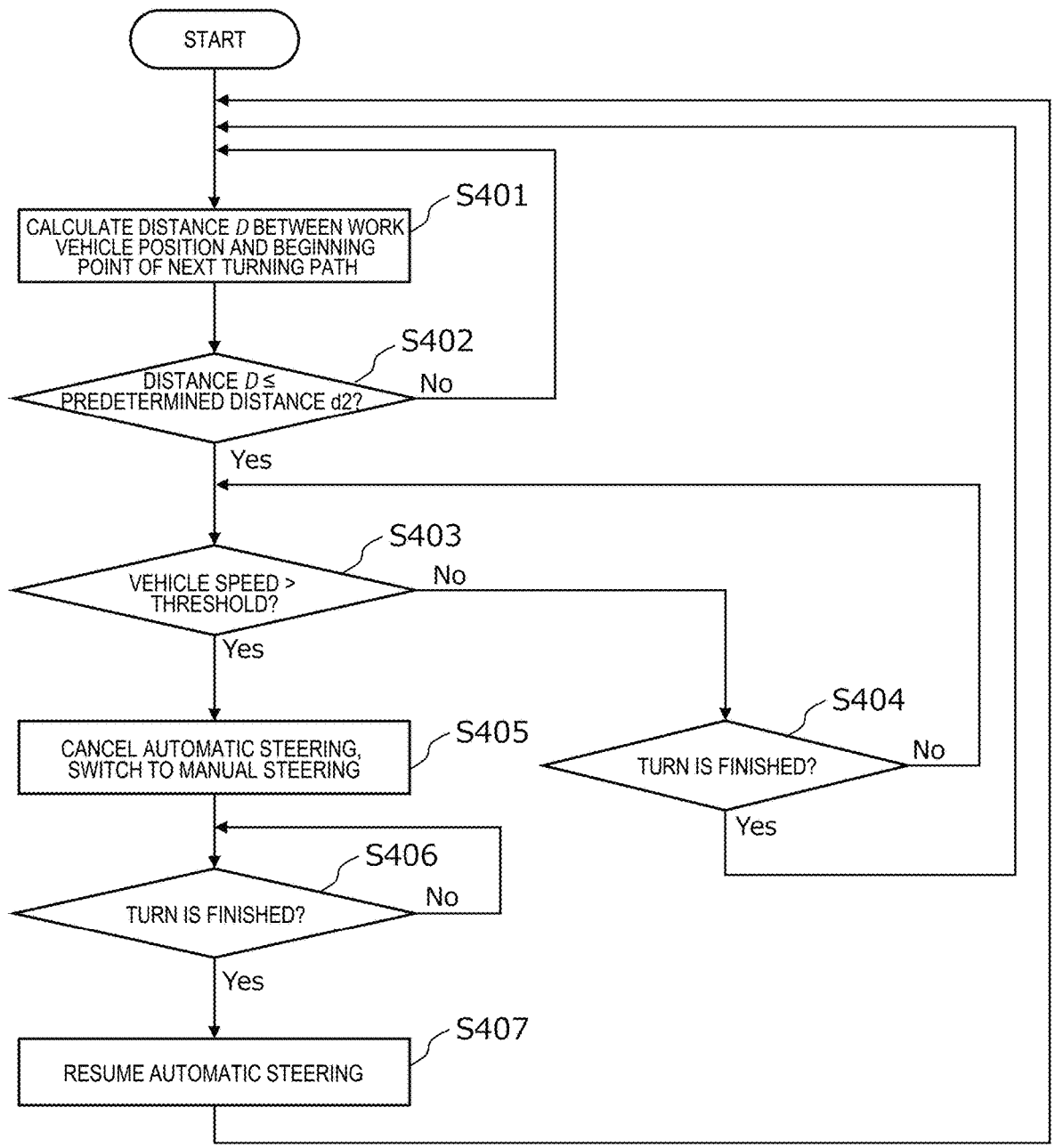
FIG. 35 is a flowchart showing an example operation of the controller according to preferred Embodiment 4 of the present invention.

FIG. 35 is a flowchart showing an example operation of the controller 180 in the present preferred embodiment. While the work vehicle 100 is traveling via automatic steering, the controller 180 performs the operation shown in FIG. 35. The controller 180 calculates a distance D between the position of the work vehicle 100 and the beginning point S0 of a next turning path P2 (step S401). The controller 180 determines whether or not the calculated distance D is equal to or greater than the aforementioned predetermined distance d2 (step S402). If the distance D is greater than the distance d2, control returns to step S401. If the distance D is equal to or smaller than the distance d2, the controller 180 determines whether the speed of the work vehicle 100 (vehicle speed) at that time exceeds the threshold or not (step S403). If the vehicle speed does not exceed the threshold, the controller 180 continues the automatic steering mode, and determines whether the turn has been completed or not (step S404). If the turn has not been completed at step S404, control returns to step S403. If the turn has been completed at step S404, control returns to step S401, and a similar operation is performed for the next turning path. At step S403, if the vehicle speed exceeds the threshold, the controller 180 cancels the automatic steering mode and switches to the manual steering mode (step S405). After step S405, the controller 180 determines whether the turn has been completed or not (step S406). If the turn has not been completed at step S406, the determination of step S406 is repeated every certain period of time (e.g., several milliseconds to several hundred milliseconds) until the turn is completed. If the turn has been completed at step S406, the controller 180 switches from the manual steering mode to the automatic steering mode (step S407). Thereafter, control returns to step S401, and a similar operation is performed for the next turning path. If the user performs a manipulation to cancel the automatic steering mode or a command to stop operating is issued while the operation shown in FIG. 35 is being performed, the operation is ended.

In the example shown in FIG. 35, upon determining at step S403 that the vehicle speed does not exceed the threshold, the controller 180 continues the automatic steering mode to control steering of the work vehicle 100 so that the work vehicle 100 turns along the turning path P2. Thereafter, unless the turn is completed, the controller 180 again performs the determination of step S403 every predetermined period of time. This is because the speed of the work vehicle 100 may increase during the turn, because of an accelerating operation by the user. If the controller 180 determines that the speed of the work vehicle 100 has exceeded the threshold during the turn, control proceeds to step S405, and the controller 180 cancels the automatic steering mode to switch to the manual steering mode. Thus, even in the case where the vehicle speed does not exceed the threshold before a turn is begun, automatic steering is canceled as soon as the vehicle speed exceeds the threshold during the turn. Once automatic steering is canceled, the user thereafter drives the work vehicle 100 via manual steering. As the user makes their own manipulations, mistracking of the work vehicle 100 from the turning path can be avoided.

In the aforementioned example, if the automatic steering mode is canceled and the mode is switched to the manual steering mode at step S405, then, after the turn is completed in the manual steering mode, the controller 180 resumes the automatic steering mode at step S407. Such resuming of the automatic steering mode may be performed automatically, or based on the user's manipulation. After the turn is completed in the manual steering mode, the controller 180 may cause the display device to display a pop-up notification to ask the user whether or not to resume the automatic steering mode. In that case, the controller 180 resumes the automatic steering mode in response to the user's manipulation. The pop-up notification may be a similar notification to the pop-up notification 92 shown in FIG. 13B, for example.

In the example of FIG. 35, irrespective of whether the cruise control function is enabled or disabled, the controller 180 performs the determination regarding the speed of the work vehicle 100 exceeding the threshold or not and the mode switching. In an alternative arrangement, it may be only while the cruise control function is enabled that the controller 180 performs the determination regarding the speed of the work vehicle 100 exceeding the threshold or not and the mode switching. In that case, since the vehicle speed will never increase during a turn via automatic steering, if step S403 finds that the vehicle speed does not exceed the threshold, the turn may be made via automatic steering, without step S404 being visited, and thereafter control may return to step S401.

If the automatic steering mode is canceled and the mode is switched to the manual steering mode at step S405 while the cruise control function is enabled, then, after a turn in the manual steering mode is completed, the controller 180 may at step S407 resume the automatic steering mode with the cruise control function still being enabled. Through such an operation, after the turn is completed via manual steering, the user does not need to make a manipulation of enabling cruise control again.

Also in the present preferred embodiment, as in Preferred Embodiment 2, the controller 180 may cause the display device to display a pop-up notification indicating that the work vehicle 100 has approached the turning path P2 when the work vehicle 100 has entered a predetermined range containing the turning path. An example of such a pop-up notification has been given in FIG. 23. Moreover, speed restriction based on the curvature of the turning path P2, as in Preferred Embodiment 2, may be performed.

Figure 36:
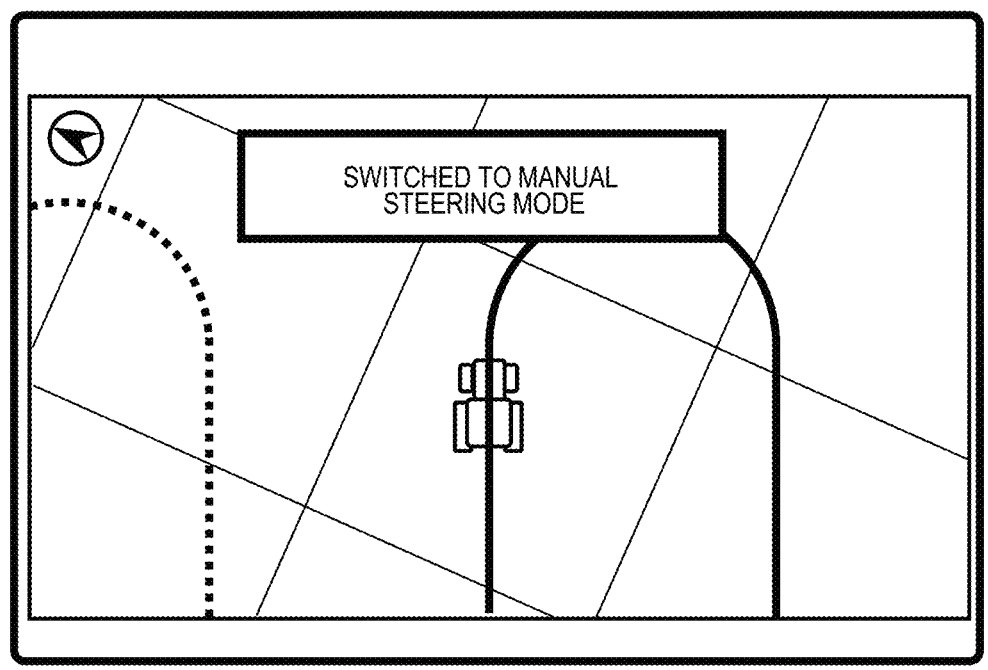
FIG. 36 is a diagram showing an example of a pop-up notification indicating that the mode has been switched from the automatic steering mode to the manual steering mode.

When having switched from the automatic steering mode to the manual steering mode, the controller 180 may cause the display device to display a pop-up notification indicating that the mode has been switched. FIG. 36 is a diagram showing an example of such a pop-up notification. In this example, a pop-up notification including a message "SWITCHED TO MANUAL STEERING MODE" is displayed. Seeing this notification, the user can manually control the steering of the work vehicle 100 to prevent the work vehicle 100 from mistracking from the turning path.

When the work vehicle 100 has entered a predetermined range containing a turning path, the controller 180 may cause an audio output device (e.g., the buzzer 220) to output an alarm sound. Since the user may not always be watching the display screen, the user's attention can be called more effectively by using an alarm sound to notify an approach of the work vehicle 100 to the turning path. When having switched from the automatic steering mode to the manual steering mode, the controller 180 may cause an audio output device (e.g., the buzzer 220) to output an alarm sound. This allows the user to be effectively notified of the mode switching.

Other Preferred Embodiments

The techniques of each of Preferred Embodiments 1 to 4 above can be combined with the techniques of any other preferred embodiment so long as it makes sense to do so.

In the above preferred embodiments, the work vehicle 100 may be an unmanned work vehicle which performs self-driving. In that case, component elements which are only required for human driving, e.g., the cabin, the driver's seat, the steering wheel, and the operational terminal, do not need to be provided in the work vehicle 100. The unmanned work vehicle may perform a similar operation to the operation according to any of the above preferred embodiments via autonomous driving, or by remote manipulations by a user.

A control system that provides the various functions according to the above preferred embodiments can be mounted on a work vehicle lacking such functions as an add-on. Such a control system may be manufactured and sold independently from the work vehicle. A computer program for use in such a control system may also be manufactured and sold independently from the work vehicle. The computer program may be provided in a form stored in a computer-readable, non-transitory storage medium, for example. The computer program may also be provided through downloading via telecommunication lines (e.g., the Internet).

Thus, the present disclosure encompasses control systems and work vehicles as provided in the following Items.

Item a1

A control system for a work vehicle that performs autosteer driving, the control system including a storage to store a target path for the work vehicle, and a controller configured or programmed to control steering of the work vehicle so that the work vehicle travels along the target path based on a position of the work vehicle identified by a position identifier and the target path stored in the storage, wherein the target path includes a plurality of parallel main paths and one or more turning paths interconnecting the plurality of main paths, and the controller is configured or programmed to, when the work vehicle is turning along one of the turning paths via automatic steering, if the position of the work vehicle becomes deviated from the turning path by more than a reference distance, cause an alarm generator to output an alarm.

Item a2

The control system of Item a1, wherein the alarming device includes a buzzer or a loudspeaker to output an alarm sound as the alarm.

Item a3

The control system of Item a1 or a2, wherein the controller is configured or programmed to, when a certain amount of time has passed after causing the alarm generator to output the alarm, if the position of the work vehicle is deviated from the turning path by more than the reference distance, cause the alarm generator to output another alarm having a higher alarming effect than that of the alarm.

Item a4

The control system of Item a1 or a2, wherein the controller is configured or programmed to, after causing the alarm generator to output the alarm, if the position of the work vehicle becomes deviated from the turning path by more than a value obtained by multiplying the reference distance with a predetermined constant larger than 1, cause the alarm generator to output another alarm having a higher alarming effect than that of the alarm.

Item a5

The control system of any of Items a1 to a4, wherein the controller is configured or programmed to cause a display to display a setting screen for allowing a user to set the reference distance, and based on the reference distance having been set, determine whether the position of the work vehicle has become deviated from the turning path by more than the reference distance.

Item a6

The control system of any of Items a1 to a5, wherein the controller is configured or programmed to, when the work vehicle is traveling along one of the plurality of main paths via automatic steering, if the position of the work vehicle becomes deviated from the main path by more than the reference distance or another reference distance that is different from the reference distance, cause the alarm generator to output another alarm.

Item a7

The control system of any of Items a1 to a6, wherein the alarm generator includes a display to output a pop-up notification as the alarm.

Item a8

The control system of Item a7, wherein the controller is configured or programmed to switch between an automatic steering mode and a manual steering mode, and the pop-up notification includes an indication to ask a user whether or not to switch from the automatic steering mode to the manual steering mode.

Item a9

The control system of Item a8, wherein the controller is configured or programmed to switch from the automatic steering mode to the manual steering mode in response to a manipulation by the user, and resume the automatic steering mode after a turn in the manual steering mode is completed.

Item a10

The control system of Item a9, wherein the controller is configured or programmed to cause the display to display a pop-up notification to ask the user whether or not to resume the automatic steering mode after a turn in the manual steering mode is completed, and resume the automatic steering mode in response to a manipulation by the user.

Item a11

The control system of Item a9 or a10, wherein the controller is configured or programmed to perform a cruise control function to cause the work vehicle to travel at a reference speed that is set by the user, and, if the work vehicle enters the turning path while the cruise control function is enabled, and if the user switches from the automatic steering mode to the manual steering mode following the pop-up notification, resume the automatic steering mode after a turn in the manual steering mode is completed, with the cruise control function still being enabled.

Item a12

The control system of any of Item a1 to a11, wherein the controller is configured or programmed to halt the work vehicle when the position of the work vehicle becomes deviated from the turning path by more than the reference distance.

[Item a13]

The control system of any of Items a1 to a12, wherein before causing the alarm generator to output the alarm, the controller is configured or programmed to cause the alarm generator to output another alarm and/or decelerate the work vehicle if at least one of the following has exceeded a respective threshold thereof a change rate over time of a deviation between the position of the work vehicle and the turning path during a turn, a magnitude of an acceleration of the work vehicle, a change rate of a pitch angle of the work vehicle over time, and a change rate of a roll angle of the work vehicle over time.

Item a14

The control system of any of Items a1 to a13, wherein the controller is configured or programmed to when causing the alarm generator to output the alarm, cause the storage device to store the turning path, and a next time when the work vehicle travels along another turning path that is adjacent to the turning path, cause the alarm generator to output another alarm and/or cause the work vehicle to decelerate, before arriving at the turning path.

Item a15

The control system of any of Items a1 to a14, wherein the plurality of main paths are located in a field, and the one or more turning paths are located in a headland of the field.

Item a16

A work vehicle including the control system of any of Items a1 to a15, the position identifier, and the alarm generator.

Item b1

A control system for a work vehicle that performs autosteer driving, the control system including a storage to store a target path for the work vehicle, and a controller configured or programmed to control steering of the work vehicle so that the work vehicle travels along the target path, based on a position of the work vehicle identified by a position identifier and the target path stored in the storage, wherein the target path includes a plurality of parallel main paths and one or more turning paths interconnecting the plurality of main paths, and the controller is configured or programmed to change a speed of the work vehicle during a turn along one of the turning paths via automatic steering, in accordance with a curvature of the turning path.

Item b2

The control system of Item b1, wherein the controller is configured or programmed to, when the curvature of the turning path exceeds a reference value, restrict the speed of the work vehicle during the turn along the turning path to a speed limit or below.

Item b3

The control system of Item b1 or b2, wherein the controller is configured or programmed to, when the work vehicle traveling along one of the plurality of main paths via automatic steering has arrived at a beginning point of a turning path that is connected to the main path or a point that is situated before the beginning point by a predetermined distance, if the speed of the work vehicle exceeds a speed limit and the curvature of the turning path exceeds a reference value, lower the speed of the work vehicle to the speed limit or below.

Item b4

The control system of Item b2 or b3, wherein the storage further stores data defining correspondence between the curvature and the speed limit, the controller is configured or programmed to, based on the data, determine the speed limit in accordance with the curvature, and the speed limit decreases as the curvature increases.

Item b5

The control system of any of Items b2 to b4, wherein the controller is configured or programmed to, during travel of the work vehicle, repetitively calculate the curvature of the turning path, and change the speed limit in accordance with a change rate of the curvature.

Item b6

The control system of any of Items b1 to b5, wherein the controller is configured or programmed to perform a cruise control function to cause the work vehicle to travel at a reference speed that is set by the user, and while the cruise control function is enabled, change the speed of the work vehicle during the turn along the turning path in accordance with the curvature of the turning path.

Item b7

The control system of Item b6, wherein the controller is configured or programmed to, while the cruise control function is enabled, cause the work vehicle to travel at the reference speed along one of the plurality of main paths, cause the work vehicle to turn along a turning path that is connected to the main path at a speed that is determined in accordance with the curvature of the turning path, and after the turn, cause the work vehicle to travel at the reference speed along another main path that is connected to the turning path.

Item b8

The control system of any of Items b1 to b7, wherein the controller includes a first control circuit to control steering of the work vehicle, and a second control circuit to control the speed of the work vehicle.

Item b9

The control system of any of Items b1 to b8, wherein the controller is configured or programmed to, when the work vehicle enters a predetermined range containing the turning path, cause a display to display a pop-up notification indicating that the work vehicle has approached the turning path.

Item b10

The control system of Item b9, wherein the pop-up notification includes information concerning at least one of a turning direction, a distance and/or a time until a beginning point of the turn, whether or not to turn via automatic steering, and the speed of the work vehicle during the turn.

Item b11

The control system of any of Items b1 to b10, wherein the controller is configured or programmed to, when the work vehicle enters a predetermined range containing the turning path, cause an audio output device to output an alarm sound.

Item b12

The control system of any of Items b1 to b11, wherein the controller is configured or programmed to, while restricting the speed of the work vehicle based on the curvature of the turning path, cause a display to display information indicating that speed is being restricted.

Item b13

The control system of Item b12, wherein the controller is configured or programmed to while controlling the speed of the work vehicle, cause the display to activate an indicator indicating that speed control is being performed, and while restricting the speed of the work vehicle based on the curvature of the turning path, flicker the indicator in a manner of displaying the information indicating that speed is being restricted.

Item b14

The control system of any of Items b1 to b13, wherein the plurality of main paths are located in a field, and the one or more turning paths are located in a headland of the field.

Item b15

A work vehicle including the control system of any of Items b1 to b14, and the position identifier.

Item c1

A control system for a work vehicle that performs auto-steer driving, the control system including a storage to store a target path for the work vehicle and an operation sequence defining a sequence of operations to be executed by the work vehicle when turning, and a controller configured or programmed to control steering of the work vehicle so that the work vehicle travels along the target path based on a position of the work vehicle as identified by a position identifier and the target path stored in the storage, wherein the target path includes a plurality of parallel main paths and one or more turning paths interconnecting the plurality of main paths, and the controller is configured or programmed to when the work vehicle turns along one of the turning paths via automatic steering, cause the work vehicle to execute the sequence of operations in accordance with the operation sequence, when a user makes a manipulation to instruct that a turn be made while the work vehicle is traveling along one of the plurality of main paths via automatic steering, cause a pop-up to be displayed on a display in response to the manipulation, the pop-up allowing the user to select whether or not to cause the work vehicle to execute the sequence of operations, if causing the work vehicle to execute the sequence of operations is selected, cause the work vehicle to make a turn that involves the sequence of operations in accordance with the operation sequence, and if not causing the work vehicle to execute the sequence of operations is selected, cause the work vehicle to make a turn that does not involve the sequence of operations.

Item c2

The control system of Item c1, wherein the controller is configured or programmed to switch between an automatic steering mode and a manual steering mode, and continue the automatic steering mode even after causing the work vehicle to turn in response to the user's manipulation instructing that a turn be made.

Item c3

The control system of Item c1 or c2, wherein the controller is configured or programmed to perform a cruise control function to cause the work vehicle to travel at a reference speed that is set by the user, and is configured or programmed to, even after causing the work vehicle to turn in response to the user's manipulation instructing that a turn be made while the cruise control function is enabled, keep the cruise control function enabled.

Item c4

The control system of any of Items c1 to c3, wherein the pop-up includes an indication to allow the user to set a turning direction and a number of rows to be skipped, and the controller is configured or programmed to cause the work vehicle to turn in accordance with the set turning direction and the set number of rows to be skipped.

Item c5

The control system of any of Items c1 to c4, wherein the sequence of operations includes a first operation to be performed at the beginning of a turn and a second operation to be performed at the finish of a turn, the first operation includes at least one of the operations of raising an implement that is linked to the work vehicle, suspending output of motive power to the implement, disabling a locking differential function of the work vehicle, switching from a two-wheel drive mode to a four-wheel drive mode, and lowering engine revolutions of the work vehicle, and the second operation includes at least one of the operations of lowering the implement, starting output of motive power to the implement, starting the locking differential function, switching from the four-wheel drive mode to the two-wheel drive mode, and increasing the engine revolutions.

Item c6

The control system of any of Items c1 to c5, wherein the controller is configured or programmed to cause the display to display a setting screen to allow the user to set contents of the sequence of operations, and store the operation sequence based on the set contents of the sequence of operations to the storage.

Item c7

The control system of any of Items c1 to c6, wherein the controller is configured or programmed to store to the storage a region where work by the work vehicle has been completed, when the user has made the manipulation to instruct that a turn be made, generate a path of the turn, and when the path and the region where the work has been completed overlap, cause the display to display an alarm.

Item c8

The control system of Item c7, wherein the controller is configured or programmed to when causing the display to display the alarm, further cause the display to display a user interface that allows the user to change the path of the turn.

Item c9

The control system of any of Items c1 to c8, wherein the plurality of main paths are located in a field, and the one or more turning paths are located in a headland of the field.

Item c10

A work vehicle including the control system of any of Items c1 to c9, the position identifier, and the display.

Item d1

A control system for a work vehicle that performs auto-steer driving, the control system including a storage to store a target path for the work vehicle, and a controller configured or programmed to switch between an automatic steering mode and a manual steering mode, and to control steering of the work vehicle in the automatic steering mode so that the work vehicle travels along the target path based on a position of the work vehicle as identified by a position identifier and the target path stored in the storage, wherein the target path includes a plurality of parallel main paths and one or more turning paths interconnecting the plurality of main paths, and the controller is configured or programmed to, when the work vehicle travels in the automatic steering mode along one of the plurality of main paths and arrives at a beginning point of a turning path that is connected to the main path, or a point that is situated before the beginning point by a predetermined distance, cancel the automatic steering mode and switch to the manual steering mode if a speed of the work vehicle exceeds the threshold, and continue the automatic steering mode to control steering of the work vehicle so that the work vehicle turns along the turning path if the speed of the work vehicle does not exceed the threshold.

Item d2

The control system of Item d1, wherein the controller is configured or programmed to, while continuing the automatic steering mode to control steering of the work vehicle so that the work vehicle turns along the turning path, cancel the automatic steering mode and switch to the manual steering mode when the speed of the work vehicle exceeds the threshold.

Item d3

The control system of Item d1 or d2, wherein the storage stores first data defining correspondence between a curvature of the turning path and the threshold, the controller is configured or programmed to determine the threshold in accordance with the curvature of the turning path, based on the first data, and the threshold becomes smaller as the curvature of the turning path increases.

Item d4

The control system of any of Items d1 to d3, wherein the storage stores second data defining correspondence between the curvature of the turning path and the predetermined distance, the controller is configured or programmed to determine the predetermined distance in accordance with the curvature of the turning path, based on the second data, and the predetermined distance becomes longer as the curvature of the turning path increases.

Item d5

The control system of any of Items d1 to d3, wherein the storage further stores third data defining correspondence between the speed of the work vehicle and the predetermined distance, the controller is configured or programmed to determine the predetermined distance in accordance with the speed of the work vehicle traveling along one of the main paths, based on the third data, and the predetermined distance becomes longer as the speed increases.

Item d6

The control system of any of Items d1 to d5, wherein the controller is configured or programmed to, when canceling the automatic steering mode and switching to the manual steering mode, resume the automatic steering mode after a turn in the manual steering mode is completed.

Item d7

The control system of Item d6, wherein the controller is configured or programmed to cause a display to display a pop-up notification to ask the user whether or not to resume the automatic steering mode after a turn in the manual steering mode is completed, and resume the automatic steering mode in response to a manipulation by the user.

Item d8

The control system of any of Items d1 to d7, wherein the controller is configured or programmed to perform a cruise control function to cause the work vehicle to travel at a reference speed that is set by the user, and while the cruise control function is enabled, determine whether the speed of the work vehicle exceeds the threshold or not.

Item d9

The control system of Item d8, wherein the controller is configured or programmed to, when canceling the automatic steering mode and switching to the manual steering mode while the cruise control function is enabled, resume the automatic steering mode after a turn in the manual steering mode is completed, with the cruise control function still being enabled.

Item d10

The control system of any of Items d1 to d9, wherein the controller is configured or programmed to, when the work vehicle enters a predetermined range containing the turning path, cause a display to display a pop-up notification indicating that the work vehicle has approached the turning path.

Item d11

The control system of Item d10, wherein the pop-up notification includes information concerning at least one of a turning direction, a distance and/or a time until a beginning point of the turn, whether or not to turn in an automatic steering mode, and the speed of the work vehicle during the turn.

Item d12

The control system of any of Items d1 to d11, wherein the controller is configured or programmed to, when having switched from the automatic steering mode to the manual steering mode, cause a display to display a pop-up notification indicating that a mode switching has occurred.

Item d13

The control system of any of Items d1 to d12, wherein the controller is configured or programmed to, when the work vehicle enters a predetermined range containing the turning path, cause an audio output device to output a first alarm sound.

Item d14

The control system of any of Items d1 to d13, wherein the controller is configured or programmed to, when having switched from the automatic steering mode to the manual steering mode, cause an audio output device to output a second alarm sound.

Item d15

The control system of any of Items d1 to d14, wherein the plurality of main paths are located in a field, and the one or more turning paths are located in a headland of the field.

Item d16

A work vehicle including the control system of any of Items d1 to d15, and the position identifier.

The techniques according to various example preferred embodiments of the present disclosure are applicable to work vehicles for use in agricultural applications, e.g., tractors, rice transplanters, combines, and harvesters, for example. The technique according to the present disclosure is also applicable to work vehicles for use in non-agricultural applications, e.g., construction vehicles or snowplow vehicles, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A control system for a work vehicle that performs auto-steer driving, the control system comprising:
    a storage to store a target path for the work vehicle; and
    a controller configured or programmed to control steering of the work vehicle so that the work vehicle travels along the target path based on a position of the work vehicle identified by a position identifier and the target path stored in the storage; wherein
    the target path includes a plurality of parallel main paths and one or more turning paths interconnecting the plurality of main paths;
    the controller is configured or programmed to, when the work vehicle is turning along one of the turning paths via automatic steering, if the position of the work vehicle becomes deviated from the turning path by more than a reference distance, cause an alarm generator to output an alarm; and
    the controller is configured or programmed to, when a certain amount of time has passed after causing the alarm generator to output the alarm, if the position of the work vehicle is deviated from the turning path by more than the reference distance, cause the alarm generator to output another alarm having a higher alarming effect than that of the alarm.

2. The control system of claim 1, wherein the alarm generator includes a buzzer or a loudspeaker to output an alarm sound as the alarm.

3. A control system for a work vehicle that performs auto-steer driving, the control system comprising:
    a storage to store a target path for the work vehicle; and
    a controller configured or programmed to control steering of the work vehicle so that the work vehicle travels along the target path based on a position of the work vehicle identified by a position identifier and the target path stored in the storage; wherein
    the target path includes a plurality of parallel main paths and one or more turning paths interconnecting the plurality of main paths;
    the controller is configured or programmed to, when the work vehicle is turning along one of the turning paths via automatic steering, if the position of the work vehicle becomes deviated from the turning path by more than a reference distance, cause an alarm generator to output an alarm; and
    the controller is configured or programmed to, after causing the alarm generator to output the alarm, if the position of the work vehicle becomes deviated from the turning path by more than a value obtained by multiplying the reference distance with a predetermined constant larger than 1, cause the alarm generator to output another alarm having a higher alarming effect than that of the alarm.

4. The control system of claim 1, wherein the controller is configured or programmed to:
    cause a display to display a setting screen to allow a user to set the reference distance; and
    based on the reference distance having been set, determine whether the position of the work vehicle has become deviated from the turning path by more than the reference distance.

5. The control system of claim 1, wherein, the controller is configured or programmed to, when the work vehicle is traveling along one of the plurality of main paths via automatic steering, if the position of the work vehicle becomes deviated from the main path by more than the reference distance or another reference distance that is different from the reference distance, cause the alarm generator to output another alarm.

6. The control system of claim 1, wherein the alarm generator includes a display to output a pop-up notification as the alarm.

7. The control system of claim 6, wherein
    the controller is configured or programmed to switch between an automatic steering mode and a manual steering mode; and
    the pop-up notification includes an indication to ask a user whether or not to switch from the automatic steering mode to the manual steering mode.

8. The control system of claim 7, wherein the controller is configured or programmed to:

switch from the automatic steering mode to the manual steering mode in response to a manipulation by the user; and resume the automatic steering mode after a turn in the manual steering mode is completed.

9. The control system of claim 8, wherein the controller is configured or programmed to:
cause the display to display a pop-up notification to ask the user whether or not to resume the automatic steering mode after a turn in the manual steering mode is completed; and
resume the automatic steering mode in response to a manipulation by the user.

10. The control system of claim 8, wherein the controller is configured or programmed to:
perform a cruise control function of causing the work vehicle to travel at a reference speed that is set by the user; and
if the work vehicle enters the turning path while the cruise control function is enabled, and if the user switches from the automatic steering mode to the manual steering mode following the pop-up notification, resume the automatic steering mode after a turn in the manual steering mode is completed, with the cruise control function still being enabled.

11. The control system of claim 1, wherein, the controller is configured or programmed to halt the work vehicle when the position of the work vehicle becomes deviated from the turning path by more than the reference distance.

12. The control system of claim 1, wherein, before causing the alarm generator to output the alarm, the controller is configured or programmed to cause the alarm generator to output another alarm and/or decelerate the work vehicle if at least one of the following has exceeded a respective threshold thereof: a change rate over time of a deviation between the position of the work vehicle and the turning path during a turn; magnitude of an acceleration of the work vehicle; a change rate of a pitch angle of the work vehicle over time; and a change rate of a roll angle of the work vehicle over time.

13. The control system of claim 1, wherein the controller is configured or programmed to:
when causing the alarm generator to output the alarm, cause the storage to store the turning path; and
a next time when the work vehicle travels along another turning path that is adjacent to the turning path, cause the alarm generator to output another alarm and/or cause the work vehicle to decelerate, before arriving at the turning path.

14. The control system of claim 1, wherein,
the plurality of main paths are located in a field; and
the one or more turning paths are located in a headland of the field.

15. A work vehicle comprising:
the control system of claim 1;
the position identifier; and
the alarm generator.

16. A work vehicle comprising:
the control system of claim 4;
the position identifier; and
the alarm generator.

* * * * *